(12) United States Patent
Umetsu et al.

(10) Patent No.: US 12,452,966 B2
(45) Date of Patent: Oct. 21, 2025

(54) TRANSVERSE FLUX INDUCTION HEATING DEVICE

(71) Applicant: NIPPON STEEL CORPORATION, Tokyo (JP)

(72) Inventors: Kenji Umetsu, Tokyo (JP); Tsutomu Ueki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 61 days.

(21) Appl. No.: 18/293,707

(22) PCT Filed: Sep. 1, 2022

(86) PCT No.: PCT/JP2022/032995
§ 371 (c)(1),
(2) Date: Jan. 30, 2024

(87) PCT Pub. No.: WO2023/033114
PCT Pub. Date: Mar. 9, 2023

(65) Prior Publication Data
US 2024/0341014 A1 Oct. 10, 2024

(30) Foreign Application Priority Data
Sep. 1, 2021 (JP) .................................. 2021-142294

(51) Int. Cl.
*H05B 6/44* (2006.01)
*H05B 6/40* (2006.01)

(52) U.S. Cl.
CPC .................. *H05B 6/44* (2013.01); *H05B 6/40* (2013.01)

(58) Field of Classification Search
CPC ........ C21D 1/42; C21D 9/60; H04B 10/2513; H04B 10/294; H05B 6/104; H05B 6/365; H05B 6/40; H05B 6/44; H05B 6/10; H05B 6/36; Y02P 10/25
USPC ....... 219/645, 646, 647, 656, 670, 671, 672, 219/673, 675–676, 602, 607, 624, 635, 219/636, 637; 148/567, 568
See application file for complete search history.

(56) References Cited

U.S. PATENT DOCUMENTS

| | | |
|---|---|---|
| 4,678,883 A | 7/1987 | Saitoh et al. |
| 5,739,506 A | 4/1998 | Hanton et al. |
| 5,844,213 A | 12/1998 | Peysakhovich et al. |
| 6,498,328 B2 | 12/2002 | Anderhuber et al. |

(Continued)

FOREIGN PATENT DOCUMENTS

| | | |
|---|---|---|
| EP | 2 800 452 A1 | 11/2014 |
| JP | 63-27836 B2 | 6/1988 |
| JP | 3-291891 A | 12/1991 |

(Continued)

*Primary Examiner* — Quang T Van
(74) *Attorney, Agent, or Firm* — Birch, Stewart, Kolasch & Birch, LLP

(57) ABSTRACT

Coils (230, 330) are respectively arranged on a front side and a rear side of a planned conveyance plane (CP). Main cores (211, 311), edge cores (212, 213, 312, 313), and bridge cores (220a, 220b, 320a, 330b) are arranged with respect to the coils (230, 330). The bridge cores (220a, 220b, 320a, 330b) are arranged on a back side of the main cores (211, 311) and the edge cores (212, 213, 312, 313). The main cores (211, 311) and the edge cores (212, 213, 312, 313) can be magnetically coupled by using the bridge cores (220a, 220b, 320a, 320b).

8 Claims, 21 Drawing Sheets

(56) References Cited

U.S. PATENT DOCUMENTS 8,803,046 B2 * 8/2014 Warner .................. F27D 11/06
219/602
2021/0017624 A1 1/2021 Hirota et al.

FOREIGN PATENT DOCUMENTS

| JP | 9-167676 A | 6/1997 |
| JP | 2001-351775 A | 12/2001 |
| JP | 2007-122924 A | 5/2007 |
| JP | 2010-108605 A | 5/2010 |
| JP | 2015-510544 A | 4/2015 |
| JP | 2017-195016 A | 10/2017 |
| JP | 6658977 B1 | 3/2020 |
| WO | WO 2019/181653 A1 | 9/2019 |

* cited by examiner

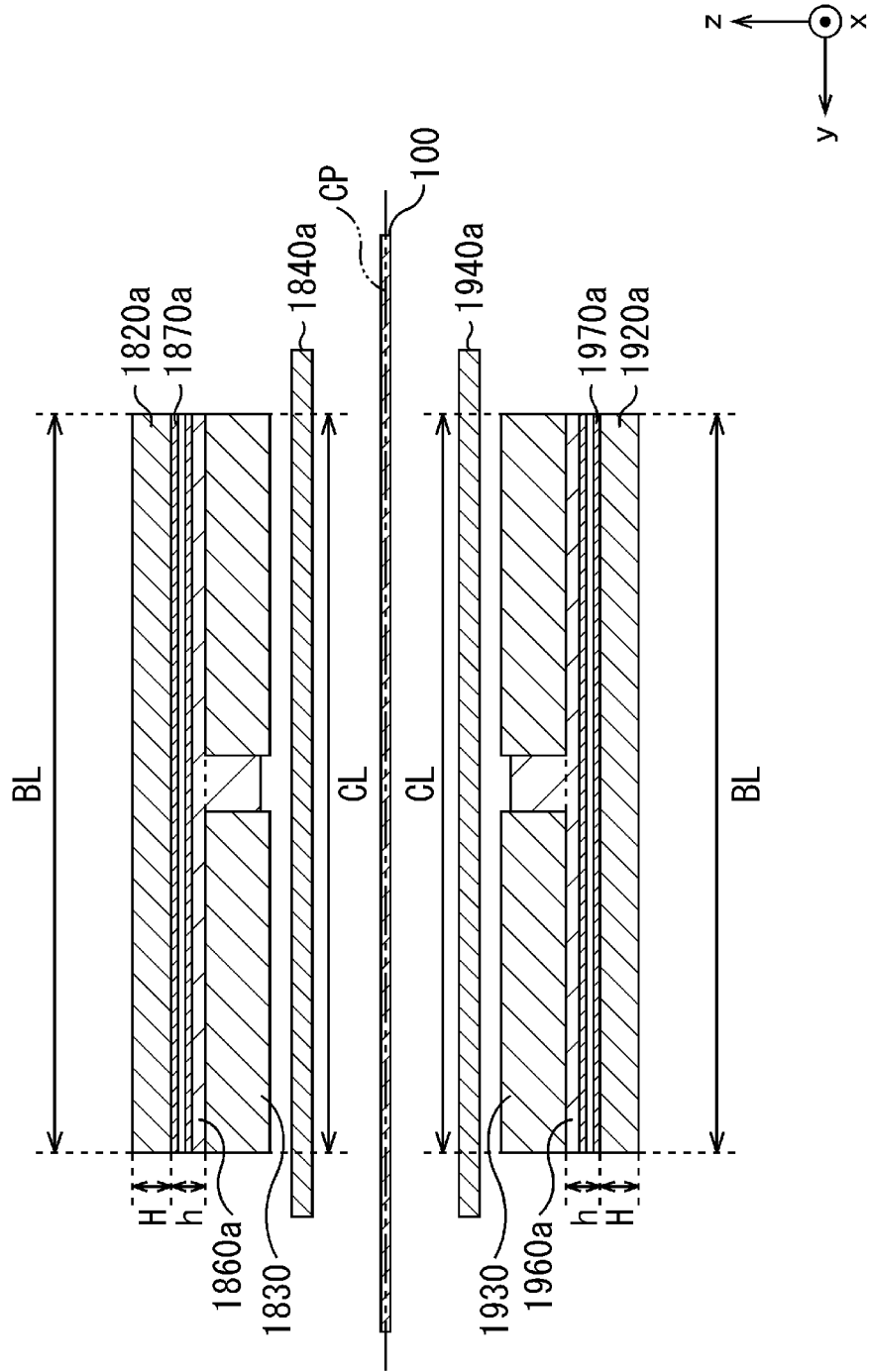

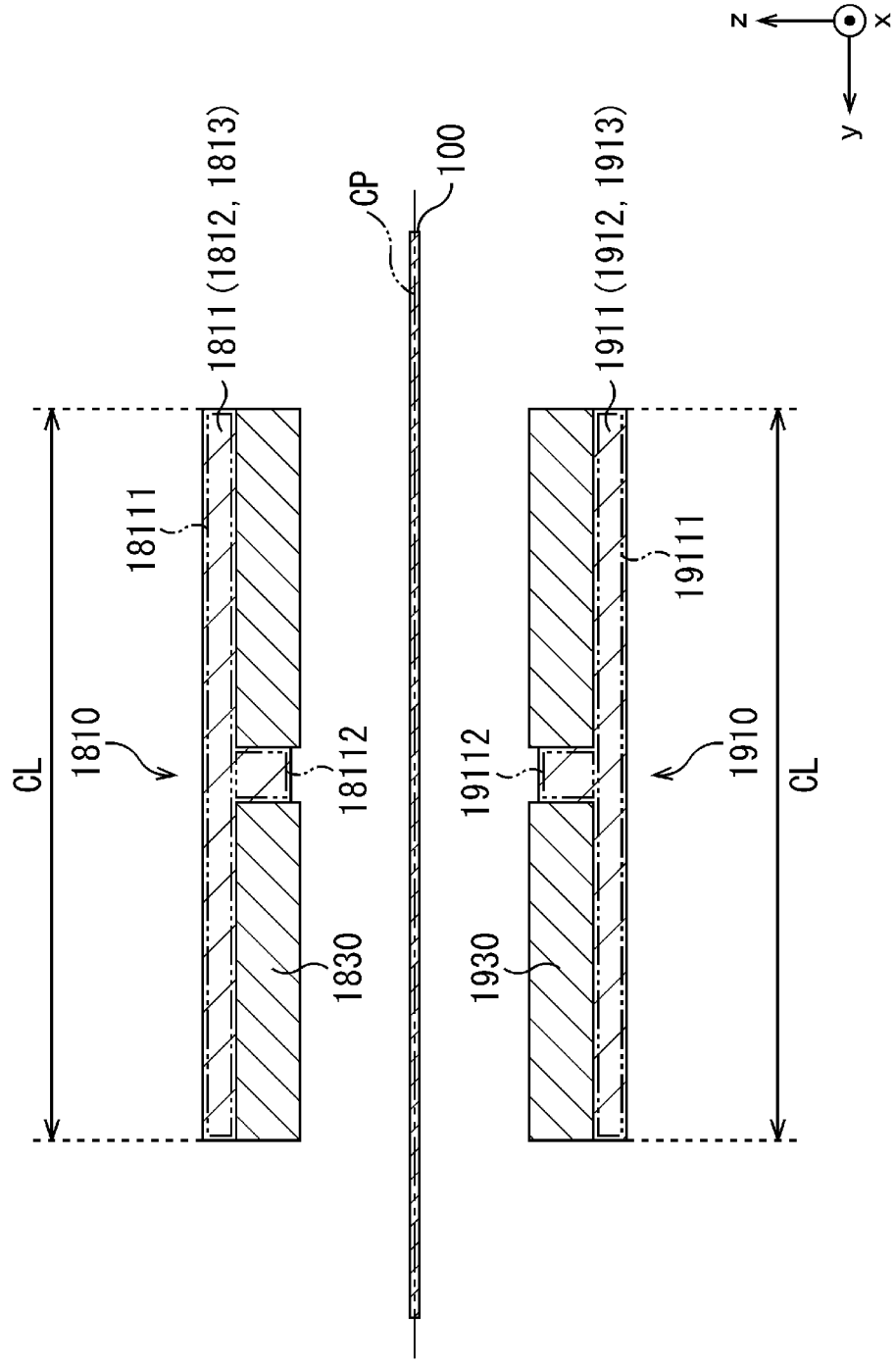

TRANSVERSE FLUX INDUCTION HEATING DEVICE

TECHNICAL FIELD

The present invention relates to a transverse flux induction heating device, and is particularly suitable for heating inductively a conductor sheet as a heating target, by intersecting of alternating magnetic fields with a sheet surface of the conductor sheet. This application is based upon and claims the benefit of priority of the prior Japanese Patent Application No. 2021-142294, filed on Sep. 1, 2021, the entire contents of which are incorporated herein by reference.

BACKGROUND ART

An induction heating device is used to continuously heat a conductor sheet such as a band-shaped steel sheet. The induction heating device imposes an alternating magnetic field generated from a coil on a conductor sheet. Accordingly, an eddy current is induced in the conductor sheet by electromagnetic induction. The conductor sheet is heated by Joule heat based on the eddy current. As an induction heating device, there is a solenoid-type induction heating device. The solenoid-type induction heating device imposes an alternating magnetic field substantially parallel to a longitudinal direction of a conductor sheet disposed inside a solenoid coil. When a thickness of a conductor sheet as a heating target is small (when the thickness of the conductor sheet is 1 mm or less, for example), with the solenoid-type induction heating device, it may not be able to heat the conductor sheet to a desired temperature even if a frequency of the alternating magnetic field is increased.

As an induction heating device capable of easily performing induction heating on a thin conductor sheet, there is a transverse flux induction heating device. The transverse flux induction heating device includes, for example, a pair of coils having at least one coil arranged on a front side and at least one coil arranged on a rear side of a planned conveyance plane of a conductor sheet to be conveyed in a horizontal direction. The coils forming the pair of coils are arranged to make alternating magnetic fields generated through energization of alternating currents in mutually the same direction intersect the planned conveyance plane of the conductor sheet. With a general transverse flux induction heating device, an eddy current concentrates at an end portion in a width direction of a conductor sheet. For this reason, a current density at the end portion in the width direction of the conductor sheet increases. Accordingly, the end portion in the width direction of the conductor sheet may be overheated. Note that the width direction is a direction perpendicular to a conveyance direction of the conductor sheet and a facing direction of the coils. In the following explanation, the end portion in the width direction of the conductor sheet will be referred to as an edge portion according to need.

Regarding such problems, Patent Literature 1 discloses that a shield plate (blocking plate) capable of moving along a width direction is arranged between an edge portion of a conductor sheet and a magnetic pole. The shield plate is made of a non-magnetic metal material. In such a technique, an alternating magnetic field generated from a coil is blocked by the shield plate, to thereby suppress a temperature distribution in the width direction of the conductor from being nonuniform.

Further, Patent Literature 2 discloses that a secondary coil for generating a magnetic field that cancels an alternating magnetic field generated from a coil for heating a conductor sheet, is arranged between an edge portion of the conductor sheet and a magnetic pole. In the technique described in Patent Literature 2, by making the secondary coil generate the magnetic field that cancels the alternating magnetic field generated from the coil, a temperature distribution in a width direction of the conductor is suppressed from being nonuniform.

Further, Patent Literature 3 discloses that bulging portions are formed on an original core. The bulging portions are arranged at positions facing regions where a temperature is lowered at both end portions in a width direction, of a region of a conductor sheet. In the technique described in Patent Literature 3, the bulging portions formed on the original core suppress a temperature distribution in the width direction of the conductor from being nonuniform.

Further, Patent Literature 4 discloses a technique in which a first J-shaped conductor 32 and a second J-shaped conductor 34 are used to form a coil. In the technique described in Patent Literature 4, by gliding the first J-shaped conductor 32 along a width direction relative to the second J-shaped conductor 34, a length in the width direction of a region between the first J-shaped conductor 32 and the second J-shaped conductor 34 is changed. In the technique described in Patent Literature 4, by changing the length in the width direction of the region between the first J-shaped conductor 32 and the second J-shaped conductor 34 in accordance with a width of the conductor, a temperature distribution in the width direction of the conductor is suppressed from being nonuniform.

Further, Patent literature 5 discloses a technique in which a plurality of magnetic pole segments are arranged in a width direction. In such a technique, a distance between the plurality of magnetic pole segments and a conductor is changed in accordance with a width of the conductor, to thereby suppress a temperature distribution in the width direction of the conductor from being nonuniform. Further, Patent Literature 5 discloses a technique in which a plurality of bar-shaped magnetic poles wound with coils are arranged with an interval therebetween along a conveyance direction of the conductor. In such a technique, each of the plurality of bar-shaped magnetic poles rotates around a shaft, as a rotary shaft, that passes through a position of the gravity center of the magnetic pole and extends in a direction perpendicular to the conductor. In the technique, by rotating the plurality of bar-shaped magnetic poles in accordance with the width of the conductor, the temperature distribution in the width direction of the conductor is suppressed from being nonuniform. Further, Patent Literature 5 discloses that a plurality of iron cores are arranged in the conveyance direction of the conductor, and a current that flows through the coil wound around the iron core is switched. In such a technique, the current that flows through the coil wound around the iron core is switched in accordance with the width of the conductor, thereby switching the iron core that generates a magnetic flux. In the technique, the above enables to suppress the temperature distribution in the width direction of the conductor from being nonuniform.

Further, Patent Literature 6 discloses a technique in which a plurality of magnetic bars arranged in a width direction of a conductor are made as a core. In the technique described in Patent Literature 6, intervals between the plurality of magnetic bars are adjusted in accordance with a width of the conductor, and a shield plate is used, to thereby suppress a temperature distribution in the width direction of the conductor from being nonuniform.

CITATION LIST

Patent Literature

Patent Literature 1: Japanese Examined Patent Application Publication No. 63-27836
Patent Literature 2: Japanese Laid-open Patent Publication No. 2007-122924
Patent Literature 3: Japanese Laid-open Patent Publication No. 2010-108605
Patent Literature 4: Description of U.S. Pat. No. 5,739,506
Patent Literature 5: Japanese Laid-open Patent Publication No. 03-291891
Patent Literature 6: Description of U.S. Pat. No. 6,498,328

SUMMARY OF INVENTION

Technical Problem

Incidentally, in the transverse flux induction heating device as described above, a core loss due to the magnetic field is generated, resulting in that the core generates heat and a temperature thereof increases. Further, in the transverse flux induction heating device, in order to generate a large magnetic field, a coil for heating the conductor sheet is wound around the core. Therefore, the increase in temperature of the core occurs significantly. Further, the heat generation of the core occurs significantly in an induction heating device having a large power supply. Regarding this point, in the techniques described in Patent Literatures 5 and 6, the heat generation of the core is not considered but the core is divided into a plurality of pieces. A cross-sectional area of the cores, as a whole, divided into the plurality of pieces, becomes larger than a surface area of the undivided core. The larger the surface area of the core is, the more the heat dissipation from the core is accelerated. Therefore, the heat generation of the cores divided into the plurality of pieces is suppressed more, when compared to the heat generation of the undivided core.

When the core is divided into a plurality of pieces in the width direction, a temperature of the core is lowered. However, an alternating magnetic field in the core is divided. Therefore, when the core is divided into the plurality of pieces in the width direction, it may not be able to apply an alternating magnetic field with a desired magnitude to the conductor sheet. Consequently, a heating efficiency of the conductor sheet deteriorates, and there is generated a bias in the temperature distribution in the width direction of the conductor sheet. The present inventors confirmed that when a core of a general transverse flux induction heating device is divided into a plurality of pieces in a width direction, a temperature of an edge portion of a conductor sheet is sometimes lowered by 100° C. or more than a temperature of another portion of the conductor sheet.

If the number of division of the core is reduced in order to suppress such a reduction in temperature of the conductor sheet (namely, in order to make the alternating magnetic fields with desired magnitude intersect the conductor sheet), it is impossible to lower the temperature of the core to a desired temperature. On the other hand, if the number of division of the core is increased in order to lower the temperature of the core to the desired temperature, it is impossible to suppress the reduction in temperature of the conductor sheet (namely, it is impossible to make the alternating magnetic fields with desired magnitude intersect the conductor sheet). In the techniques described in Patent Literatures 5 and 6, the core is divided for suppressing the overheating of the edge portion and the heat generation of the core. Therefore, the number of division of the core is determined so that the overheating of the edge portion of the conductor sheet and the heat generation of the core can be suppressed. The techniques described in Patent Literatures 5 and 6 do not even recognize the problem that the increase in temperature of the core and the reduction in magnitude of the alternating magnetic field applied to the conductor are suppressed. As described above, the conventional techniques have a problem that it is impossible to simultaneously satisfy both the suppression of the increase in temperature of the core and the suppression of the reduction in magnitude of the alternating magnetic field applied to the conductor.

The present invention has been made in view of the problems as described above, and an object thereof is to provide a transverse flux induction heating device capable of simultaneously satisfying both the suppression of the increase in temperature of the core and the suppression of the reduction in magnitude of the alternating magnetic field applied to the conductor.

Solution to Problem

A first example of a transverse flux induction heating device of the present invention is characterized in that it is a transverse flux induction heating device including: a pair of coils having at least one coil arranged on a front side and at least one coil arranged on a rear side of a planned conveyance plane of a conductor sheet to make alternating magnetic fields generated through energization of alternating currents in mutually the same direction intersect the planned conveyance plane of the conductor sheet; and cores arranged by a set for each coil forming the pair of coils, the set of cores arranged for each coil having a plurality of partial cores arranged in a state of having an interval therebetween in a width direction, the width direction being a direction perpendicular to a conveyance direction of the conductor sheet and a facing direction of the coils, each of the partial cores having a body portion and a center leg portion, the body portion being extended in the conveyance direction from a region on an upstream side in the conveyance direction of the coil to a region on a downstream side in the conveyance direction of the coil, on a back side of the coil, the back side being an opposite side to a side where the planned conveyance plane exists, and the center leg portion being extended in a direction of the planned conveyance plane from the body portion to pass through a hollow portion of the coil, in which the set of cores has at least one bridge core capable of being magnetically coupled to at least two partial cores out of the partial cores, and the bridge core is arranged on the back side of the partial cores.

A second example of the transverse flux induction heating device of the present invention is characterized in that each of the partial cores can be magnetically coupled to at least one of the bridge core.

A third example of the transverse flux induction heating device of the present invention is characterized in that all of the partial cores included in the set of cores can be magnetically coupled via the bridge core.

A fourth example of the transverse flux induction heating device of the present invention is characterized in that each of the set of cores has a plurality of the bridge cores, and the bridge cores are arranged in a state of having an interval therebetween in the width direction.

A fifth example of the transverse flux induction heating device of the present invention is characterized in that each of the set of cores has two of the bridge cores, the two bridge cores are arranged on both sides in the width direction in a state of having an interval therebetween, and when seen from the facing direction of the coils, at least a part of each of the partial cores overlaps with one of the bridge cores with each other.

A sixth example of the transverse flux induction heating device of the present invention is characterized in that the number of the bridge core provided to each of the set of cores is one.

A seventh example of the transverse flux induction heating device of the present invention is characterized in that in the set of cores, the partial core and the bridge core are separate cores.

An eighth example of the transverse flux induction heating device of the present invention is characterized in that in the set of cores, at least one of the plurality of partial cores and at least one of the bridge core are an integrated core.

BRIEF DESCRIPTION OF DRAWINGS

FIG. 20 is a view illustrating the fourth embodiment of the present invention, and illustrating one example of a second cross section of the induction heating device.

FIG. 21 is a view illustrating the fourth embodiment of the present invention, and illustrating one example of a third cross section of the induction heating device.

DESCRIPTION OF EMBODIMENTS

Figure 1:
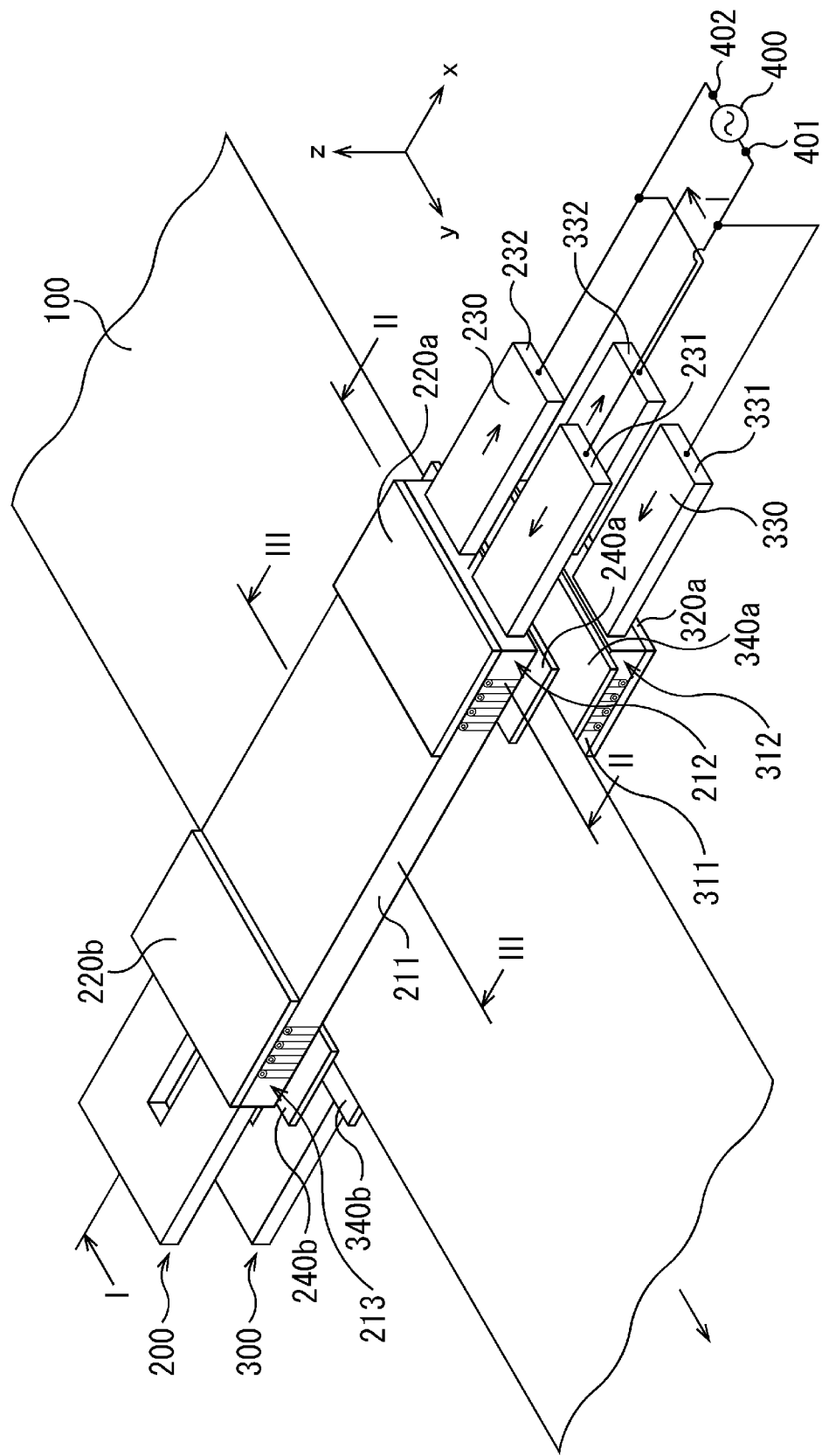
FIG. 1 is a view illustrating a first embodiment of the present invention, and illustrating one example of an external configuration of an induction heating device.

Hereinafter, embodiments of the present invention will be explained while referring to the drawings. Note that the same thing in the following explanation includes not only a thing that is strictly the same but also a thing differed within a range that does not depart from the gist of the invention. In like manner, the matched thing in the following explanation includes not only a thing that is strictly consistent but also a thing that is not consistent within a range that does not depart from the gist of the invention. For example, the same thing in the following explanation also includes a thing differed within a tolerance range defined when designing (within +5%, for example). Further, in the explanation below, a transverse flux induction heating device will be referred to as an induction heating device. Further, in the explanation below, a case where a conductor sheet as a heating target is a band-shaped steel sheet, is exemplified (note that the conductor sheet being the heating target is not limited to the band-shaped steel sheet). Further, for the convenience of notation and explanation, a part of configuration will be omitted or illustrated in a simplified manner in each drawing. Further, in each drawing, x-y-z coordinates indicate the relation of directions in the drawing. A symbol of white circle (○) with black circle (●) given therein indicates the direction from the back to front of the paper sheet.

Partial cores described in claims include ones with various shapes, functions, and arranged positions. Accordingly, it is difficult to explain embodiments of the present invention only by the name of partial core. Therefore, in the explanation of embodiments below, there is a case where even the partial core is explained without using the name of the partial core, as a matter of convenience. Note that also in such a case, out of cores to be explained in the respective embodiments, cores having names except for an upper core and a lower core including two types of cores of a partial core and a bridge core, and the bridge core, are all partial cores. In each embodiment, one example of core forming the partial core will be described clearly in the embodiment.

First Embodiment

First, a first embodiment of the present invention will be explained.

FIG. 1 is a view illustrating one example of an external configuration of an induction heating device. Concretely, FIG. 1 is a view in which the induction heating device is seen from diagonally above. FIG. 1 exemplifies a case where a band-shaped steel sheet 100 is conveyed in a direction of arrow mark illustrated at a tip of the band-shaped steel sheet 100 (y-axis positive direction). Specifically, FIG. 1 exemplifies a case where a conveyance direction of the band-shaped steel sheet 100 is the y-axis positive direction. Further, FIG. 1 exemplifies a case where a longitudinal direction of the band-shaped steel sheet 100 is a y-axis direction, a width direction of the band-shaped steel sheet 100 is an x-axis direction, and a thickness direction of the band-shaped steel sheet 100 is a z-axis direction. Note that a thickness of the band-shaped steel sheet 100 is unlimited. However, the induction heating device of each embodiment can heat a conductor sheet with a small thickness. Therefore, the thickness of the band-shaped steel sheet 100 as a heating target of the induction heating device of each embodiment is preferably 1 mm or less, for example. However, the thickness of the band-shaped steel sheet 100 being the heating target of the induction heating device of each embodiment may exceed 1 mm.

The induction heating device illustrated in FIG. 1 includes an upper inductor 200 and a lower inductor 300. The upper inductor 200 and the lower inductor 300 are arranged at positions facing each other with the band-shaped steel sheet 100 interposed therebetween (refer to FIG. 2 to FIG. 4). The upper inductor 200 and the lower inductor 300 have the same configuration. Therefore, the upper inductor 200 will be explained here in detail, and a detailed explanation regarding the lower inductor 300 will be omitted according to need. The band-shaped steel sheet 100 sometimes moves in the z-axis direction and the x-axis direction, and there is a case where the band-shaped steel sheet 100 is at a position slightly displaced from a center of the induction heating device. Even if there is such a movement of the position (meandering or the like, for example) of the band-shaped steel sheet 100, it is often the case where the band-shaped steel sheet 100 is controlled to be positioned at the center of the induction heating device as much as possible, by a publicly-known technique (for example, International Publication Pamphlet No. WO2019/181653). In principle, in the drawings below including FIG. 1, a state of a case where the band-shaped steel sheet 100 is at an ideal position (for example, the center position of the induction heating device) where a heating amount on an upper surface side and a lower surface side of the band-shaped steel sheet 100 and a heating amount on a left side and a right side in the conveyance direction of the band-shaped steel sheet 100 are equal, respectively, is illustrated. In the explanation below, a plane passing through a center position in the thickness direction of the band-shaped steel sheet 100 and perpendicular to the thickness direction of the band-shaped steel sheet 100 when the band-shaped steel sheet 100 is at the above-described ideal position, will be referred to as a planned conveyance plane CP according to need. Note that the plane passing through the center position in the thickness direction of the band-shaped steel sheet 100 and perpendicular to the thickness direction of the band-shaped steel sheet 100, is also a plane passing through the center position in the thickness direction of the band-shaped steel sheet 100 and parallel to a sheet surface of the band-shaped steel sheet 100. The planned conveyance plane CP is already decided at a time of designing the induction heating device, so that the induction heating device itself includes the planned conveyance plane CP. The planned conveyance plane CP is often positioned at the center of the induction heating device. Accordingly, a plane at a center of an interval between the upper inductor 200 and the lower inductor 300 may also be set to the planned conveyance plane CP. Further, in the explanation below, the conveyance direction of the band-shaped steel sheet 100 will be referred to as a conveyance direction according to need. Further, in the explanation below, a direction in which the upper inductor 200 and the lower inductor 300 face each other will be referred to as a facing direction of the coils or simply referred to as a facing direction according to need. FIG. 1 exemplifies a case where a front side of the planned conveyance plane CP is a z-axis positive direction side, and a rear side of the planned conveyance plane CP is a z-axis negative direction side. Further, FIG. 1 exemplifies a case where the upper inductor 200 is arranged on the front side of the planned conveyance plane CP, and the lower inductor 300 is arranged on the rear side of the planned conveyance plane CP.

As described above, FIG. 1 exemplifies a case where the facing direction of the coils is the z-axis direction, and the conveyance direction of the band-shaped steel sheet 100 is the y-axis positive direction. Therefore, FIG. 1 exemplifies a case where the width direction being the direction perpendicular to the facing direction of the coils and the conveyance direction of the band-shaped steel sheet 100 is the x-axis direction.

Note that an interval (distance in the z-axis direction) between the upper inductor 200 and the planned conveyance plane CP, and an interval between the lower inductor 300 and the planned conveyance plane CP normally are equal, but they may be different from each other. The present embodiment exemplifies a case where the induction heating device has a shape in a relation of mirror symmetry in which a y-z plane at a center in the x-axis direction of the induction heating device is set to a plane of symmetry. Note that the y-z plane is a virtual plane parallel to the y-axis and the z-axis. When the interval between the upper inductor 200 and the planned conveyance plane CP, and the interval between the lower inductor 300 and the planned conveyance plane CP are the same, the induction heating device has a shape in a relation of mirror symmetry in which the planned conveyance plane CP is set to a plane of symmetry.

Figure 2:
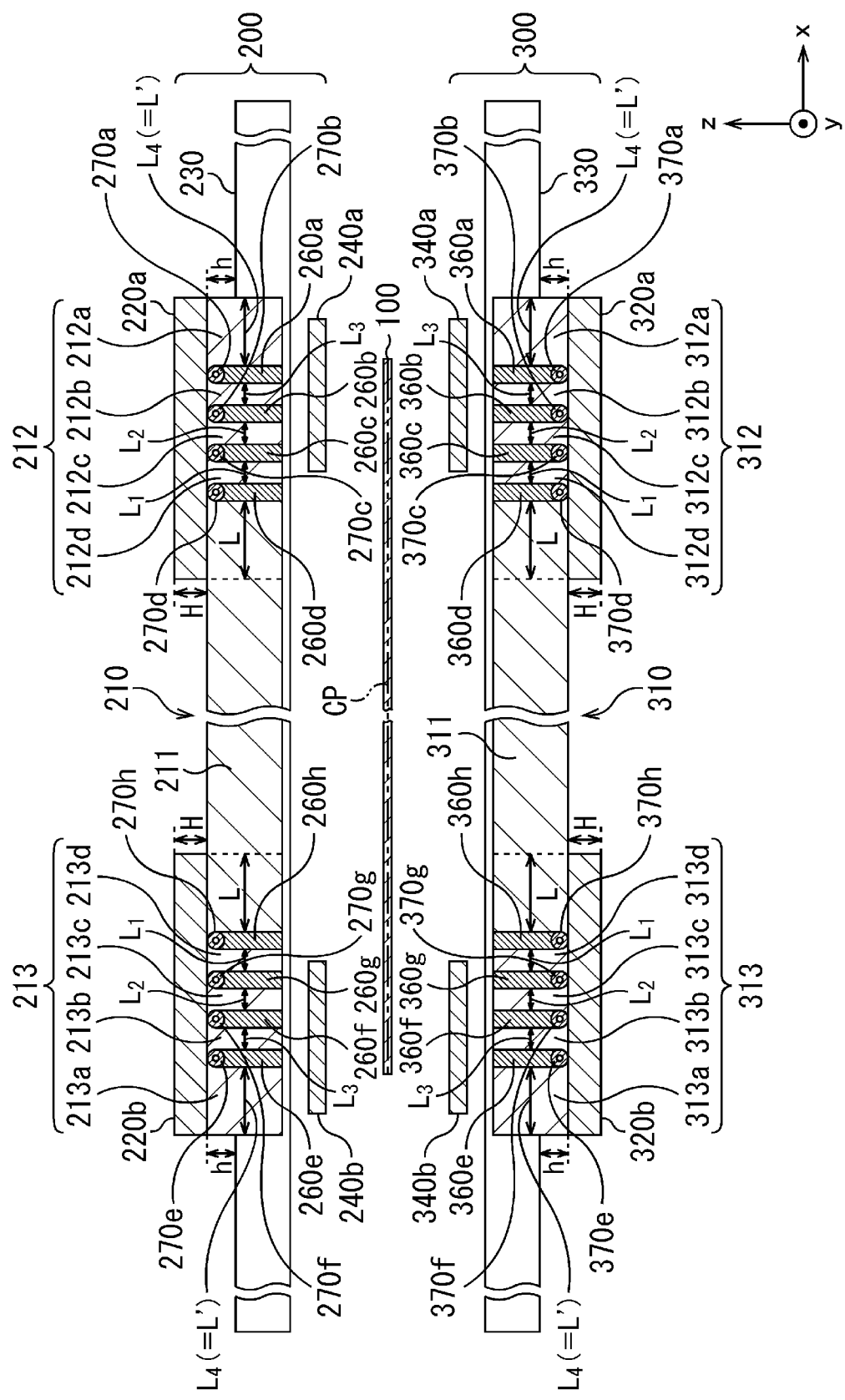
FIG. 2 is a view illustrating the first embodiment of the present invention, and illustrating one example of a first cross section of the induction heating device.
Figure 3:
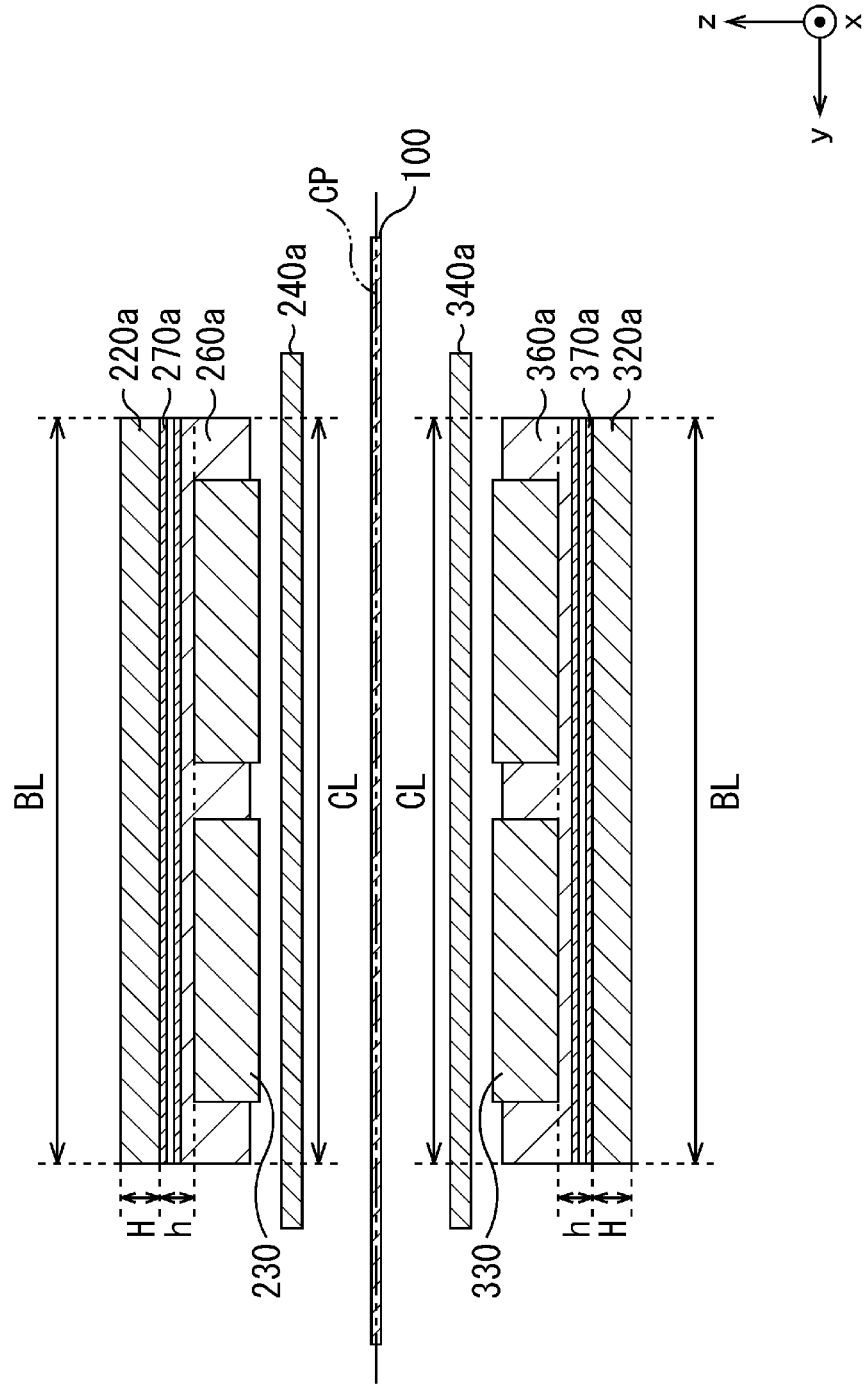
FIG. 3 is a view illustrating the first embodiment of the present invention, and illustrating one example of a second cross section of the induction heating device.
Figure 4:
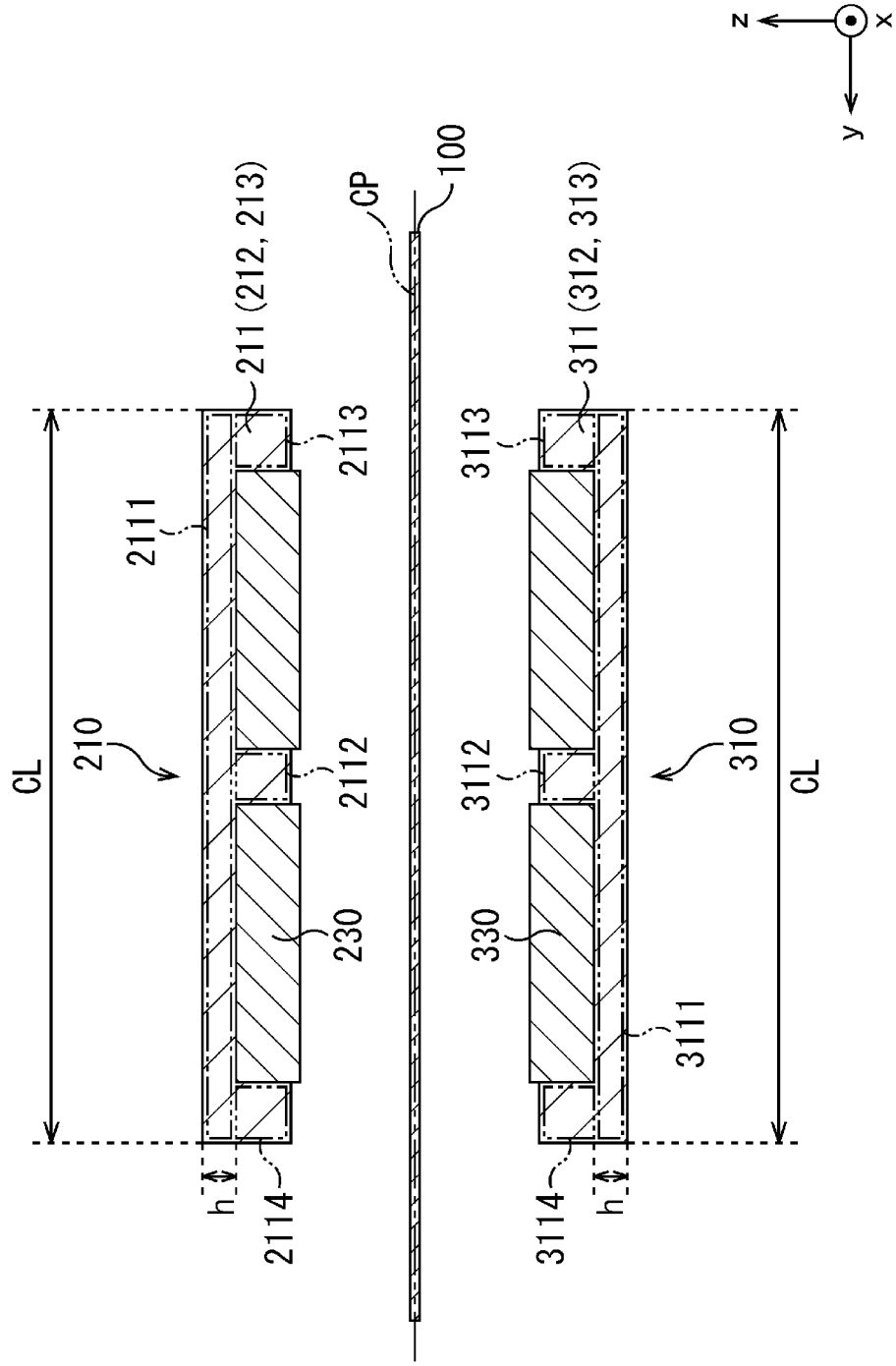
FIG. 4 is a view illustrating the first embodiment of the present invention, and illustrating one example of a third cross section of the induction heating device.

FIG. 2 is a view illustrating one example of a first cross section of the induction heating device. Concretely, FIG. 2 is a sectional view taken along I-I in FIG. 1. FIG. 3 is a view illustrating one example of a second cross section of the induction heating device. Concretely, FIG. 3 is a sectional view taken along II-II in FIG. 1. FIG. 4 is a view illustrating one example of a third cross section of the induction heating device. Concretely, FIG. 4 is a sectional view taken along III-III in FIG. 1.

In FIG. 2, the upper inductor 200 includes an original core 210, bridge cores 220*a* to 220*b*, a coil 230, shield plates 240*a* to 240*b*, cooling fins 260*a* to 260*h*, and cooling small pipes 270*a* to 270*h*. In the explanation below, a width direction of the induction heating device and the band-shaped steel sheet 100 will be referred to as an x-axis direction according to need. Further, in the explanation below, a direction parallel to the conveyance direction of the band-shaped steel sheet 100 (a longitudinal direction of the band-shaped steel sheet 100) will be referred to as a y-axis direction according to need. Further, in the explanation below, a facing direction of the upper inductor 200 and the lower inductor 300 (a thickness direction of the band-shaped steel sheet 100) will be referred to as a z-axis direction.

The coil 230 is a conductor having a circumferential portion. Note that FIG. 1 exemplifies a case where a portion with a thickness (a portion except for a straight line extended from an alternating-current power supply 400) corresponds to the circumferential portion of the coil 230. The circumferential portion of the coil 230 is arranged around the original core 210 in a racetrack form by passing through a slot of the original core 210, in the x-y plane. In the present embodiment, the coils 230, 330 are arranged to face each other with the planned conveyance plane CP interposed therebetween. Note that a direction in which the coil 230 arranged on the front side of the planned conveyance plane CP out of coils forming a pair of coils, and the coil 330 arranged on the rear side of the planned conveyance plane CP out of the coils forming the pair of coils face each other, is the above-described facing direction of the coils. Further, the x-y plane is a virtual plane parallel to the x-axis and the y-axis. The coil 230 is preferably arranged so that a direction perpendicular to the planned conveyance plane CP and a direction of axial center of the coil 230 are parallel to each other. Note that the axial center of the coil 230 is an axis around which the coil 230 is arranged. In the example illustrated in FIG. 1, the axial center of the coil 230 is parallel to the z-axis.

Note that the coil 230 may have an insulator arranged around the conductor. Further, a case where the number of turns of the coil 230 is one is exemplified here. However, the number of turns of the coil 230 may be two or more. The number of turns of the coil 230 and that of the coil 330 are preferably the same.

Further, in FIG. 2 to FIG. 4, a case is exemplified in which an end portion on the planned conveyance plane CP side of the coil 230 (an end portion in the z-axis direction of the coil 230 closest to the planned conveyance plane CP side) is positioned on the planned conveyance plane CP side relative to an end portion on the planned conveyance plane CP side of the original core 210 (an end portion in the z-axis direction of the original core 210 closest to the planned conveyance plane CP side). However, the position in the z-axis direction of the end portion on the planned conveyance plane CP side of the coil 230 and the position in the z-axis direction of the end portion on the planned conveyance plane CP side of the original core 210 may be the same, for example.

As illustrated in FIG. 2, the original core 210 has a main core 211, and edge cores 212, 213. The main core 211 and the edge cores 212, 213 are arranged in a state of having an interval therebetween in the x-axis direction.

The main core 211 is a ferromagnet arranged at a position closest to the center position in the x-axis direction of the induction heating device, out of the main core 211 and the edge cores 212, 213. The edge cores 212, 213 are ferromagnets arranged on end portion sides in the x-axis direction of the original core 210, relative to the main core 211. The edge cores 212, 213 have a plurality of partial edge cores 212a to 212d, 213a to 213d. The plurality of partial edge cores 212a to 212d, 213a to 213d are arranged in a state of having an interval therebetween in the x-axis direction. Further, the partial edge cores 212d, 213d at positions closest to the main core 211, out of the plurality of partial edge cores 212a to 212d, 213a to 213d, and the main core 211 are also arranged in a state of having an interval therebetween in the x-axis direction.

Here, a state where two partial edge cores have an interval therebetween does not mean only a state in which the two partial edge cores are not physically in contact with each other. For example, even if the two partial edge cores are partially in contact with each other, there may be created a state where a magnetic flux density in each partial edge core is reduced (a state where the magnetic flux density is reduced by 50% or more or reduced by 80% or more, or the like, for example), when compared to a case where a ferromagnet of a material same as that of the partial core exists between the two partial cores, due to insufficient magnetic coupling of the two partial edge cores. Such a state can also be regarded as a state where the two partial edge cores have an interval therebetween. Specifically, even in such a state, by using the later-described bridge core, the magnetic flux density in the partial edge core can be recovered to one nearly equal to the magnetic flux density in the main core.

The present embodiment exemplifies a case where the main core 211 is formed by a plurality of electromagnetic steel sheets laminated in the x-axis direction, each having the same thickness and the same planar shape. In like manner, the present embodiment exemplifies a case where the edge cores 212, 213 (the partial edge cores 212a to 212d, 213a to 213d) are formed by a plurality of electromagnetic steel sheets laminated in the x-axis direction, each having the same thickness and the same planar shape. Further, the present embodiment exemplifies a case where the thickness and the planar shape of the electromagnetic steel sheet forming the main core 211, and the thickness and the planar shape of the electromagnetic steel sheet forming the edge cores 212, 213 are the same. Further, the present embodiment exemplifies a case where the number of laminating of the electromagnetic steel sheets forming the main core 211, and the number of laminating of the electromagnetic steel sheets forming the edge cores 212, 213 (the partial edge cores 212a to 212d, 213a to 213d) are different. For example, when a length in the x-axis direction of the main core 211 and a length in the x-axis direction of the edge cores 212, 213 (the partial edge cores 212a to 212d, 213a to 213d) are different, the number of laminating of the electromagnetic steel sheets forming the main core 211 and the number of laminating of the electromagnetic steel sheets forming the edge cores 212, 213 (the partial edge cores 212a to 212d, 213a to 213d) are different, in accordance with the difference in lengths.

The plurality of electromagnetic steel sheets forming the main core 211 are fixed so as not to be separated from each other. The plurality of electromagnetic steel sheets forming each of the partial edge cores 212a to 212d, 213a to 213d, are also fixed so as not to be separated from each other. A method of fixing the plurality of electromagnetic steel sheets is unlimited. For example, publicly-known various methods such as fixing with an adhesive, fixing by welding, fixing by caulking, and fixing using a fixing member, are employed as the method of fixing the plurality of electromagnetic steel sheets. Note that the thickness and the planar shape of the electromagnetic steel sheet forming the main core 211, and the thickness and the planar shape of the electromagnetic steel sheet forming the edge cores 212, 213 are not necessarily the same. Further, for the convenience of notation, an illustration of boundary lines of individual electromagnetic steel sheets is omitted in FIG. 2. The present embodiment exemplifies a case where the main cores 211, 311, and the edge cores 212 to 213, 312 to 313 (the plurality of partial edge cores 212a to 212d, 213a to 213d, 312a to 312d, 313a to 313d) are used to form the partial cores.

As illustrated in FIG. 4, the main cores 211, 311 have body portions 2111, 3111, center leg portions 2112, 3112, upstream-side leg portions 2113, 3113, and downstream-side leg portions 2114, 3114. Note that for the convenience of explanation, in FIG. 4, the body portions 2111, 3111, the center leg portions 2112, 3112, the upstream-side leg portions 2113, 3113, and the downstream-side leg portions 2114, 3114 are indicated by a two-dot chain line (a virtual line; in each drawing, a two-dot chain line is a virtual line). FIG. 4 exemplifies a case where the body portion 2111, the center leg portion 2112, the upstream-side leg portion 2113, and the downstream-side leg portion 2114 are integrated. In like manner, FIG. 4 exemplifies a case where the body portion 3111, the center leg portion 3112, the upstream-side leg portion 3113, and the downstream-side leg portion 3114 are also integrated. Therefore, there are no boundary lines of the body portions 2111, 3111, the center leg portions 2112, 3112, the upstream-side leg portions 2113, 3113, and the downstream-side leg portions 2114, 3114.

The body portions 2111, 3111 are extended in a direction parallel to the conveyance direction (the y-axis direction) from regions on the upstream side in the conveyance direction (the y-axis negative direction side) of the coils 230, 330 to regions on the downstream side in the conveyance direction (the y-axis positive direction side) of the coils 230, 330, on the back side of the coils 230, 330, respectively. The back side of the coils 230, 330 corresponds to the opposite side of the planned conveyance plane CP side. In the example illustrated in FIG. 3 and FIG. 4, the back side of the coil 230 is the z-axis positive direction side, and the back side of the coil 330 is the z-axis negative direction side. In the explanation below, the upstream side of the conveyance direction will be referred to as an upstream side according to need. Further, the downstream side of the conveyance direction will be referred to as a downstream side according to need. Further, the opposite side of the planned conveyance plane CP side will be referred to as a back side according to need.

The center leg portions 2112, 3112 are extended in a direction of the planned conveyance plane CP from the body portions 2111, 3111 so as to pass through hollow portions of the coils 230, 330, respectively. Here, the hollow portion means (not the outside but) the inside of a circle when each of the coils 230, 330 arranged in a racetrack form is regarded as one circle. It is preferable that positions of the center leg portions 2112, 3112 in the y-axis direction include positions of axial centers of the coils 230, 330 in the y-axis direction. Specifically, coordinates that overlap with y-coordinates of the axial centers of the coils 230, 330 preferably exist in y-coordinates of the center leg portions 2112, 3112. The present embodiment exemplifies a case where positions in an x-y plane (x-y coordinates) of gravity centers of the center leg portions 2112, 3112, and positions in an x-y plane (x-y coordinates) of axial centers of the coils 230, 330 are coincident.

The upstream-side leg portions 2113, 3113 are extended in a direction of the planned conveyance plane CP from the body portions 2111, 3111, on the upstream side (the y-axis negative direction side) of the coils 230, 330, respectively.

The downstream-side leg portions 2114, 3114 are extended in a direction of the planned conveyance plane CP from the body portions 2111, 3111, on the downstream side (the y-axis positive direction side) of the coils 230, 330, respectively.

The center leg portion 2112, the upstream-side leg portion 2113, and the downstream-side leg portion 2114 are arranged in a state of having an interval therebetween in the y-axis direction. The center leg portion 3112, the upstream-side leg portion 3113, and the downstream-side leg portion 3114 are also arranged in a state of having an interval therebetween in the y-axis direction. The center leg portions 2112, 3112, the upstream-side leg portions 2113, 3113, and the downstream-side leg portions 2114, 3114 are core teeth. In the main cores 211, 311, tip surfaces of the center leg portions 2112, 3112, tip surfaces of the upstream-side leg portions 2113, 3113, and tip surfaces of the downstream-side leg portions 2114, 3114 are respectively pole faces. The body portions 2111, 3111 are core yokes. Note that the tip surfaces of the center leg portions 2112, 3112, the tip surfaces of the upstream-side leg portions 2113, 3113, and the tip surfaces of the downstream-side leg portions 2114, 3114 are surfaces that face the planned conveyance plane CP.

An outer shape of the entire cross section obtained by cutting the edge cores 212, 213, 312, 313 along the y-z plane, is the same as an outer shape of the entire cross section obtained by cutting the main cores 211, 311 along the y-z plane. In FIG. 4, (212, 213), (312, 313) given after 211, 311 mean this.

Therefore, the edge cores 212, 213, 312, 313 (the partial edge cores 212a to 212d, 213a to 213d, 312a to 312d, 313a to 313d) also have body portions, center leg portions, upstream-side leg portions, and downstream-side leg portions, similarly to the main cores 211, 311. A length of the body portion in the y-axis direction and the z-axis direction, a length of the center leg portion in the y-axis direction and the z-axis direction, a length of the upstream-side leg portion in the y-axis direction and the z-axis direction, and a length of the downstream-side leg portion in the y-axis direction and the z-axis direction are the same between the main cores 211, 311, and the partial edge cores 212a to 212d, 213a to 213d, 312a to 312d, 313a to 313d. On the other hand, a length of the body portion in the x-axis direction, a length of the center leg portion in the x-axis direction, a length of the upstream-side leg portion in the x-axis direction, and a length of the downstream-side leg portion in the x-axis direction of the main cores 211, 311 are longer than those of the partial edge cores 212a to 212d, 213a to 213d, 312a to 312d, 313a to 313d.

Further, an outer shape of the entire cross section obtained by cutting the bridge cores 220b, 320a to 320b along the y-z plane, is the same as an outer shape of the entire cross section obtained by cutting the bridge cores 220a, 320a along the y-z plane (refer to FIG. 3). In the explanation below, a cross section cut along the y-z plane will be referred to as a y-z cross section according to need.

As described above, each of a shape of a surface parallel to the y-z plane of the main core 211 and shapes of surfaces parallel to the y-z plane of the edge cores 212, 213 is an E-shape (refer to the outer shape of the main cores 211, 311 illustrated in FIG. 4). Specifically, the main core 211 and the edge cores 212, 213 are so-called E-shaped cores. However, as is clear from the outer shape of the main cores 211, 311 in FIG. 4, the present embodiment exemplifies a case where the length in the z-axis direction of the center leg portions 2112, 3112, the length in the z-axis direction of the upstream-side leg portions 2113, 3113, and the length in the z-axis direction of the downstream-side leg portions 2114, 3114 are the same. In such a case, the interval between the tip surfaces of the center leg portions 2112, 3112 and the planned conveyance plane CP, the interval between the tip surfaces of the upstream-side leg portions 2113, 3113 and the planned conveyance plane CP, and the interval between the tip surfaces of the downstream-side leg portions 2114, 3114 and the planned conveyance plane CP are the same.

Note that the interval between the tip surfaces of the center leg portions 2112, 3112 and the planned conveyance plane CP, the interval between the tip surfaces of the upstream-side leg portions 2113, 3113 and the planned conveyance plane CP, and the interval between the tip surfaces of the downstream-side leg portions 2114, 3114 and the planned conveyance plane CP may be different. For example, the interval between the tip surfaces of the center leg portions 2112, 3112 and the planned conveyance plane CP may be longer than the interval between the tip surfaces of the upstream-side leg portions 2113, 3113 and the tip surfaces of the downstream-side leg portions 2114, 3114, and the planned conveyance plane CP.

As illustrated in FIG. 1 and FIG. 2, a length in the x-axis direction of the circumferential portions of the coils 230, 330 is longer than the width of the band-shaped steel sheet 100. Concretely, the length in the x-axis direction of the circumferential portions of the coils 230, 330 is longer than a maximum processable width of the induction heating device. As a result of this, when seen from the z-axis direction, the coils 230, 330 have a length in the x-axis direction that is long enough to cover the maximum processable width of the induction heating device. Here, the maximum processable width of the induction heating device indicates a range in the x-axis direction in which even if the band-shaped steel sheet 100 with a maximum width capable of being heated by the induction heating device moves in the positive or negative direction of x-axis (due to meandering or the like), the band-shaped steel sheet 100 may exist in the range. Further, both ends in the x-axis direction of the circumferential portions of the coils 230, 330 exist on the outer side of both ends in the x-axis direction of the band-shaped steel sheet 100 (namely, both ends of the above-described maximum processable width of the induction heating device). Specifically, the ends on the x-axis positive direction side of the circumferential portions of the coils 230, 330 exist on the x-axis positive direction side, relative to the end on the x-axis positive direction side of the band-shaped steel sheet 100 (namely, the above-described maximum processable width of the induction heating device). Further, the ends on the x-axis negative direction side of the circumferential portions of the coils 230, 330 exist on the x-axis negative direction side, relative to the end on the x-axis negative direction side of the band-shaped steel sheet 100 (namely, the above-described maximum processable width of the induction heating device).

As illustrated in FIG. 1, the alternating-current power supply 400 is electrically connected to the coils 230, 330. As illustrated in FIG. 1, in the present embodiment, one end portion 231 of the circumferential portion of the coil 230 is electrically connected to one terminal 401 out of two output terminals of the alternating-current power supply 400. Further, the other end portion 232 of the circumferential portion of the coil 230 is electrically connected to the other terminal 402 out of the two output terminals of the alternating-current power supply 400.

Further, out of two end portions of the circumferential portion of the coil 330, one end portion 331 at a position facing the one end portion 231 of the circumferential portion of the coil 230 in the z-axis direction is electrically connected to one terminal 401 out of two output terminals of the alternating-current power supply 400. Further, out of the two end portions of the circumferential portion of the coil 330, the other end portion 332 at a position facing the other end portion 232 of the circumferential portion of the coil 230 in the z-axis direction is electrically connected to the other terminal 402 out of the two output terminals of the alternating-current power supply 400.

As described above, in the present embodiment, the coil 230 and the coil 330 are connected in parallel to the alternating-current power supply 400 so that the winding directions of the coil 230 and the coil 330 are mutually the same when seen from the alternating-current power supply 400.

Therefore, as illustrated in FIG. 1, when seen from the same viewpoint at the same time, directions of alternating currents flowing through the mutually facing regions of the coil 230 and the coil 330 are mutually the same (refer to arrow mark lines indicated in the coil 230 and the coil 330 in FIG. 1).

The arrow mark lines indicated in the coil 230 and the coil 330 in FIG. 1 mean that when the induction heating device is viewed from above, the direction of the alternating current flowing through the coil 230 is clockwise (right-handed), and the direction of the alternating current flowing through the coil 330 is clockwise (right-handed).

Here, instantaneous values of the alternating currents flowing through the coil 230 and the coil 330 from the alternating-current power supply 400 are respectively the same. Note that a waveform of the alternating current is a sine wave, for example. However, the waveform of the alternating current is not limited to the sine wave. The waveform of the alternating current may be a waveform same as one capable of being used in a general induction heating device.

As described above, the coils 230, 330 are arranged on the front side and the rear side, respectively, of the planned conveyance plane CP so that alternating magnetic fields generated through energization of the alternating currents in mutually the same direction intersect the planned conveyance plane CP of the band-shaped steel sheet 100. The present embodiment exemplifies a case where the two coils 230, 330 form a pair of coils. One of the coils forming the pair of coils is the coil 230, and the other coil forming the pair of coils is the coil 330.

Note that as long as the alternating currents as above flow through the coil 230 and the coil 330, there is no need to connect one alternating-current power supply to the coils 230, 330, as illustrated in FIG. 1. For example, the alternating-current power supply connected to the coil 230 and the alternating-current power supply connected to the coil 330 may be separate alternating-current power supplies as long as frequencies of currents that flow from those alternating-current power supplies are synchronized.

Further, the present embodiment exemplifies a case where the number of coil arranged on the front side of the planned conveyance plane CP out of the coils forming the pair of coils provided to the induction heating device, and the number of coil arranged on the rear side of the planned conveyance plane CP out of the coils forming the pair of coils, are respectively one. However, the number of coil arranged on the front side of the planned conveyance plane CP out of the coils forming the pair of coils provided to the induction heating device, and the number of coil arranged on the rear side of the planned conveyance plane CP out of the coils forming the pair of coils, may be respectively two or more. For example, on the front side of the planned conveyance plane CP, two or more coils may be arranged in a state of having an interval therebetween in the y-axis direction. In like manner, for example, on the rear side of the planned conveyance plane CP, two or more coils may be arranged in a state of having an interval therebetween in the y-axis direction. Through the two or more coils arranged on the front side of the planned conveyance plane CP, out of the coils forming the pair of coils provided to the induction heating device, an alternating current in a direction same as that of the current flowing through the coil 230 flows, for example. In this case, through the two or more coils arranged on the rear side of the planned conveyance plane CP, out of the coils forming the pair of coils, an alternating current in a direction same as that of the current flowing through the coil 330 flows, for example.

In FIG. 2, the cooling fins 260a, 260b, 260c, 260d are arranged between the partial edge cores 212a and 212b, between the partial edge cores 212b and 212c, between the partial edge cores 212c and 212d, and between the partial edge core 212d and the main core 211, respectively. In like manner, the cooling fins 260e, 260f, 260g, 260h are arranged between the partial edge cores 213a and 213b, between the partial edge cores 213b and 213c, between the partial edge cores 213c and 213d, and between the partial edge core 213d and the main core 211, respectively. Note that the present embodiment exemplifies a case where the intervals between these are fixed (not changed). However, the intervals between these may be changeable. Further, lengths in the x-axis direction of the respective partial edge cores 212a to 212d, 213a to 213d may be the same or different from each other.

Each of the cooling fins 260a to 260h is one example of a cooling member for cooling the main core 211 and the partial edge cores 212a to 212d, 213a to 213d. The present embodiment exemplifies a case where the cooling fins 260a to 260h are fin-shaped non-magnetic conductor plates. The cooling fins 260a to 260h are formed by copper plates, for example.

Onto the cooling fins 260a to 260h, the cooling small pipes 270a to 270h are attached. Each of the cooling small pipes 270a to 270h is one example of a cooling member for cooling the main core 211, the partial edge cores 212a to 212d, 213a to 213d, and the bridge cores 220a, 220b. The present embodiment exemplifies a case where the cooling small pipes 270a to 270h are non-magnetic conductor pipes.

The cooling fins 260a to 260h, and the cooling small pipes 270a to 270h attached onto the cooling fins are in contact with each other. Further, in FIG. 3 and FIG. 4, a case is exemplified in which an outer shape of the entire y-z cross section of a region combining the cooling fins 260a to 260h and the cooling small pipes 270a to 270h, is the same as an outer shape of a y-z cross section of the original core 210 (the main core 211 and the partial edge cores 212a to 212d, 213a to 213d). Specifically, in FIG. 3 and FIG. 4, a case is exemplified in which a shape and a size of the entire region of the cooling fin 260a and the cooling small pipe 270a in FIG. 3 are the same as a shape and a size of a region of the main core 211 in FIG. 4.

Into the cooling small pipes 270a to 270h, a cooling medium such as cooling water is supplied. Heat conduction to the cooling medium is performed from the partial edge cores 212a to 212d, 213a to 213d, and the like, via the cooling small pipes 270a to 270h and the cooling fins 260a to 260h. Therefore, the cooling of the partial edge cores 212a to 212d, 213a to 213d, and the like, is accelerated.

Each of the shield plates 240a, 240b is one example of a shield member for preventing overheating of the edge portion of the band-shaped steel sheet 100 by adjusting (reducing) the degree of electromagnetic coupling between the coil 230 and the band-shaped steel sheet 100. Concretely, the shield plates 240a, 240b are non-magnetic conductor plates arranged between the edge portions of the band-shaped steel sheet 100 and the partial edge cores 212a to 212d, 213a to 213d, in a state of having an interval with respect to these. A length in the y-axis direction of the shield plates 240a to 240b is preferably longer than the length in the y-axis direction of the original core 210. Further, upstream-side end portions of the shield plates 240a, 240b are preferably positioned on the upstream side of the upstream-side end of the original core 210. In like manner, downstream-side end portions of the shield plates 240a, 240b are preferably positioned on the downstream side of the downstream-side end of the original core 210 (refer to FIG. 3).

The shield plates 240a to 240b may move along the x-axis direction within their movable ranges. The shield plates 240a, 240b may move in accordance with the width of the band-shaped steel sheet 100 so that they position between the edge portions of the band-shaped steel sheet 100 and the partial edge cores 212a to 212d, 213a to 213d. Further, the shield plates 240a, 240b may move along the x-axis direction when the band-shaped steel sheet 100 meanders. For example, the shield plates 240a, 240b may move along the x-axis direction (a direction in which the band-shaped steel sheet 100 meanders), by an amount same as a meandering amount of the band-shaped steel sheet 100.

Note that a configuration for moving the shield plates 240a to 240b along the x-axis direction is realized by a publicly-known technique using an actuator for moving the shield plates 240a to 240b along the x-axis direction, for example. Therefore, a detailed explanation of the configuration will be omitted here. Further, a configuration for detecting a meandering amount of sheet is also realized by a publicly-known technique using a sensor that detects a position of an end portion in the x-axis direction of the sheet. Therefore, a detailed explanation of the configuration will be omitted here. As these publicly-known techniques, there is a technique described in Japanese Patent No. 6658977, for example. Further, when the meandering amount of the band-shaped steel sheet 100 is an order of cm (less than 10 cm, for example), it is preferable to move only the shield plates 240a, 240b in the x-axis direction. When the meandering amount of the band-shaped steel sheet 100 exceeds the order of cm (10 cm or more, for example), it is preferable to move the entire induction heating device (the upper inductor 200 and the lower inductor 300) in the x-axis direction. For example, the entire induction heating device (the upper inductor 200 and the lower inductor 300) may be moved along the x-axis direction (the direction in which the band-shaped steel sheet 100 meanders) by an amount same as the meandering amount of the band-shaped steel sheet 100.

By magnetic fields based on eddy currents flowing through the shield plates 240a, 240b, the temperature of the main core 211 and the temperatures of the edge cores 212, 213 are the highest in the vicinity of an upper part of end portions on the sheet center side of the induction heating device, out of end portions in the x-axis direction of the shield plates 240a, 240b. Accordingly, in the present embodiment, a case is exemplified in which a position in the x-axis direction (x-coordinate) of the main core 211 and positions in the x-axis direction of the edge cores 212, 213 are determined as follows.

Gap regions in the x-axis direction formed in the main core 211 and the edge cores 212, 213 will be referred to as core gap regions. The present embodiment exemplifies a case where the core gap regions are regions in which the cooling fins 260a to 260h and the cooling small pipes 270a to 270h are arranged. In the present embodiment, a case is exemplified in which the position in the x-axis direction of the main core 211 and the positions in the x-axis direction of the partial edge cores 212a to 212d, 213a to 213d are determined so that when the shield plates 240a, 240b are moved, within the movable ranges thereof in the x-axis direction, to positions closest to the center position in the x-axis direction of the induction heating device, sheet center-side end portions of the core gap regions on the most sheet center side out of the core gap regions that exist at positions facing the bridge cores 220a, 220b are arranged on the inner side (sheet center side) relative to the shield plates 240a, 240b. In FIG. 2, a case is exemplified in which the sheet center-side end portions of the core gap regions on the most sheet center side out of the core gap regions that exist at the positions facing the bridge cores 220a, 220b, are sheet center-side end portions of the cooling fins 260d, 260h.

The position in the x-axis direction of the main core 211 and the positions in the x-axis direction of the partial edge cores 212a to 212d, 213a to 213d are determined as described above, which enables to make regions between the main core 211 and the partial edge cores 212a to 212d, 213a to 213d to be positioned close to the above-described region where the temperatures of the main core 211 and the edge cores 212, 213 are high. Therefore, it is possible to reduce the temperature of the above-described region where the temperatures of the main core 211 and the edge cores 212, 213 are high. Further, when the cooling fins 260a to 260h and the cooling small pipes 270a to 270h are arranged in the regions between the main core 211 and the partial edge cores 212a to 212d, 213a to 213d, as in the present embodiment, it is possible to further reduce the temperature of the above-described region where the temperatures of the main core 211 and the edge cores 212, 213 are high.

Here, the sheet center side indicates a side close to the center position in the x-axis direction of the induction heating device. On the x-axis positive direction side relative to the center in the x-axis direction of the induction heating device, the sheet center side is the x-axis negative direction side. On the other hand, on the x-axis negative direction side relative to the center in the x-axis direction of the induction heating device, the sheet center side is the x-axis positive direction side. For example, in FIG. 2, the position in the x-axis direction of the main core 211 and the positions in the x-axis direction of the partial edge cores 212a to 212d, 213a to 213d are determined so that when the shield plate 240a is moved to the most x-axis negative direction side within the movable range thereof, the end portion on the x-axis negative direction side of the cooling fin 260d is positioned on the x-axis negative direction side relative to the end portion on the x-axis negative direction side of the shield plate 240a.

The bridge cores 220a, 220b are ferromagnets capable of being magnetically coupled to at least one core out of the main core 211 and the partial edge cores 212a to 212d, 213a to 213d. Note that at least one core out of the main core 211 and the partial edge cores 212a to 212d, 213a to 213d, indicates only the main core, only one or more partial edge cores, or the main core and one or more partial edge cores.

Here, when two cores can be magnetically coupled, this means that when the alternating currents flow through the coils provided to the induction heating device and by which the two cores are excited, the two cores are magnetically coupled. When the alternating currents do not flow through the coils provided to the induction heating device, the two cores are not magnetically coupled. When two cores are magnetically coupled, this means that a spin-spin coupling between a constituent atom of one core out of the two cores and a constituent atom of the other core occurs. In order to briefly check whether two cores are magnetically coupled or not, it is possible to regard that the two cores are magnetically coupled in the following case. Specifically, when a ratio of a magnetic flux density of a core, out of the two cores, with a lower density of magnetic flux generated in the core to a magnetic flux density of a core with a higher density of magnetic flux generated in the core is 0.2 or more, it is possible to regard that the two cores are magnetically coupled. The ratio is a design objective of the device, which is decided by a designer when designing the induction heating device. The ratio may be set to 0.2 as described above, but may also be set to 0.3 or more, 0.4 or more, 0.5 or more, or 0.6 or more, according to need.

The bridge cores 220a, 220b are required to be arranged on the back side of the partial cores (in the present embodiment, the main core 211 and the partial edge cores 212a to 212d, 213a to 213d). Reasons thereof will be explained below.

Even if the bridge cores 220a, 220b are arranged on the partial cores (in the present embodiment, the main core 211 and the partial edge cores 212a to 212d, 213a to 213d) on the side where the planned conveyance plane CP exists, the bridge cores 220a, 220b and the partial cores can be magnetically coupled. However, if the bridge cores 220a, 220b and the partial cores are arranged in a manner as above, at least a part of the magnetic flux that should penetrate the band-shaped steel sheet 100, penetrates the bridge cores 220a, 220b. Consequently, the band-shaped steel sheet 100 cannot be heated sufficiently. Further, if the bridge cores 220a, 220b are arranged on side surfaces (side surfaces on the upstream side or the downstream side, or side surfaces in the x-axis direction) of the partial cores (in the present embodiment, the main core 211 and the partial edge cores 212a to 212d, 213a to 213d), the degree of magnetic coupling between the bridge cores 220a, 220b and the partial cores is relatively small. As a result of this, the effect of recovering the magnetic flux density in the partial edge cores 212a to 212d, 213a to 213d, which is reduced due to the separation of the partial edge cores 212a to 212d, 213a to 213d in the x-axis direction, to one nearly equal to the magnetic flux density in the main core 211 with the use of the bridge cores 220a, 220b, also is small. Besides, if the bridge cores 220a, 220b are arranged on the side surfaces of the partial cores, at least a part of the magnetic flux that should penetrate the band-shaped steel sheet 100 penetrates the bridge cores 220a, 220b. Consequently, it is sometimes impossible to sufficiently heat the band-shaped steel sheet 100, or a temperature gradient is likely to be generated in the band-shaped steel sheet 100 in the width direction (the x-axis direction) in some cases.

From the above, the bridge cores 220a, 220b are required to be arranged on the back side of the partial cores.

The present embodiment exemplifies a case where the bridge cores 220a, 220b contain soft magnetic ferrite being one example of ferromagnet having isotropy on magnetization direction. Further, the present embodiment exemplifies a case where the bridge core 220a can be magnetically coupled to the main core 211 and the partial edge cores 212a to 212d, and the bridge core 220b can be magnetically coupled to the main core 211 and the partial edge cores 213a to 213d. In this case, the partial edge cores 212a to 212d and the partial edge cores 213a to 213d can also be magnetically coupled via the bridge cores 220a, 220b and the main core 211. Specifically, all cores forming the original core 210 (the main core 211 and the partial edge cores 212a to 212d, 213a to 213d) can be magnetically coupled via the bridge cores 220a, 220b.

Since the main core 211 and the edge cores 212, 213 are magnetically coupled via the bridge cores 220a, 220b, an inductance of the induction heating device that includes the bridge cores 220a, 220b, is larger than an inductance of the induction heating device that does not include the bridge cores 220a, 220b. As described above, the bridge cores 220a, 220b, the main core 211, and the edge cores 212, 213 can be magnetically coupled.

When the bridge cores 220a, 220b do not exist, the main core 211 and the partial edge cores 212a to 212d, 213a to 213d are sectioned by the regions between the main core 211 and the partial edge cores 212a to 212d, 213a to 213d (in the present embodiment, the cooling fins 260a to 260h). Therefore, the magnetic flux density in each of the partial edge cores 212a to 212d, 213a to 213d is small. On the contrary, in the present embodiment, such a small magnetic flux density can be increased by using the bridge cores 220a, 220b. For example, by using the bridge cores 220a, 220b, the magnetic flux density in each of the partial edge cores 212a to 212d, 213a to 213d can be recovered to one nearly equal to the magnetic flux density in the main core 211. For example, the magnetic flux density in each of the partial edge cores 212a to 212d, 213a to 213d is preferably 0.75 times or more the magnetic flux density in the main core 211, and more preferably 0.9 times or more the magnetic flux density in the main core 211. However, the main core 211 and the partial edge cores 212a to 212d, 213a to 213d are only required to be magnetically coupled, as described above.

As illustrated in FIG. 2, the bridge cores 220a, 220b are arranged on both sides in the x-axis direction in a state of having an interval therebetween. Further, FIG. 2 exemplifies a case where, when seen from the z-axis direction, the bridge cores 220a, 220b are arranged so as to be overlapped with a part of the main core 211. Further, FIG. 2 exemplifies a case where, when seen from the z-axis direction, the bridge cores 220a, 220b are respectively arranged so as to be overlapped with at least a part of the partial edge cores 212a to 212d, 213a to 213d, respectively.

Here, one example of the arrangement of the bridge cores 220a, 220b in the present embodiment will be explained more concretely while referring to FIG. 2. An end surface on the planned conveyance plane CP side (lower surface) of the bridge core 220a is in contact with a part on the back side (upper surface) of the main core 211, all of end surfaces on the back side (upper surfaces) of the partial edge cores 212a to 212d arranged on the x-axis positive direction side (one side) of the main core 211, and end portions on the back side (upper end portions) of the cooling small pipes 270a to 270d. Further, an end surface on the planned conveyance plane CP side (lower surface) of the bridge core 220b is in contact with a part of an end surface on the back side (upper surface) of the main core 211, all of end surfaces on the back side (upper surfaces) of the partial edge cores 213a to 213d arranged on the x-axis negative direction side (the other side) of the main core 211, and end portions on the back side (upper end portions) of the cooling small pipes 270e to 270h.

However, if the bridge cores 220a, 220b, and the main core 211 and the edge cores 212, 213 can be magnetically coupled, it is possible that there is no contact between the bridge cores 220a, 220b, and the main core 211, the edge cores 212, 213, and the cooling small pipes 270a to 270h. For example, the bridge cores 220a, 220b may be arranged in a state of having an interval with respect to the main core 211 and the edge cores 212, 213. Further, the bridge cores 220a, 220b may be in contact with or face while having an interval with respect to only either of the main core 211 and the edge cores 212, 213. Further, the bridge cores 220a, 220b may be in contact with or face while having an interval with respect to a part of region of at least one partial edge core out of the partial edge cores 212a to 212d, 213a to 213d.

The bridge cores 220a, 220b are preferably arranged as follows.

In FIG. 2, sheet center-side lapped lengths L of the bridge cores 220a, 220b are lengths in the x-axis direction of portions where the main core 211 and the edge cores 212, 213, and the bridge cores 220a, 220b are overlapped, in a region on the sheet center side relative to the core gap regions on the most sheet center side out of the core gap regions that exist at positions facing the bridge cores 220a, 220b, when seen from the z-axis direction. FIG. 2 exemplifies a case where the region on the sheet center side relative to the core gap regions on the most sheet center side out of the core gap regions that exist at the positions facing the bridge cores 220a, 220b, corresponds to a region of the main core 211.

The sheet center-side lapped length L of each of the bridge cores 220a, 220b is preferably set to a length α or more, and is more preferably a length β or more. This is because the magnetic coupling between the partial edge cores 212a to 212d, 213a to 213d, and the main core 211 via the bridge cores 220a, 220b can be securely realized. For example, in FIG. 2, it is preferable that the end portion on the x-axis negative direction side of the bridge core 220a is arranged at a position on the x-axis negative direction side relative to the end portion on the x-axis negative direction side of the cooling fin 260d, so that the sheet center-side lapped length L of the bridge core 220a is the length α or more. Further, it is more preferable that the end portion on the x-axis negative direction side of the bridge core 220a is arranged at a position on the x-axis negative direction side relative to the end portion on the x-axis negative direction side of the cooling fin 260d, so that the sheet center-side lapped length L of the bridge core 220a is the length β or more.

The length α and the length β can be obtained from results of publicly-known electromagnetic field analysis (numerical analysis) using mathematical expressions, a finite element method, and the like, for example. However, it is also possible to simply determine the length α and the length β in the following manner. Specifically, a minimum value of lengths in the x-axis direction of the cores except for the main core 211 that is arranged on the most sheet center side, out of the main core 211 and the partial edge cores 212a to 212d, 213a to 213d (namely, the partial edge cores 212a to 212d) may be set to the length α, and a maximum value of the lengths may be set to the length β. In FIG. 2, for example, the cores overlapped with the bridge core 220a when seen from the z-axis direction are the main core 211 and the partial edge cores 212a to 212d. A minimum value of lengths $L_1$ to $L_4$ in the x-axis direction of the partial edge cores 212a to 212d as a result of excluding the main core 211 that is arranged on the most sheet center side, from the main core 211 and the partial edge cores 212a to 212d, is the length $L_3$ ($=L_2=L_1$) in the x-axis direction of the partial edge cores 212b to 212d, and a maximum value of the lengths is the length $L_4$ in the x-axis direction of the partial edge core 212a. Therefore, the sheet center-side lapped length L of the bridge core 220a is preferably set to equal to or more than the minimum value of the lengths in the x-axis direction of the partial edge cores 212a to 212d (namely, the length $L_3$ ($=L_2=L_1$) in the x-axis direction of the partial edge cores 212b to 212d), and more preferably set to equal to or more than the maximum value of the lengths $L_1$ to $L_4$ in the x-axis direction of the partial edge cores 212a to 212d (namely, the length $L_4$ in the x-axis direction of the partial edge core 212a). In like manner, the sheet center-side lapped length L of the bridge core 220b is preferably set to equal to or more than the minimum value of the lengths in the x-axis direction of the partial edge cores 213a to 213d (namely, the length $L_3$ (=$L_2$=$L_1$) in the x-axis direction of the partial edge cores 213b to 213d), and more preferably set to equal to or more than the maximum value of the lengths $L_1$ to $L_4$ in the x-axis direction of the partial edge cores 213a to 213d (namely, the length $L_4$ in the x-axis direction of the partial edge core 213a).

The length α is a length to be a lower limit of a preferable range of the sheet center-side lapped lengths L of the bridge cores 220a, 220b, and the like. As a method of simply determining the length α, it has been already described that the minimum value of the lengths in the x-axis direction of the cores except for the main core 211 (namely, the partial edge cores 212a to 212d, 213a to 213d) may be set to a. However, the length in the x-axis direction of the main core 211 is larger than the length in the x-axis direction of the partial edge cores 212a to 212d, 213a to 213d, so that in a case of simply determining the length α, there is no need to exclude the main core 211. Accordingly, in a case of simply determining the length α in an embodiment as in FIG. 8 to be described later, a minimum value of lengths in the x-axis direction of partial cores separated in the x-axis direction (namely, partial original cores 710a to 710f in FIG. 8) may be set to α.

On the other hand, an upper limit value of the sheet center-side lapped length L of each of the bridge cores 220a, 220b is not required to be defined in particular.

Further, in FIG. 2, sheet end-side lapped lengths L' of the bridge cores 220a, 220b are lengths in the x-axis direction of overlapped portions between the partial edge cores 212a, 213a arranged on the most sheet end side out of the main core 211 and the partial edge cores 212a to 212d, 213a to 213d, and the bridge cores 220a, 220b, when seen from the z-axis direction. The sheet end-side lapped length L' of each of the bridge cores 220a, 220b is preferably set to the length α or more. The sheet end-side lapped length L' of each of the bridge cores 220a, 220b may also be the length β or more, for example.

Further, there is no need to prevent the end portion on the sheet end side of the bridge core 220a or 220b from protruding toward the sheet end side (outer side) relative to the end portion on the sheet end side of the partial edge core 212a or 213a. However, basically, there is no necessity for the end portion on the sheet end side of the bridge core 220a or 220b to protrude toward the sheet end side (outer side) relative to the end portion on the sheet end side of the partial edge core 212a or 213a. This is because an effect of improving the magnetic flux density of cores obtained by the portion protruded toward the sheet end side (an effect of recovering the magnetic flux density in the partial edge cores 212a to 212d, 213a to 213d, which is reduced due to the separation of the partial edge cores 212a to 212d, 213a to 213d in the x-axis direction, to one nearly equal to the magnetic flux density in the main core 211 with the use of the bridge cores 220a, 220b) is relatively small. Here, the sheet end side is the opposite side of the sheet center side. The end portion on the sheet end side of the bridge core 220a and the end portion on the sheet end side of the edge core 212a are end portions on the x-axis positive direction side. The end portion on the sheet end side of the bridge core 220b and the end portion on the sheet end side of the edge core 213a are end portions on the x-axis negative direction side. On the x-axis positive direction side relative to the center in the x-axis direction of the induction heating device, the sheet end side is the x-axis positive direction side. On the other hand, on the x-axis negative direction side relative to the center in the x-axis direction of the induction heating device, the sheet end side is the x-axis negative direction side.

Further, a height (length in the z-axis direction) H of the bridge cores 220a, 220b is preferably 0.5 times or more a smaller length out of lengths h and α (equal to or more than a smaller value out of 0.5×h and 0.5×α). This is because the magnetic coupling between the partial edge cores 212a to 212d, 213a to 213d, and the main core 211 via the bridge cores 220a, 220b can be securely realized. Further, a thickness (length in the z-axis direction) H of the bridge cores 220a, 220b is more preferably 1.0 time or more a smaller length out of the lengths h and α (equal to or more than a smaller value out of h and α). This is because the partial edge cores 212a to 212d, 213a to 213d, and the main core 211 are magnetically coupled more firmly via the bridge cores 220a, 220b. Although an upper limit of the thickness (length in the z-axis direction) H of the bridge cores 220a, 220b is not required to be defined in particular, it may be set to 2.0 times a larger length out of the lengths h and α (a larger value out of 2.0×h and 2.0×α) or 1.0 time a smaller length out of the lengths h and α (a smaller value out of h and α).

Here, as illustrated in FIG. 2 to FIG. 4, the length h is a length in the z-axis direction of a region of the main core 211 and the edge cores 212, 213, on the back side of the coil 230 arranged in the main core 211 and the edge cores 212, 213.

Further, a ratio of a length BL in the y-axis direction of the bridge cores 220a, 220b to a length CL in the y-axis direction of the main core 211 and the partial edge cores 212a to 212d, 213a to 213d (=BL/CL) is preferably 0.2 or more. This is because the magnetic coupling between the partial edge cores 212a to 212d, 213a to 213d, and the main core 211 via the bridge cores 220a, 220b can be securely realized. Further, from a viewpoint of making the partial edge cores 212a to 212d, 213a to 213d, and the main core 211 to be magnetically coupled firmly via the bridge cores 220a, 220b, the ratio of the length BL in the y-axis direction of the bridge cores 220a, 220b to the length CL in the y-axis direction of the main core 211 and the partial edge cores 212a to 212d, 213a to 213d (=BL/CL) is more preferably greater than 0.5, or 0.6 or more. Although an upper limit of the ratio (=BL/CL) is not required to be defined in particular, it may be set to 1.0 or 0.8.

Further, positions in the y-axis direction of upstream-side end portions of the main core 211 and the partial edge cores 212a to 212d, 213a to 213d may match positions in the y-axis direction of upstream-side (y-axis negative direction side) end portions of the bridge cores 220a, 220b. Further, the upstream-side end portions of the main core 211 and the partial edge cores 212a to 212d, 213a to 213d are preferably positioned on the upstream side of the upstream-side end portions of the bridge cores 220a, 220b, or the positions thereof are preferably the same. The upstream-side end portions of the main core 211 and the partial edge cores 212a to 212d, 213a to 213d may be positioned on the upstream side of the upstream-side end portions of the bridge cores 220a, 220b. However, the effect of improving the magnetic flux density of cores (the effect of recovering the magnetic flux density in the partial edge cores 212a to 212d, 213a to 213d, which is reduced due to the separation of the partial edge cores 212a to 212d, 213a to 213d in the x-axis direction, to one nearly equal to the magnetic flux density in the main core 211 with the use of the bridge cores 220a, 220b) is relatively small. Accordingly, there is no necessity for the upstream-side end portions of the bridge cores 220a, 220b to protrude toward the upstream side relative to the upstream-side end portions of the main core 211 and the partial edge cores 212*a* to 212*d*, 213*a* to 213*d*. In like manner, positions in the y-axis direction of downstream-side (y-axis positive direction side) end portions of the main core 211 and the partial edge cores 212*a* to 212*d*, 213*a* to 213*d* may match positions in the y-axis direction of downstream-side end portions of the bridge cores 220*a*, 220*b*. Further, the downstream-side end portions of the main core 211 and the partial edge cores 212*a* to 212*d*, 213*a* to 213*d* may be positioned on the downstream side of the downstream-side end portions of the bridge cores 220*a*, 220*b*. The downstream-side end portions of the main core 211 and the partial edge cores 212*a* to 212*d*, 213*a* to 213*d* may be positioned on the upstream side of the downstream-side end portions of the bridge cores 220*a*, 220*b*. However, the effect of improving the magnetic flux density of cores (the effect of recovering the magnetic flux density in the partial edge cores 212*a* to 212*d*, 213*a* to 213*d*, which is reduced due to the separation of the partial edge cores 212*a* to 212*d*, 213*a* to 213*d* in the x-axis direction, to one nearly equal to the magnetic flux density in the main core 211 with the use of the bridge cores 220*a*, 220*b*) is relatively small. Accordingly, there is no necessity for the downstream-side end portions of the bridge cores 220*a*, 220*b* to protrude toward the downstream side relative to the downstream-side end portions of the main core 211 and the partial edge cores 212*a* to 212*d*, 213*a* to 213*d*.

Further, when the upstream-side end portions of the bridge cores 220*a*, 220*b* are not positioned on the upstream side of the upstream-side end portions of the main core 211 and the partial edge cores 212*a* to 212*d*, 213*a* to 213*d*, and the downstream-side end portions of the bridge cores 220*a*, 220*b* are not positioned on the downstream side of the downstream-side end portions of the main core 211 and the partial edge cores 212*a* to 212*d*, 213*a* to 213*d*, center positions in the y-axis direction of the bridge cores 220*a*, 220*b*, and center positions in the y-axis direction of the main core 211 and the partial edge cores 212*a* to 212*d*, 213*a* to 213*d* may be coincident.

There is no need to prevent the bridge cores 220*a*, 220*b* from protruding outward relative to a region connecting end portions on both sides in the x-axis direction (sheet end-side end portions) and end portions on both sides of the upstream side and the downstream side in the y-axis direction of the main core 211 and the partial edge cores 212*a* to 212*d*, 213*a* to 213*d*, when the induction heating device is seen from the z-axis direction. However, basically, there is no necessity for the bridge cores 220*a*, 220*b* to protrude outward relative to the region connecting these end portions. This is because the effect of improving the magnetic flux density of cores obtained by the protruding portions of the bridge cores 220*a*, 220*b* (the effect of recovering the magnetic flux density in the partial edge cores 212*a* to 212*d*, 213*a* to 213*d*, which is reduced due to the separation of the partial edge cores 212*a* to 212*d*, 213*a* to 213*d* in the x-axis direction, to one nearly equal to the magnetic flux density in the main core 211 with the use of the bridge cores 220*a*, 220*b*) is relatively small.

Note that values themselves of the lengths of the respective parts of the induction heating device including the lengths h, $L_1$ to $L_4$, BL, and CL are determined as follows, for example. Specifically, under a plurality of conditions with different values of lengths of the respective parts of the induction heating device, a simulation test that simulates performance of induction heating of the band-shaped steel sheet 100 or electromagnetic field analysis is performed in the induction heating device. Subsequently, from, out of results of the simulation test or the electromagnetic field analysis, results capable of obtaining a desired temperature distribution as a temperature distribution in the x-axis direction of the band-shaped steel sheet 100, values of lengths of the respective parts of the induction heating device are decided. Note that when the induction heating device includes a part whose length is restricted due to an installation space or the like, the value of the length of the part is determined to meet the restriction. For example, the size, the shape, and the position of the bridge cores 220*a*, 220*b* are decided so as not to influence on movement of the other members such as the coil 230, and the shield plates 240*a*, 240*b*.

As described above, the present embodiment exemplifies a case where the bridge cores 220*a*, 220*b* are cores separate from the main core 211 and the edge cores 212, 213. Therefore, the bridge cores 220*a*, 220*b* have boundary lines at boundaries with the main core 211 and the edge cores 212, 213, as illustrated in FIG. 1 and FIG. 2.

Note that in above explanation, the positions of the respective parts except for the shield plates 240*a*, 240*b*, out of the respective parts of the upper inductor 200, are preferably fixed.

Similarly to the upper inductor 200, the lower inductor 300 also includes an original core 310 including a main core 311 and edge cores 312, 313 (partial edge cores 312*a* to 312*d*, 313*a* to 313*d*), bridge cores 320*a*, 320*b*, a coil 330, shield plates 340*a*, 340*b*, cooling fins 360*a* to 360*h*, and cooling small pipes 370*a* to 370*h*, and has a configuration same as that of the upper inductor 200.

The present embodiment exemplifies a case where the cores arranged by a set for each coil forming the pair of coils are formed by the original core 210 and the bridge cores 220*a*, 220*b*, and the original core 310 and the bridge cores 320*a*, 320*b*. Further, the present embodiment exemplifies a case where the cores forming the set of cores have the original core 210 and the bridge cores 220*a*, 220*b*, and the original core 310 and the bridge cores 320*a*, 320*b*.

As described above, in the present embodiment, by using the bridge cores 220*a*, 220*b*, 320*a*, 320*b*, a range of a main magnetic flux and an amount of the main magnetic flux passing through the main cores 211, 311, and the edge cores 212, 213, 312, 313 can be increased more than those of a case where the bridge cores 220*a*, 220*b*, 320*a*, 320*b* are not provided. Therefore, the main core 211 and the edge cores 212, 213, and the main core 311 and the edge cores 312, 313, respectively, can be magnetically coupled efficiently.

Figure 5:
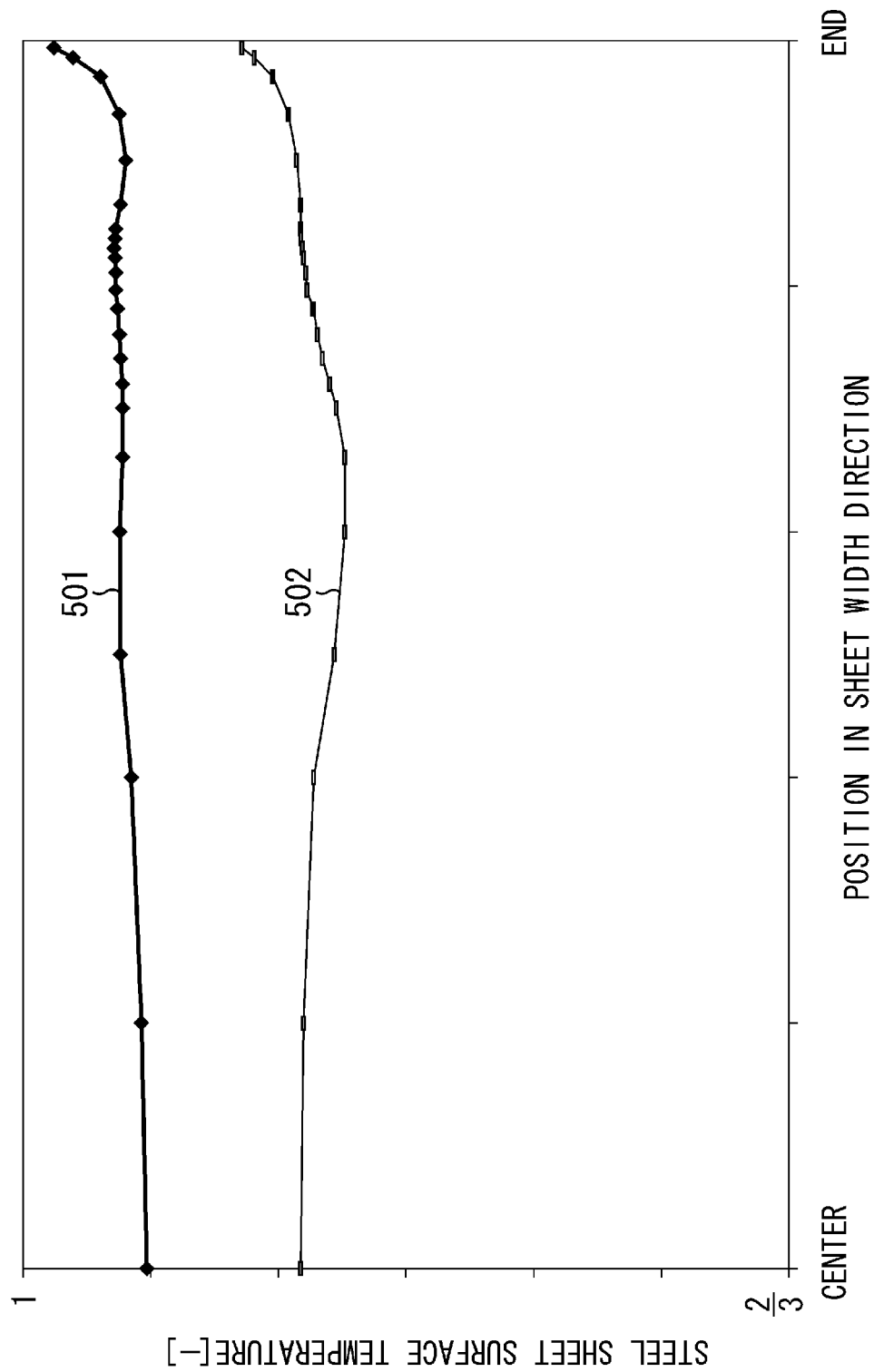
FIG. 5 is a view illustrating the first embodiment of the present invention, and illustrating one example of a relation between a position in an x-axis direction of a band-shaped steel sheet and a temperature.

FIG. 5 is a view illustrating one example of a relation between a position in the x-axis direction of the band-shaped steel sheet 100 (a position in sheet width direction) and a temperature (a steel sheet surface temperature). Note that a vertical axis (the steel sheet surface temperature) in FIG. 5 indicates a relative value.

In FIG. 5, a graph 501 is a graph when using the induction heating device of the present embodiment. On the other hand, a graph 502 is a graph when using an induction heating device of a comparative example. The induction heating device of the present embodiment is provided with the bridge cores 220*a*, 220*b*, 320*a*, 320*b*, but the induction heating device of the comparative example is not provided with the bridge cores 220*a*, 220*b*, 320*a*, 320*b*. The other configurations, operating conditions, and operating environments are the same between the induction heating device of the present embodiment and the induction heating device of the comparative example.

In FIG. 5, a temperature deviation of the graph 501 is decreased by 21.5% when compared to a temperature deviation of the graph 502. Therefore, it can be understood that when the bridge cores 220*a*, 220*b*, 320*a*, 320*b* are provided, it is possible to suppress a reduction in temperature of the entire band-shaped steel sheet 100 and to suppress a deviation in temperature distribution in the x-axis direction, when compared to the case where the bridge cores 220a, 220b, 320a, 320b are not provided.

As described above, in the present embodiment, the main core 211 and the edge cores 212, 213 can be magnetically coupled by the bridge cores 220a, 220b. Therefore, between the main core 211 and the edge cores 212, 213 (the partial edge cores 212a to 212d, 213a to 213d), and the bridge cores 220a, 220b, the magnetic coupling (spin-spin coupling) of three members of the main core 211, the edge cores 212, 213, and the bridge cores 220a, 220b can be increased. Consequently, the magnetic flux density in the main core 211 and the magnetic flux density in the edge cores 212, 213 can be increased more than those of a case where the bridge cores 220a, 220b are not provided. The above is similarly applied also to the lower inductor 300.

Note that in Patent Literature 6, the screen 14 is formed by a conductor. The magnetic pad 16 is arranged on the armature 15 that supports the screen 14. Therefore, even if the magnetic pad 16 is a ferromagnet, the screen 14 (conductor) exists between the magnetic bars 8 and the magnetic pad 16. Accordingly, the magnetic bars 8 and the magnetic pad 16 are not magnetically coupled. Namely, the magnetic pad 16 does not function as the bridge core explained in the present embodiment. Further, the magnetic pad 16 is not positioned on the back side of the core, and thus it does not function as the bridge core explained in the present embodiment.

Further, the armature 12 is used for positioning the magnetic bar 8, and is not a core that is magnetically coupled to the magnetic bar 8. Even if the armature 12 is a ferromagnet, a thickness of the armature 12 is small, so that a magnetic resistance of the armature 12 is quite high. Specifically, if the main magnetic flux passing through the magnetic bar 8 is going to pass through the armature 12, the armature 12 causes magnetic saturation and thus it is equivalent to a non-magnetic substance. As described above, even if the armature 12 is the ferromagnet, it is equivalent to the non-magnetic substance, and thus is not magnetically coupled to the magnetic bar 8. Namely, the armature 12 does not function as the bridge core explained in the present embodiment. Further, the armature 12 is not positioned on the back side of the core, and thus it does not function as the bridge core explained in the present embodiment.

Further, in the technique of Patent Literature 6, the plurality of magnetic bars 8 are arranged in a state of having an interval therebetween. Accordingly, an alternating magnetic field increased by the plurality of magnetic bars 8 leaks from regions between the plurality of magnetic bars 8 to be diffused to the periphery. There is a possibility that a peripheral object (an electronic device, for example) is heated by the alternating magnetic field diffused from the plurality of magnetic bars 8. Further, there is a possibility that a noise is generated in the peripheral object due to the alternating magnetic field diffused from the plurality of magnetic bars 8. Further, there is a possibility that the band-shaped steel sheet 100 is heated unintentionally by the alternating magnetic field diffused from the plurality of magnetic bars 8. In this case, the temperature distribution in the x-axis direction of the band-shaped steel sheet 100 may be nonuniform. Conditions regarding a place in which the induction heating device is installed are not the same, so that it is substantially impossible to predict whether or not the band-shaped steel sheet 100 is heated unintentionally. If total power of the induction heating device is increased due to the unintentional heating of the band-shaped steel sheet 100, a reduction in total heating efficiency of the induction heating device may be caused. In this case, it may be required to reconsider the method of power supply with respect to the induction heating device for heating the band-shaped steel sheet 100 to a desired temperature.

On the contrary, in the present embodiment, the main core 211 and the edge cores 212, 213 can be magnetically coupled by the bridge cores 220a, 220b. Therefore, the diffusion of the alternating magnetic field increased by the cores (the main core 211 and the edge cores 212, 213) to the periphery can be suppressed. Consequently, the above-described various adverse effects can be suppressed.

Further, in the present embodiment, the bridge cores 220a, 220b are formed of soft magnetic ferrite (a ferromagnet having isotropy on magnetization direction). Therefore, the coupling of mutual spins of constituent atoms between the main core 211 and the edge cores 212, 213, and the bridge cores 220a, 220b can be further accelerated. Therefore, the magnetic flux density in the main core 211 and the edge cores 212, 213 can be increased.

Further, in the present embodiment, by using the cooling fins 260a to 260h, and the cooling small pipes 270a to 270h, it is possible to suppress the increase in temperature of the original core 210 and the increase in temperatures of the bridge cores 220a, 220b.

Further, in the present embodiment, the bridge cores 220a, 220b are the cores separate from the main core 211 and the edge cores 212, 213. Therefore, it is possible to make it easy to perform an assembling work and a maintenance work of the induction heating device. Further, the same bridge cores 220a, 220b can be applied to an induction heating device with different specification (for example, an induction heating device with different number of partial edge cores), as long as its entire shape and size are the same as those of the induction heating device described above.

The above is similarly applied also to the lower inductor 300.

As described above, in the present embodiment, it is possible to provide the induction heating device capable of simultaneously satisfying both the suppression of the increase in temperatures of the cores and the suppression of the reduction in magnitude of the alternating magnetic field applied to the band-shaped steel sheet 100. In particular, as the power of the induction heating device increases, the effect of simultaneously satisfying both the suppression of the increase in temperatures of the cores and the suppression of the reduction in magnitude of the alternating magnetic field applied to the band-shaped steel sheet 100 increases. Although the power of the induction heating device of the present embodiment is unlimited, from such a viewpoint, the power of the induction heating device is preferably 10 kW order or more (10 kW or more, for example) since such an effect is exhibited significantly.

Modified Example

The present embodiment exemplified the case where the main core 211 and the edge cores 212, 213 are formed of the same material (the electromagnetic steel sheet). However, the main core 211 and the edge cores 212, 213 are not necessarily formed of the same material. For example, either the main core 211 or the edge cores 212, 213 may be formed of soft magnetic ferrite.

Further, the present embodiment exemplified the case where the bridge cores 220a, 220b are formed of soft magnetic ferrite. However, the soft magnetic material that forms the bridge cores 220a, 220b is not limited to soft magnetic ferrite. For example, the bridge cores 220a, 220b may also be formed by a plurality of electromagnetic steel sheets laminated in the z-axis direction, each having a planar shape same as a shape of a surface parallel to the x-y plane of the bridge cores 220a, 220b (a rectangular shape in the example of the present embodiment). Further, the bridge cores 220a, 220b may also be formed by a plurality of electromagnetic steel sheets laminated in the x-axis direction, each having a planar shape same as a shape of a surface parallel to the y-z plane of the bridge cores 220a, 220b.

Further, the present embodiment exemplified the case where the number of the cooling fins 260a to 260h and the number of the cooling small pipes 270a to 270h are eight, respectively. However, the number of these is not limited to eight. Further, the intervals between the cooling fins 260a and 260h, and the intervals between the cooling small pipes 270a and 270h are not necessarily the same, respectively. By increasing the number of the cooling fins 260a to 260h and the number of the cooling small pipes 270a to 270h arranged in the regions of the edge cores 212, 213, the cooling effect of the edge cores 212, 213 is enhanced. Specifically, the number of the cooling fins 260a to 260h and the number of the cooling small pipes 270a to 270h are not limited to the numbers illustrated in FIG. 1 and FIG. 2, and are at pleasure decided in accordance with a temperature required of the induction heating device.

Further, the present embodiment exemplified the case where the number of the bridge cores 220a, 220b provided to the upper inductor 200 is two. However, the number of the bridge cores provided to the upper inductor 200 is not limited to two. The number of the bridge core provided to the upper inductor 200 may be one, or three or more. For example, it is possible to arrange one bridge core that faces each of at least a part of region of an end surface on the back side (upper surface) of the main core 211, and at least a part of region of each of end surfaces on the back side (upper surfaces) of the edge cores 212a to 212d, 213a to 213d.

Further, the present embodiment exemplified the case where, when the shield plates 240a, 240b are moved, within the movable ranges thereof in the x-axis direction, to the positions closest to the center position in the x-axis direction of the induction heating device, the sheet center-side end portions of the core gap regions on the most sheet center side out of the core gap regions that exist at the positions facing the bridge cores 220a, 220b (the sheet center-side end portions of the cooling fins 260d, 260h, in the example illustrated in FIG. 2) are arranged on the inner side (sheet center side) relative to the shield plates 240a, 240b. However, the positional relation between the shield plates 240a, 240b, and the main core 211 and the partial edge cores 212a to 212d, 213a to 213d when the shield plates 240a, 240b are moved, within the movable ranges thereof in the x-axis direction, to the positions closest to the center position in the x-axis direction of the induction heating device, is not limited to such a relation.

For example, when the shield plates 240a, 240b are moved, within the movable ranges thereof in the x-axis direction, to the positions closest to the center position in the x-axis direction of the induction heating device, the sheet center-side end portion of at least one partial edge core of the partial edge cores 212a to 212d and the sheet center-side end portion of at least one partial edge core of the partial edge cores 213a to 213d may be arranged on the inner side (sheet center side) relative to the shield plates 240a, 240b, respectively. For example, the partial edge cores 212a to 212d, 213a to 213d may be arranged on the inner side (sheet center side) relative to the shield plates 240a, 240b, respectively.

Further, when the shield plates 240a, 240b are moved, within the movable ranges thereof in the x-axis direction, to the positions closest to the center position in the x-axis direction of the induction heating device, the sheet center-side end portion of at least one of the cooling fins 260a to 260d and the sheet center-side end portion of at least one of the cooling fins 260e to 260h may be arranged on the inner side (sheet center side) relative to the sheet center-side end portions of the shield plates 240a, 240b, respectively.

For example, when the shield plates 240a, 240b are moved, within the movable ranges thereof in the x-axis direction, to the positions closest to the center position in the x-axis direction of the induction heating device, the sheet center-side end portions of the cooling fins 260d, 260h may be arranged on the inner side (sheet center side) relative to the sheet center-side end portions of the shield plates 240a, 240b, respectively. Further, the sheet center-side end portions of the cooling fins 260a to 260d, 260e to 260h may be arranged on the inner side (sheet center side) relative to the sheet center-side end portions of the shield plates 240a, 240b, respectively. Further, when the shield plates 240a, 240b are moved, within the movable ranges thereof in the x-axis direction, to the positions closest to the center position in the x-axis direction of the induction heating device, the sheet center-side end portion of at least one of the cooling fins 260a to 260d and the sheet center-side end portion of at least one of the cooling fins 260e to 260h may be arranged on the outer side (sheet end side) relative to the sheet center-side end portions of the shield plates 240a, 240b, respectively.

Further, the present embodiment exemplified the case where the induction heating device includes the shield plates 240a, 240b. However, it is not necessarily designed as above. For example, at a position where each of the shield plates 240a, 240b is arranged, a secondary coil, as one example of a shield member, for adjusting (reducing) the degree of electromagnetic coupling between the coil 230 and the band-shaped steel sheet 100 may be arranged for preventing overheating of the edge portion of the band-shaped steel sheet 100.

Further, the cooling members arranged between the main core 211 and the partial edge cores 212d, 213d, and between the main core 311 and the partial edge cores 312d, 313d, and the cooling members arranged between the partial edge cores 212a and 212d, 213a and 213d, 312a and 312d, 313a and 313d, are not necessarily the cooling fins 260a to 260h, 360a to 360h, and the cooling small pipes 270a to 270h, 370a to 370h, as long as non-magnetic conductors configured to be able to perform cooling are used. For example, a pipe with hollow rectangular parallelepiped shape formed by a non-magnetic conductor may be arranged in a region where the cooling fins 260a to 260h, 360a to 360h, and the cooling small pipes 270a to 270h, 370a to 370h are arranged. In such a case, cooling water may be supplied to a hollow portion of the pipe.

Further, the cooling members may not be arranged in the regions between the main core 211 and the partial edge cores 212d, 213d, and between the main core 311 and the partial edge cores 312d, 313d, and the regions between the partial edge cores 212a and 212d, 213a and 213d, 312a and 312d, 313a and 313d. The regions between the main core 211 and the partial edge cores 212d, 213d, and between the main core 311 and the partial edge cores 312d, 313d, and the regions between the partial edge cores 212a and 212d, 213a and 213d, 312a and 312d, 313a and 313d may also be voids. In such a case, a cooling gas may be supplied, as a cooling medium, to the voids. Further, a length in the x-axis direction of the region of the voids may be increased to be longer than the length illustrated in FIG. 2, to thereby enhance a cooling effect through air cooling.

Figure 6:
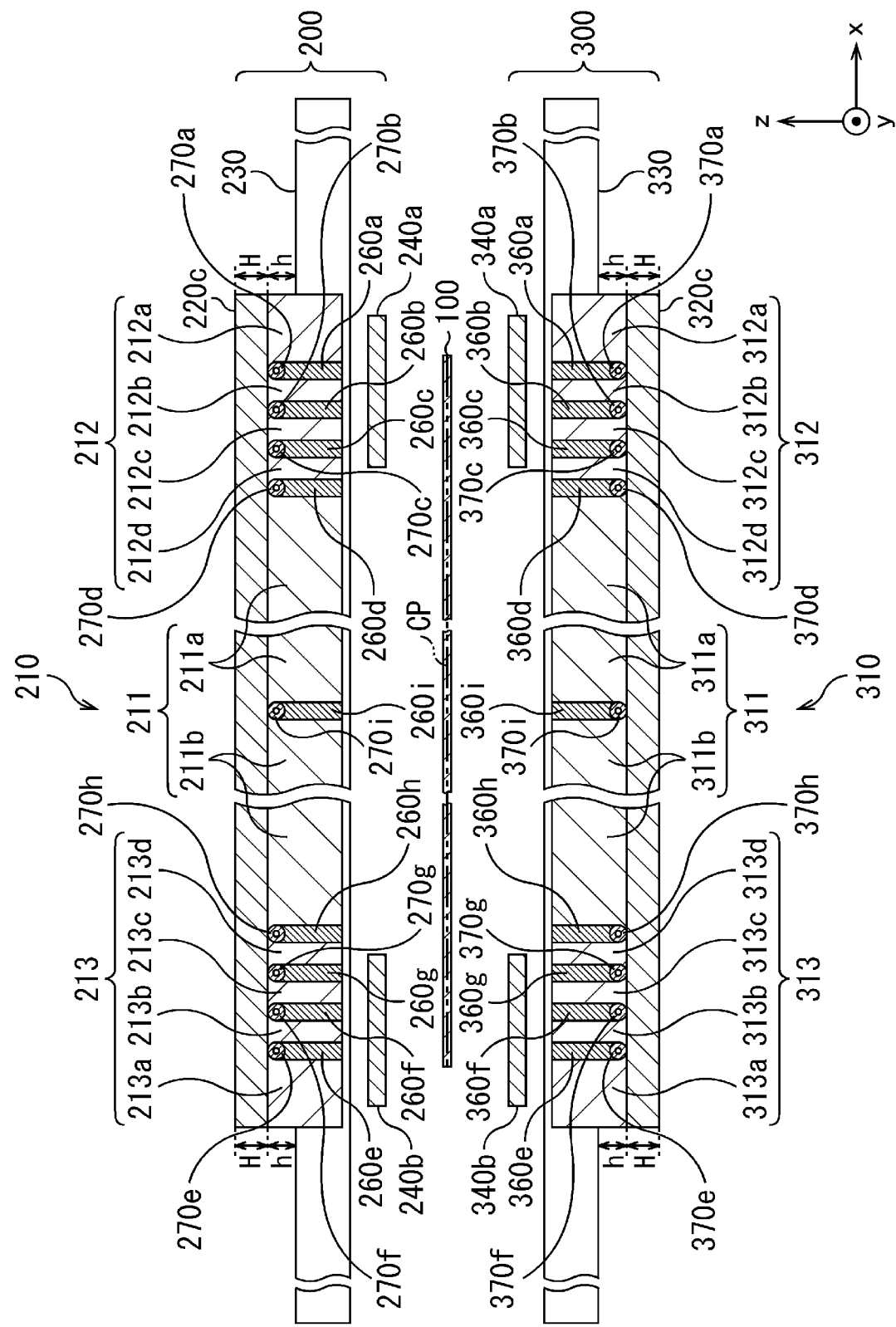
FIG. 6 is a view illustrating a first modified example of the first embodiment of the present invention, and illustrating a first cross section of the induction heating device.

Further, the present embodiment exemplified the case where the main core 211 is an integrated core. However, as illustrated in FIG. 6, for example, the main core 211 may have a plurality of partial main cores 211a to 211b arranged in a state of having an interval therebetween in the x-axis direction (note that FIG. 6 is a sectional view corresponding to FIG. 2). In such a case, a cooling fin 260i similar to the cooling fins 260a to 260h and a cooling small pipe 270i similar to the cooling small pipes 270a to 270h may be arranged between the partial main cores 211a and 211b. Further, as illustrated in FIG. 6, also in the lower inductor 300, partial main cores 311a to 311b, a cooling fin 360i, and a cooling small pipe 370i similar to the partial main cores 211a to 211b, the cooling fin 260i, and the cooling small pipe 270i are arranged.

Note that the number of partial main cores is only required to be two or more, and is unlimited. However, it is preferable that all of the partial main cores can be magnetically coupled to at least one of bridge core. Further, it is more preferable that all of the partial main cores are magnetically coupled. FIG. 6 exemplifies a case where the partial main cores 211a to 211b and the bridge core 220c can be magnetically coupled, and the partial main cores 311a to 311b and the bridge core 320c can be magnetically coupled. Further, FIG. 6 exemplifies a case where the bridge core 220c is arranged so that an end surface on the planned conveyance plane CP side (lower surface) of the bridge core 220c is in contact with all of end surfaces on the back side (upper surfaces) of the partial main cores 211a to 211b, and all of end surfaces on the back side (upper surfaces) of the partial edge cores 212a to 212d. In like manner, FIG. 6 exemplifies a case where the bridge core 320c is arranged so that an end surface on the planned conveyance plane CP side (upper surface) of the bridge core 320c is in contact with all of end surfaces on the back side (lower surfaces) of the partial main cores 311a to 311b, and all of end surfaces on the back side (lower surfaces) of the partial edge cores 312a to 312d. Further, shapes and sizes of the plurality of partial main cores are not limited. The shapes and the sizes of the plurality of partial main cores may be the same or different. Regarding the plurality of partial edge cores as well, the shapes and the sizes thereof may be the same or different.

Figure 7:
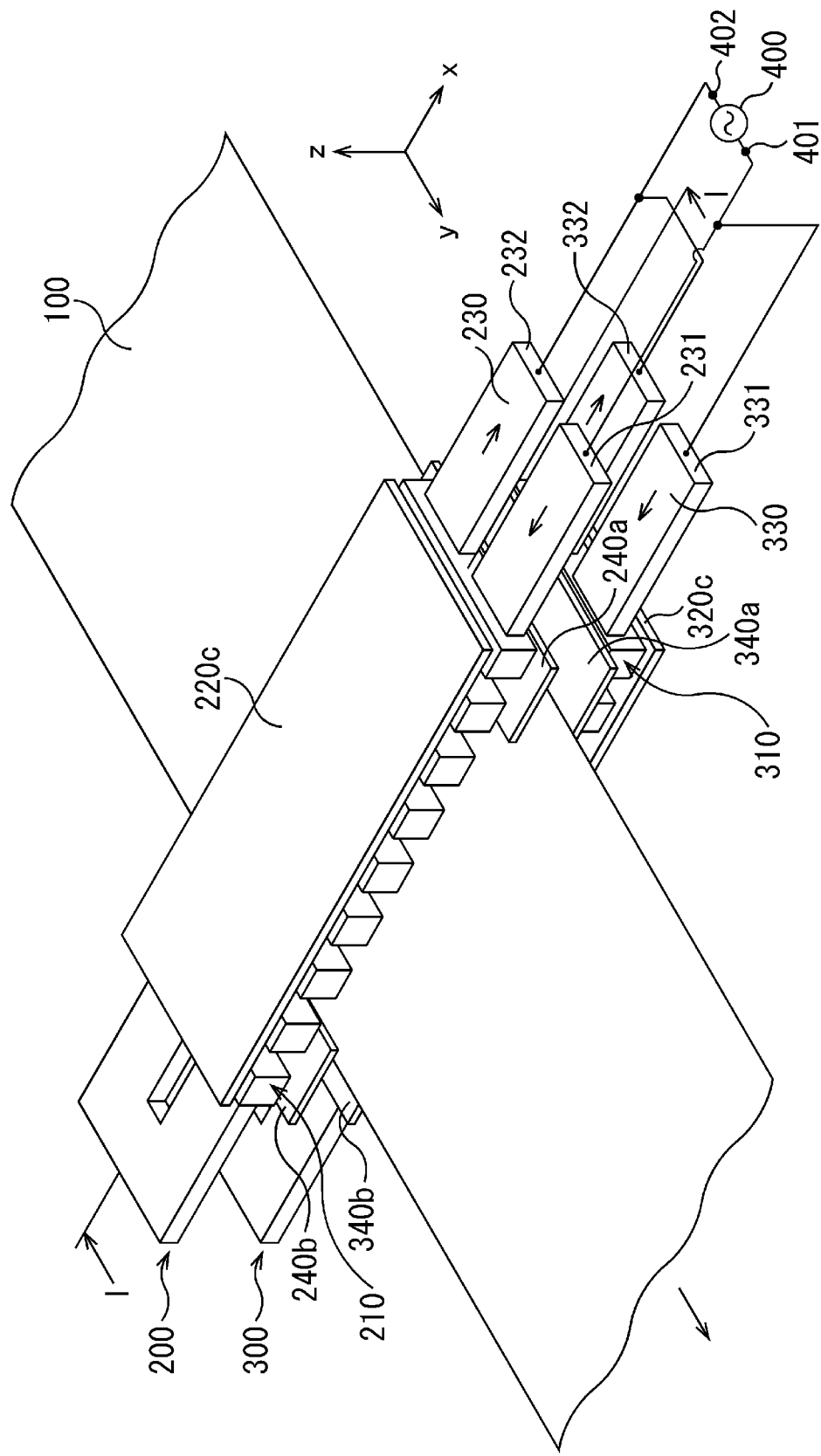
FIG. 7 is a view illustrating a second modified example of the first embodiment of the present invention, and illustrating an external configuration of the induction heating device.
Figure 8:
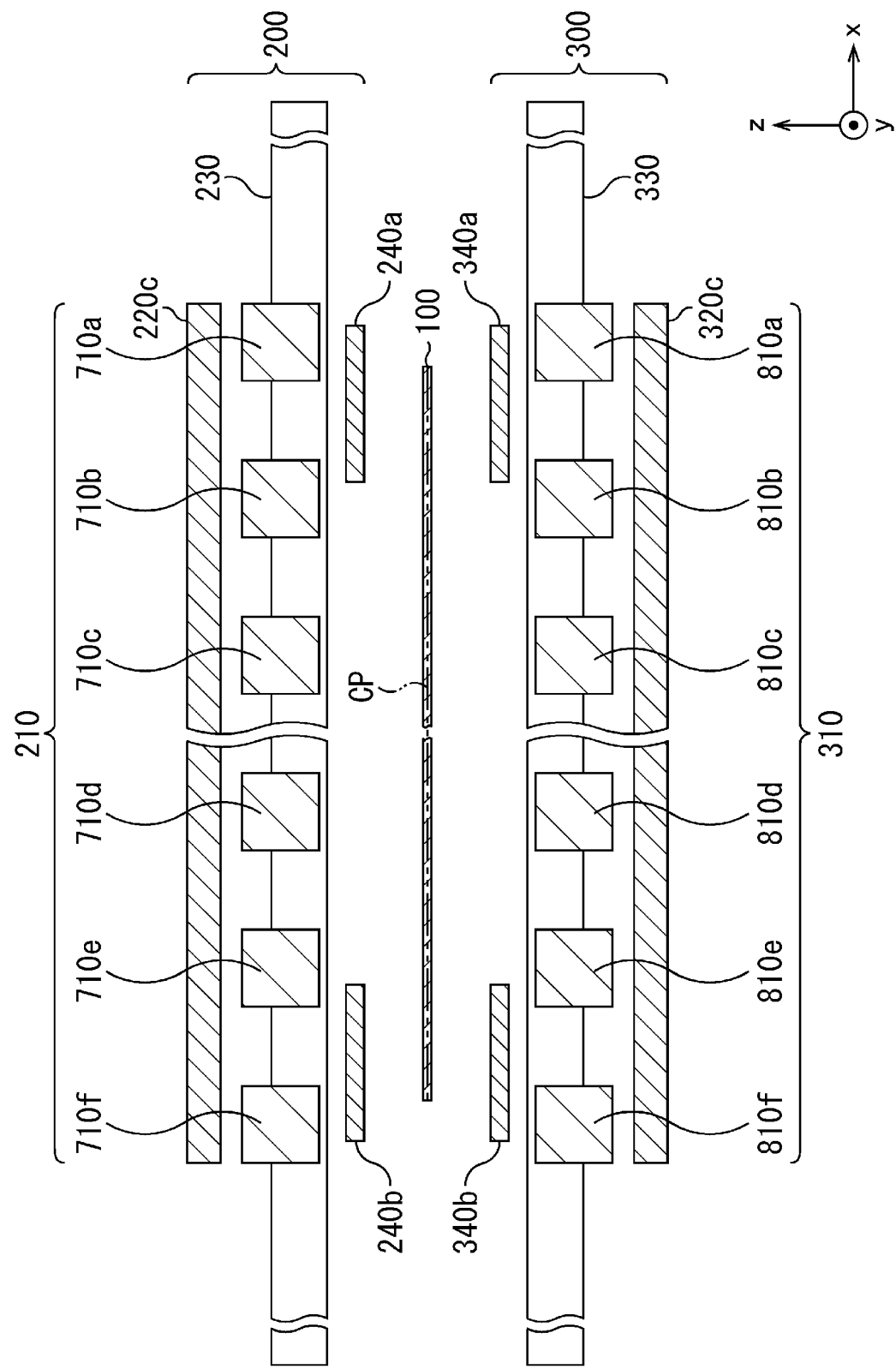
FIG. 8 is a view illustrating the second modified example of the first embodiment of the present invention, and illustrating a first cross section of the induction heating device.

Further, the present embodiment exemplified the case where the original core 210 has the main core 211 and the edge cores 212, 213. Specifically, the case was exemplified in which the main core 211 and the edge cores 212, 213 are demarcated. However, the main core 211 and the edge cores 212, 213 are not necessarily demarcated. For example, the induction heating device may also be configured as illustrated in FIG. 7 and FIG. 8. FIG. 7 is a view illustrating one example of an external configuration of such an induction heating device. FIG. 7 is a view corresponding to FIG. 1. FIG. 8 is a view illustrating one example of a first cross section of the induction heating device. Concretely, FIG. 8 is a sectional view taken along I-I in FIG. 7, and is a view corresponding to FIG. 2.

In FIG. 7 and FIG. 8, an upper inductor 200 includes an original core 210, a bridge core 220c, a coil 230, and shield plates 240a, 240b.

The original core 210 has a plurality of partial original cores 710a to 710f arranged in a state of having an interval therebetween in the x-axis direction. The partial original cores 710a to 710f have lengths in the x-axis direction different from those of the partial edge cores 212a to 212d illustrated in FIG. 2. The other configurations of the partial original cores 710a to 710f are the same as those of the partial edge cores 212a to 212d. The partial original cores 710a to 710f are formed by a plurality of electromagnetic steel sheets laminated in the x-axis direction, each having the same thickness and the same planar shape, for example. In such a case, the number of laminating of the electromagnetic steel sheets forming the partial original cores 710a to 710f and the number of laminating of the electromagnetic steel sheets forming the partial edge cores 212a to 212d illustrated in FIG. 2 are different.

A y-z cross section of the partial original cores 710a to 710f is the same as the cross section illustrated in FIG. 4. Further, FIG. 7 and FIG. 8 exemplify a case where the shapes and the sizes of all of the partial original cores 710a to 710f, 810a to 810f are the same. Accordingly, when the plurality of partial original cores 710a to 710f and the plurality of partial original cores 810a to 810f are formed by the plurality of electromagnetic steel sheets each having the same thickness and the same planar shape, the number of laminating of the electromagnetic steel sheets in each of the partial original cores is the same. Further, FIG. 7 and FIG. 8 exemplify a case where intervals between the plurality of partial original cores 710a and 710f and intervals in the x-axis direction between the plurality of partial original cores 810a and 810f are the same.

The bridge core 220c is a ferromagnet for enabling at least one core out of the partial original cores 710a to 710f to be magnetically coupled thereto. Note that the bridge core 220c itself is the same as the bridge core 220c illustrated in FIG. 6. FIG. 7 and FIG. 8 exemplify a case where an end surface on the planned conveyance plane CP side (lower surface) of the bridge core 220c and all of end surfaces on the back side (upper surfaces) of the partial original cores 710a to 710f face in a state of having an interval therebetween. The interval between the bridge core 220c and the partial original cores 710a to 710f is determined so that the bridge core 220c can be magnetically coupled to at least one partial original core out of the partial original cores 710a to 710f. The interval between the bridge core 220c and the partial original cores 710a to 710f is determined so that the bridge core 220c can be magnetically coupled to all of the partial original cores 710a to 710f.

Similarly to the upper inductor 200, a lower inductor 300 includes an original core 310 having partial original cores 810a to 810f, a bridge core 320c, a coil 330, and shield plates 340a, 340b, and has a configuration same as that of the upper inductor 200.

Note that in FIG. 7 and FIG. 8, cooling members (a cooling fin and a cooling small pipe, for example) may be arranged between two partial original cores adjacent in a state of having an interval therebetween in the x-axis direction (between the partial original cores 710a and 710b, for example), as explained in the present embodiment. The other configurations such that the original core 210 and the bridge core 220c, and the original core 310 and the bridge core 320c may also be in contact with each other, are also applicable, as explained in the present embodiment.

Note that the above respective modified examples may be applied to the lower inductor 300.

The various modified examples of the present embodiment have been described above. A modified example combining at least two of the respective modified examples including the modified examples of the present embodiment explained before the explanation of the item of <Modified example>, may be applied to the induction heating device of the present embodiment.

Second Embodiment

Next, a second embodiment of the present invention will be described. The first embodiment exemplified the case where the original core 210 (the main core 211 and the edge cores 212, 213) and the bridge cores 220a, 220b are formed as the separate cores. In like manner, the case was exemplified in which the original core 310 (the main core 311 and the edge cores 312, 313) and the bridge cores 320a, 320b are formed as the separate cores. On the contrary, the present embodiment exemplifies a case where an original core and bridge cores are formed as an integrated core. As described above, the present embodiment and the first embodiment are different mainly in a core configuration. Therefore, in the explanation of the present embodiment, parts same as those of the first embodiment are denoted by the same reference numerals as those given to FIG. 1 to FIG. 8, and a detailed explanation thereof will be omitted.

Figure 9:
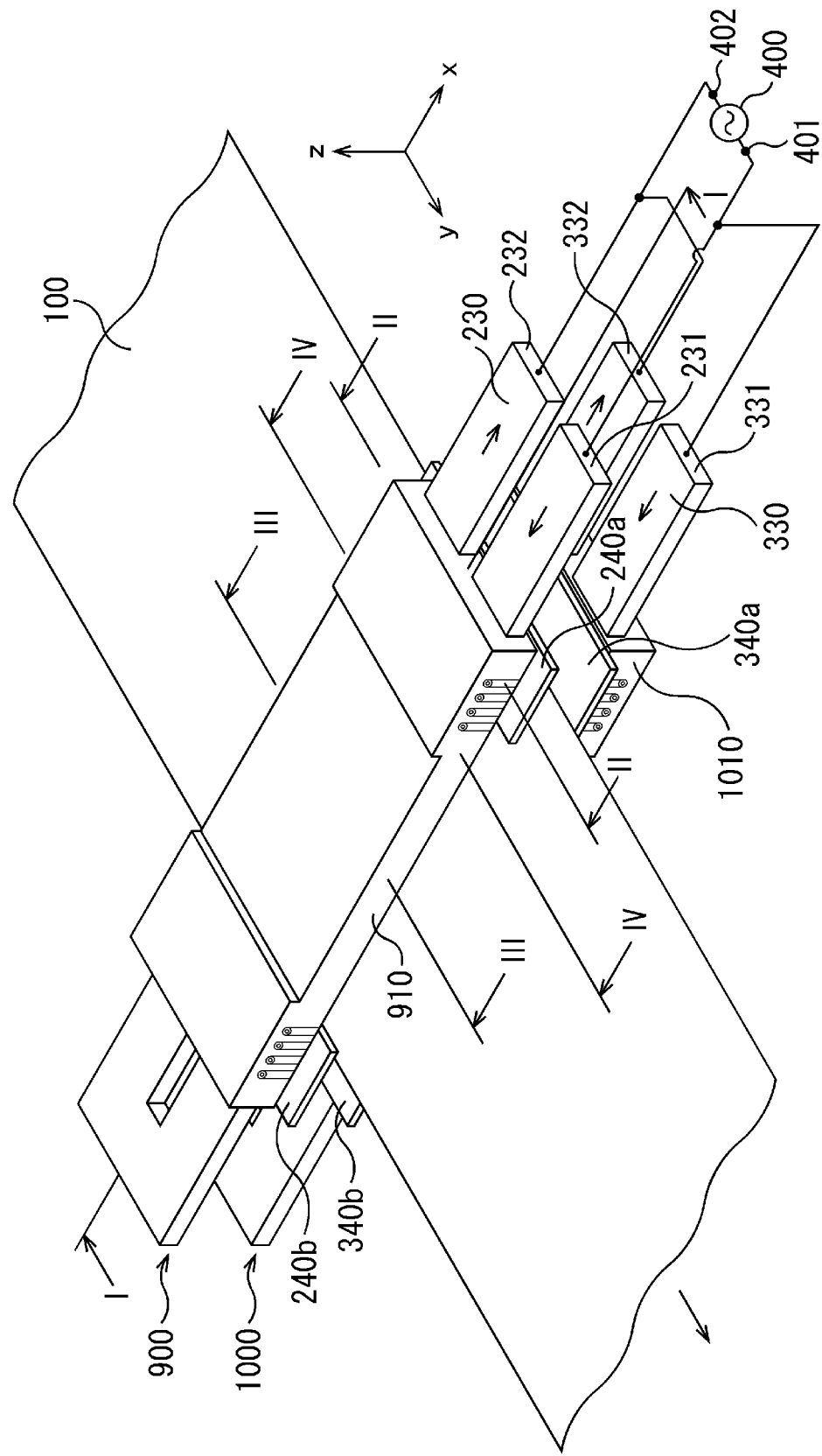
FIG. 9 is a view illustrating a second embodiment of the present invention, and illustrating one example of an external configuration of an induction heating device.

FIG. 9 is a view illustrating one example of an external configuration of an induction heating device. FIG. 9 is a view corresponding to FIG. 1.

The induction heating device illustrated in FIG. 9 includes an upper inductor 900 and a lower inductor 1000. The upper inductor 900 and the lower inductor 1000 are arranged at positions facing each other with the planned conveyance plane CP of the band-shaped steel sheet 100 interposed therebetween (refer to FIG. 10 to FIG. 13). The upper inductor 900 and the lower inductor 1000 have the same configuration. Therefore, the upper inductor 900 will be explained here in detail, and a detailed explanation regarding the lower inductor 1000 will be omitted according to need. Note that an interval between the upper inductor 900 and the planned conveyance plane CP and an interval between the lower inductor 1000 and the planned conveyance plane CP may be the same or different. Similarly to the first embodiment, the present embodiment also exemplifies a case where the induction heating device has a shape in a relation of mirror symmetry in which a y-z plane at a center in the x-axis direction of the induction heating device is set to a plane of symmetry. Further, when an interval between the upper inductor 900 and the band-shaped steel sheet 100 and an interval between the lower inductor 1000 and the band-shaped steel sheet 100 are the same, the induction heating device has a shape in a relation of mirror symmetry in which an x-y plane at a center in the z-axis direction of the induction heating device is set to a plane of symmetry.

Figure 10:
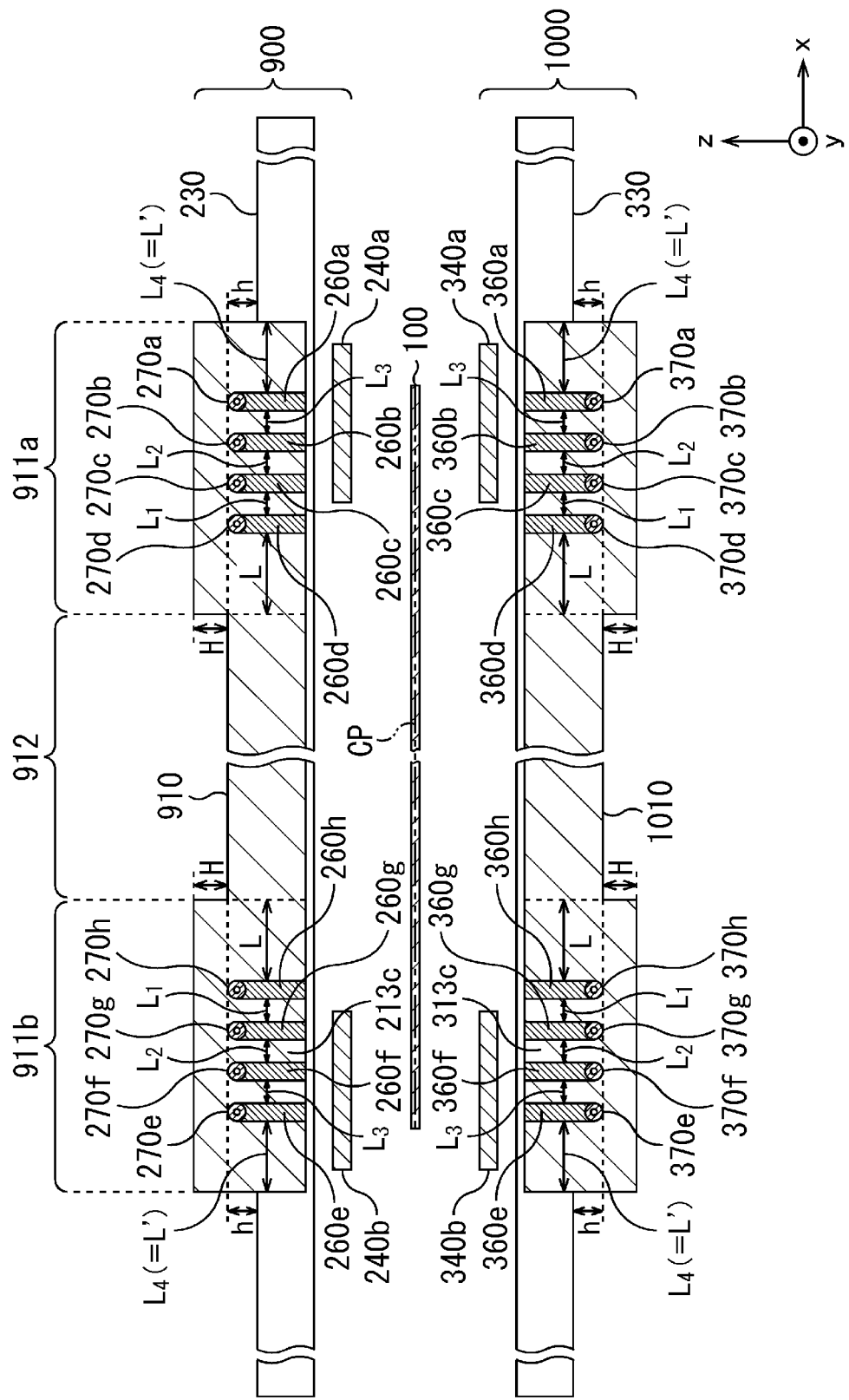
FIG. 10 is a view illustrating the second embodiment of the present invention, and illustrating one example of a first cross section of the induction heating device.
Figure 11:
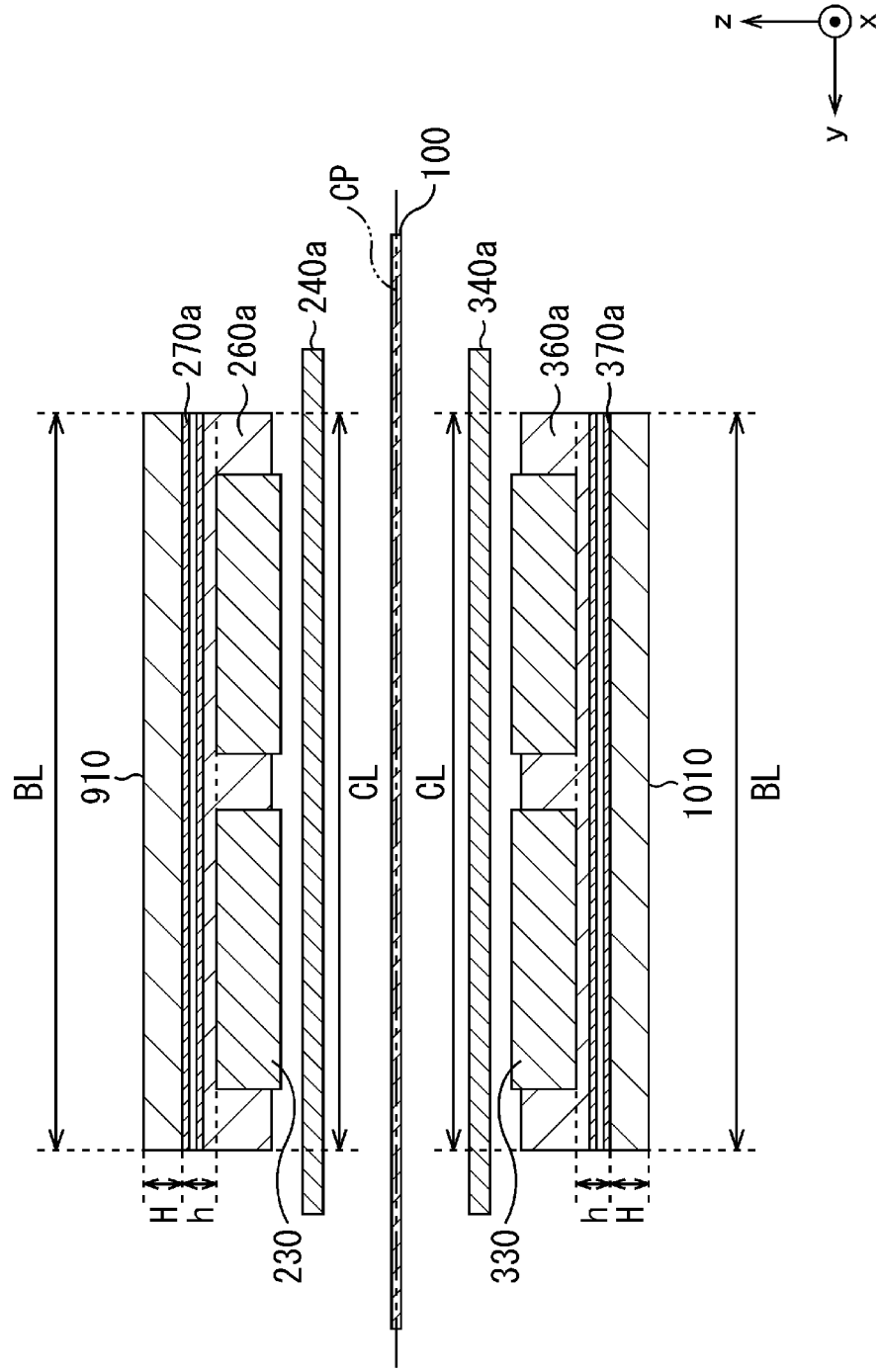
FIG. 11 is a view illustrating the second embodiment of the present invention, and illustrating one example of a second cross section of the induction heating device.
Figure 12:
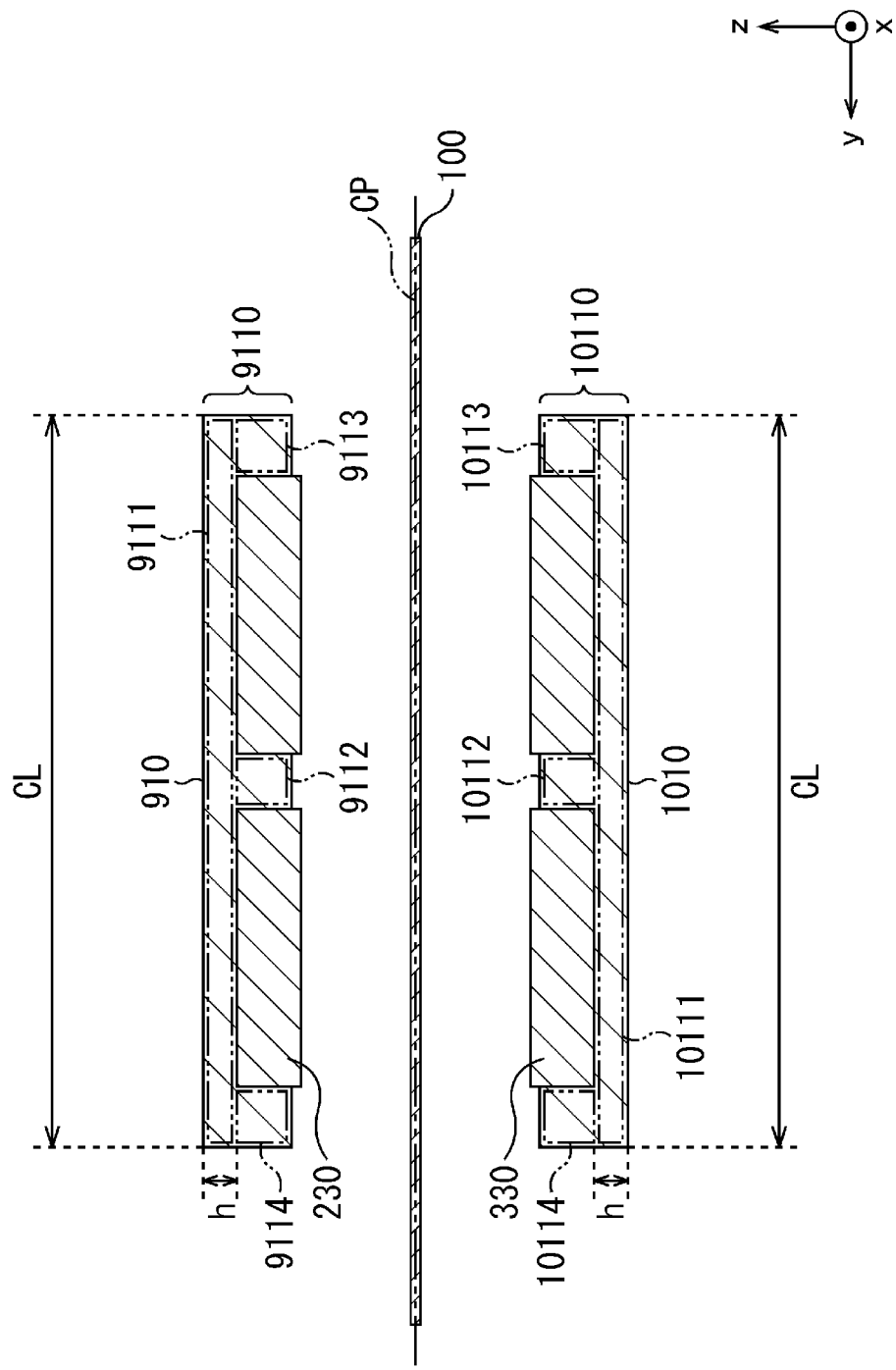
FIG. 12 is a view illustrating the second embodiment of the present invention, and illustrating one example of a third cross section of the induction heating device.
Figure 13:
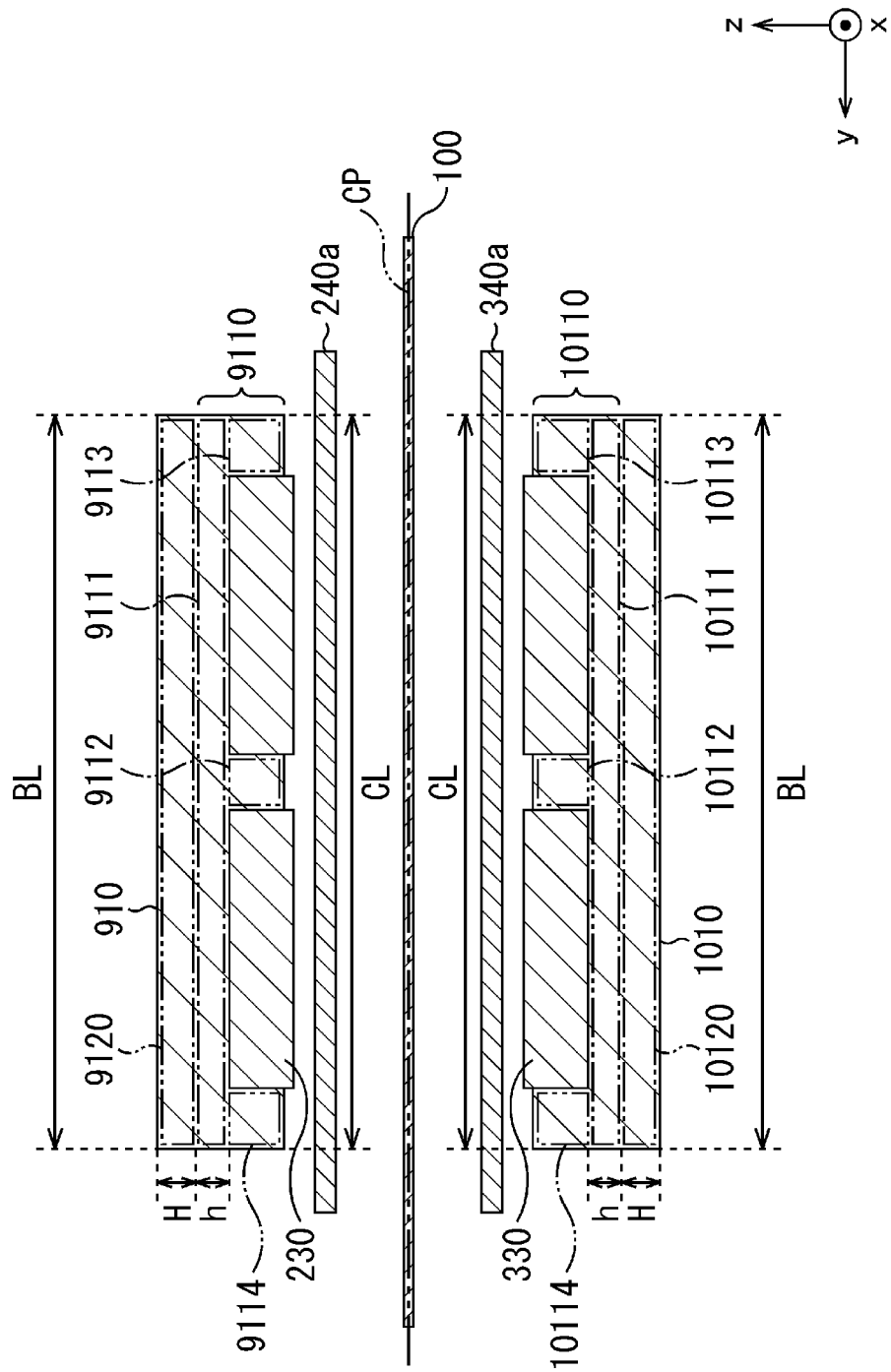
FIG. 13 is a view illustrating the second embodiment of the present invention, and illustrating one example of a fourth cross section of the induction heating device.

FIG. 10 is a view illustrating one example of a first cross section of the induction heating device. Concretely, FIG. 10 is a sectional view taken along I-I in FIG. 9, and is a view corresponding to FIG. 2. FIG. 11 is a view illustrating one example of a second cross section of the induction heating device. Concretely, FIG. 11 is a sectional view taken along II-II in FIG. 9, and is a view corresponding to FIG. 3. FIG. 12 is a view illustrating one example of a third cross section of the induction heating device. Concretely, FIG. 12 is a sectional view taken along III-III in FIG. 9, and is a view corresponding to FIG. 4. FIG. 13 is a view illustrating one example of a fourth cross section of the induction heating device. Concretely, FIG. 13 is a sectional view taken along IV-IV in FIG. 9.

In FIG. 10, the upper inductor 900 includes an upper core 910, a coil 230, shield plates 240a to 240b, cooling fins 260a to 260h, and cooling small pipes 270a to 270h.

The upper core 910 is formed as one core in which the original core 210 and the bridge core 220 explained in the first embodiment are integrated.

The present embodiment exemplifies a case where the upper core 910 is formed by a plurality of electromagnetic steel sheets laminated in the x-axis direction, each having the same thickness.

In FIG. 10, regions 911a, 911b of the upper core 910 are regions of the upper core 910, including regions corresponding to the bridge cores 220a, 220b in the first embodiment. In the present embodiment, the shape of the electromagnetic steel sheets arranged in the regions 911a, 911b of the upper core 910 is different between regions adjacent in the z-axis direction to regions where the cooling fins 260a to 260h and the cooling small pipes 270a to 270h are arranged, and the other regions.

In FIG. 10, in the regions adjacent in the z-axis direction to the regions in which the cooling fins 260a to 260h and the cooling small pipes 270a to 270h are arranged, in the regions 911a, 911b of the upper core 910, electromagnetic steel sheets having a planar shape corresponding to the regions are laminated in the x-axis direction, for example. A y-z cross section of the regions is one like a y-z cross section of the upper core 910 illustrated in FIG. 11, for example. FIG. 11 exemplifies a case where an outer shape of the entire y-z cross section of the regions is a rectangular shape. Further, FIG. 11 exemplifies a case where a length in the z-axis direction of the rectangular shape is the same as the length in the z-axis direction of the bridge cores 220a, 220b of the first embodiment. However, the length in the z-axis direction of the rectangular shape may be (slightly) different for each position in the x-axis direction according to a curvature of the cooling small pipes 270a to 270h, for example.

On the other hand, in FIG. 10, in the regions except for the regions adjacent in the z-axis direction to the regions in which the cooling fins 260a to 260h and the cooling small pipes 270a to 270h are arranged, in the regions 911a, 911b of the upper core 910, electromagnetic steel sheets having the same planar shape corresponding to the regions are laminated in the x-axis direction, for example. A y-z cross section of the regions is one like a y-z cross section of the upper core 910 illustrated in FIG. 13, for example. FIG. 13 exemplifies a case where an outer shape of the entire y-z cross section of the regions is an E-shape (note that in the example illustrated in FIG. 13, all horizontal lines of E have the same length). Further, FIG. 13 exemplifies a case where a length in the z-axis direction of the regions (a length in a direction parallel to the horizontal line of E) is a length as a result of adding the length in the z-axis direction of the bridge cores 220a, 220b in the first embodiment and the length in the z-axis direction of the original core 210 (the main core 211, and the edge cores 212, 213) in the first embodiment.

Further, in FIG. 10, the region 912 of the upper core 910 is a region that does not include the regions corresponding to the bridge cores 220a, 220b in the first embodiment. In the region 912 of the upper core 910, electromagnetic steel sheets having the same planar shape corresponding to the region 912 are laminated in the x-axis direction, for example. A y-z cross section of the region 912 of the upper core 910 is one like a y-z cross section of the upper core 910 illustrated in FIG. 12, for example. FIG. 12 exemplifies a case where an outer shape of the entire y-z cross section of the region 912 of the upper core 910 is an E-shape (note that in the example illustrated in FIG. 12, all horizontal lines of E have the same length). Further, FIG. 12 exemplifies a case where a length in the z-axis direction of the region 912 of the upper core 910 (a length in a direction parallel to the horizontal line of E) is the same as that in the z-axis direction of the original core 210 (the main core 211, and the edge cores 212, 213) in the first embodiment.

The plurality of electromagnetic steel sheets forming the upper core 910 are fixed so as not to be separated from each other. A method of fixing the plurality of electromagnetic steel sheets is unlimited. For example, publicly-known various methods such as fixing with an adhesive, fixing by welding, fixing by caulking, and fixing using a fixing member, are employed as the method of fixing the plurality of electromagnetic steel sheets. As described above, in the present embodiment, the original core (the main core and the edge cores) and the bridge cores are integrated as one core. Therefore, as illustrated in FIG. 9 and FIG. 10, there are no boundary lines at boundaries between the bridge cores (the regions corresponding to the bridge cores 220a, 220b) and the main core and the edge cores (the regions corresponding to the main core 211 and the edge cores 212, 213). Note that for the convenience of notation, an illustration of boundary lines of individual electromagnetic steel sheets is omitted in FIG. 10.

The present embodiment exemplifies a case where the bridge cores are formed by the regions corresponding to the bridge cores 220a, 220b, 320a, 320b, in the regions of the upper core 910 and the lower core 1010. Further, the present embodiment exemplifies a case where the partial cores are formed by the regions corresponding to the main cores 211, 311, and the edge cores 212 to 213, 312 to 313, in the regions of the upper core 910 and the lower core 1010.

FIG. 12 and FIG. 13 illustrate regions 9110, 10110 corresponding to the main cores 211, 311. Further, FIG. 13 illustrates regions 9120, 10120 corresponding to the bridge cores 220a, 220b, 320a, 320b.

As illustrated in FIG. 12 and FIG. 13, the regions 9110, 10110 corresponding to the main cores 211, 311 have body portions 9111, 10111, center leg portions 9112, 10112, upstream-side leg portions 9113, 10113, and downstream-side leg portions 9114, 10114. The body portions 9111, 10111, the center leg portions 9112, 10112, the upstream-side leg portions 9113, 10113, and the downstream-side leg portions 9114, 10114 are the same as the body portions 2111, 3111, the center leg portions 2112, 3112, the upstream-side leg portions 2113, 3113, and the downstream-side leg portions 2114, 3114, respectively (refer to FIG. 3 and FIG. 4).

Note that an outer shape of the entire cross section obtained by cutting regions corresponding to the edge cores 212 to 213, 312 to 313 along the y-z plane, is the same as an outer shape of the entire cross section obtained by cutting the regions 9110, 10110 corresponding to the main cores 211, 311 along the y-z plane. Therefore, the regions corresponding to the edge cores (the partial edge cores) also have body portions, center leg portions, upstream-side leg portions, and downstream-side leg portions, similarly to the regions 9110, 10110 corresponding to the main cores 211, 311.

Similarly to the upper inductor 900, the lower inductor 1000 also includes a lower core 1010, a coil 330, shield plates 340a, 340b, cooling fins 360a to 360h, and cooling small pipes 370a to 370h, and has a configuration same as that of the upper inductor 900.

As described above, in the present embodiment, the regions corresponding to the bridge cores 220a, 220b, and 320a, 320b are not separated from but integrated with the regions corresponding to the original cores 210, 320, respectively. Specifically, in the present embodiment, the original core and the bridge cores are formed as one core (one upper core 910, and one lower core 1010). Also in such a case, the induction heating device exhibiting the effect explained in the first embodiment is realized. Further, it is possible to further increase the coupling of mutual spins (spin-spin coupling) between the spin of constituent atoms of the regions corresponding to the bridge cores 220a, 220b, and the spin of constituent atom of the region corresponding to the original core 210. This enables to increase a magnetic flux density generated in these regions by producing an alternating current flow through the coil 230, when compared to a case where the original core 210 and the bridge cores 220a, 220b are separate cores.

Further, also in the present embodiment, similarly to the first embodiment, it is possible to suppress an increase in temperature of the upper core 910 by using the cooling fins 260a to 260h, and the cooling small pipes 270a to 270h.

The above is similarly applied also to the lower inductor 1000.

As described above, also in the present embodiment, similarly to the first embodiment, it is possible to provide the induction heating device capable of simultaneously realizing both the suppression of the temperature of the core to a desired temperature or less and the generation of alternating magnetic field with desired magnitude.

Note that as is clear from the above explanation, the configuration of the present embodiment is one in which the original core, the main core, the edge core, the bridge core, and the partial edge core explained in the first embodiment are replaced with the region corresponding to the original core, the region corresponding to the main core, the region corresponding to the edge core, the region corresponding to the bridge core, and the region corresponding to the partial edge core, respectively. Therefore, by rereading the explanation of the first embodiment with such a replacement, the following preferable ranges are determined.

Preferable range of sheet center-side lapped length L of regions corresponding to bridge cores 220a, 220b (L≥α or the like)

Preferable range of sheet end-side lapped length L' of regions corresponding to bridge cores 220a, 220b (L≥α or the like)

Preferable range of height H of regions corresponding to bridge cores 220a, 220b (H 2 Min (0.5×h, 0.5×α) or the like)

Preferable range of ratio of length BL in y-axis direction of regions corresponding to bridge cores 220a, 220b to length CL in y-axis direction of region corresponding to main core 211 and regions corresponding to partial edge cores 212a to 212d, 213a to 213d (BL/CL≥0.2 or the like)

Modified Example

Figure 14:
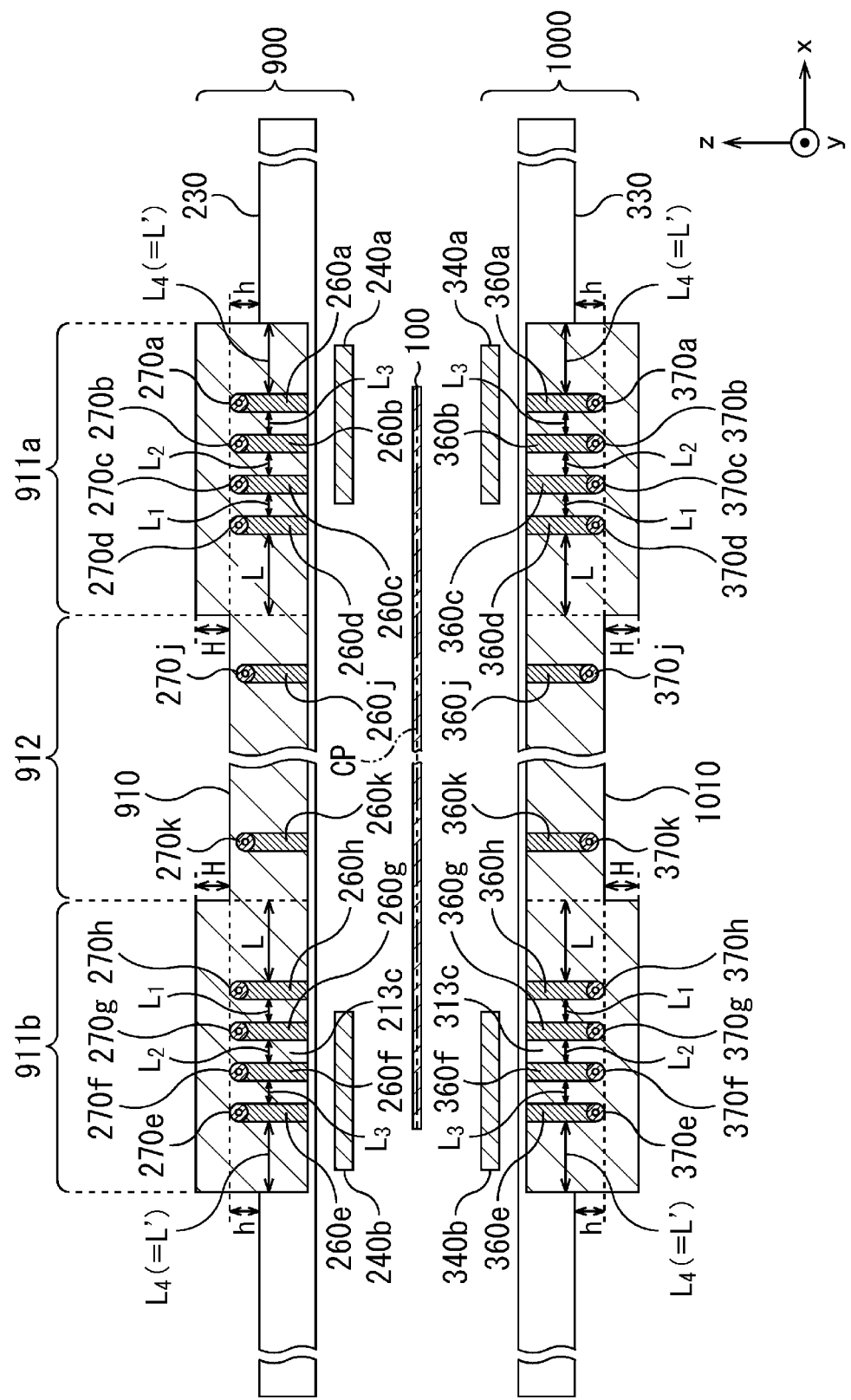
FIG. 14 is a view illustrating a first modified example of the second embodiment of the present invention, and illustrating a first cross section of the induction heating device.

The present embodiment exemplified the case where the shape of the region 912 of the upper core 910 is the rectangular parallelepiped shape. However, the shape of the region 912 of the upper core 910 is not limited to the rectangular parallelepiped shape. For example, as illustrated in FIG. 14, one or more recessed portions may be formed on an end surface on the planned conveyance plane CP side (lower surface) of the region 912 of the upper core 910 (note that FIG. 14 is a sectional view corresponding to FIG. 10). FIG. 14 exemplifies a case where two recessed portions are formed on the region 912 of the upper core 910 in a state of having an interval therebetween in the x-axis direction. Further, as illustrated in FIG. 14, cooling fins 260j to 260k similar to the cooling fins 260a to 260h and cooling small pipes 270*j* to 270*k* similar to the cooling small pipes 270*a* to 270*h* may be arranged in the recessed portions. FIG. 14 exemplifies a case where the height (length in the z-axis direction) of the cooling fins 260*j* to 260*k* is lower than the height of the cooling fins 260*a* to 260*h*, so that the cooling small pipes 270*j* to 270*k* do not reach an end surface on the back side (upper surface) of the region 912. By designing as above, the cooling fins 260*j* to 260*k* and the cooling small pipes 270*j* to 270*k* are arranged in the region 912 of the upper core 910, and at the same time, the regions 911*a*, 911*b*, and the region 912 are integrated and formed as one core.

Further, as illustrated in FIG. 14, also in the lower core 1010, cooling fins 360*j* to 360*k* similar to the cooling fins 360*a* to 360*h* and cooling small pipes 370*j* to 370*k* similar to the cooling small pipes 370*a* to 370*h* may be arranged. FIG. 14 exemplifies a case where the height (length in the z-axis direction) of the cooling fins 360*j* to 360*k* is lower than the height of the cooling fins 360*a* to 360*h*, similarly to the cooling fins 260*j* to 260*k*.

Note that a y-z cross section at a position where the cooling fins 260*j* to 260*k*, 360*j* to 360*k*, and the cooling small pipes 270*j* to 270*k*, 370*j* to 370*k* are arranged corresponds to a cross section in which the lengths in the z-axis direction of the cooling fins 260*a*, 360*a*, the upper core 910, and the lower core 1010 in FIG. 11 are changed to the lengths in the z-axis direction of the cooling fins 260*j* to 260*k*, 360*j* to 360*k*, the upper core 910, and the lower core 1010, respectively, at the position where the cooling fins 260*j* to 260*k*, 360*j* to 360*k*, and the cooling small pipes 270*j* to 270*k*, 370*j* to 370*k* are arranged.

Figure 15:
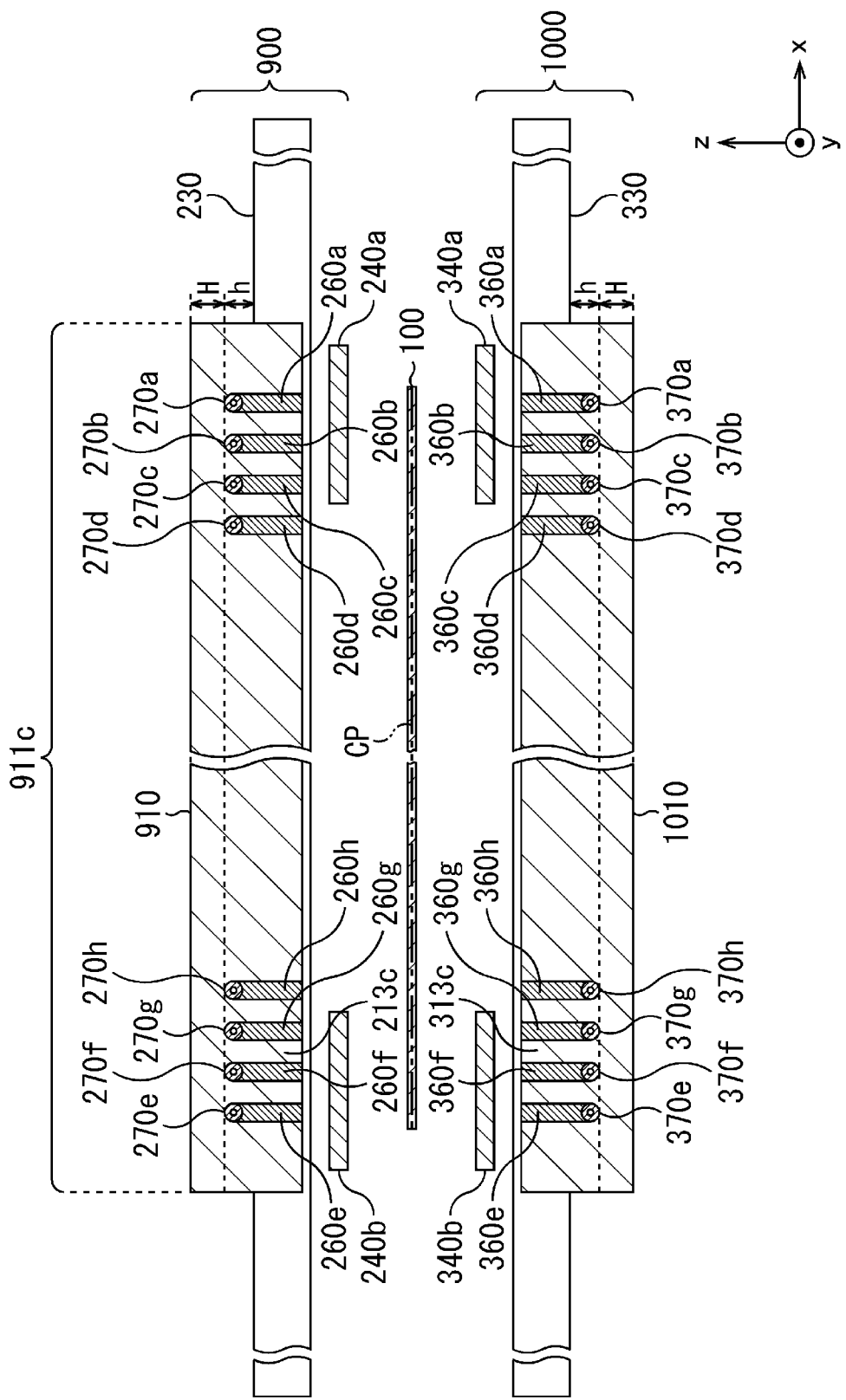
FIG. 15 is a view illustrating a second modified example of the second embodiment of the present invention, and illustrating a first cross section of the induction heating device.

Further, the present embodiment exemplified the case where the height (length in the z-axis direction) of the region 912 of the upper core 910 is lower than the height of the other regions of the upper core 910. However, it is not necessarily designed as above. For example, as illustrated in FIG. 15, the height (length in the z-axis direction) of the upper core 910 may be the same regardless of the position in the x-axis direction. FIG. 15 exemplifies a case where the entire region 911*c* in the x-axis direction of the upper core 910 includes regions corresponding to bridge cores (note that FIG. 15 is a sectional view corresponding to FIG. 10).

The above modified example may also be applied to the lower inductor 1000.

Further, the various modified examples explained in the first embodiment may be applied to the induction heating device of the present embodiment. Further, a modified example combining at least two of the respective modified examples described above including the modified examples explained in the first embodiment, may be applied to the induction heating device of the present embodiment.

Third Embodiment

Next, a third embodiment of the present invention will be described. The first embodiment exemplified the case where the non-magnetic conductors configured to be able to perform cooling are arranged between the main core 211 and the edge cores 212, 213, and between the mutually adjacent partial edge cores 212*a* to 212*d*, 213*a* to 213*d*. The present embodiment exemplifies a case where, in addition to the above, non-magnetic conductors configured to be able to perform cooling are arranged on end surfaces on the back side (upper surfaces) of the bridge cores 220*a* to 220*b*, and end surfaces on the back side (lower surfaces) of the bridge cores 320*a* to 320*b*. By designing as above, it is possible to further lower the temperatures of the bridge cores 220*a* to 220*b*, 320*a* to 320*b*. As described above, in the present embodiment, the configuration for lowering the temperatures of the bridge cores 220*a* to 220*b*, 320*a* to 320*b* is added to the induction heating device of the first embodiment. Therefore, in the explanation of the present embodiment, parts same as those of the first embodiment and the second embodiment are denoted by the same reference numerals as those given to FIG. 1 to FIG. 15, and a detailed explanation thereof will be omitted.

Figure 16:
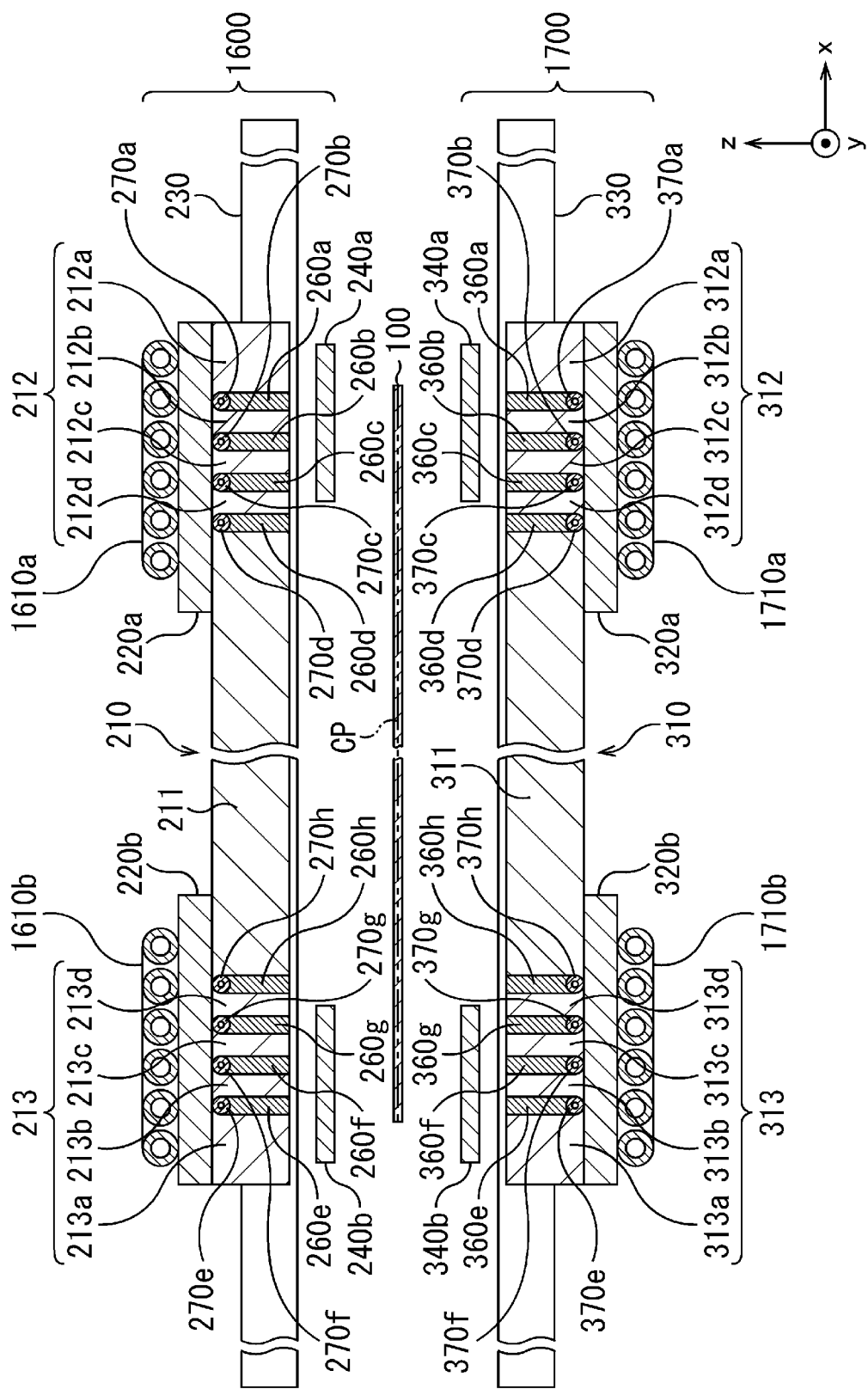
FIG. 16 is a view illustrating a third embodiment of the present invention, and illustrating one example of a first cross section of the induction heating device.
Figure 17:
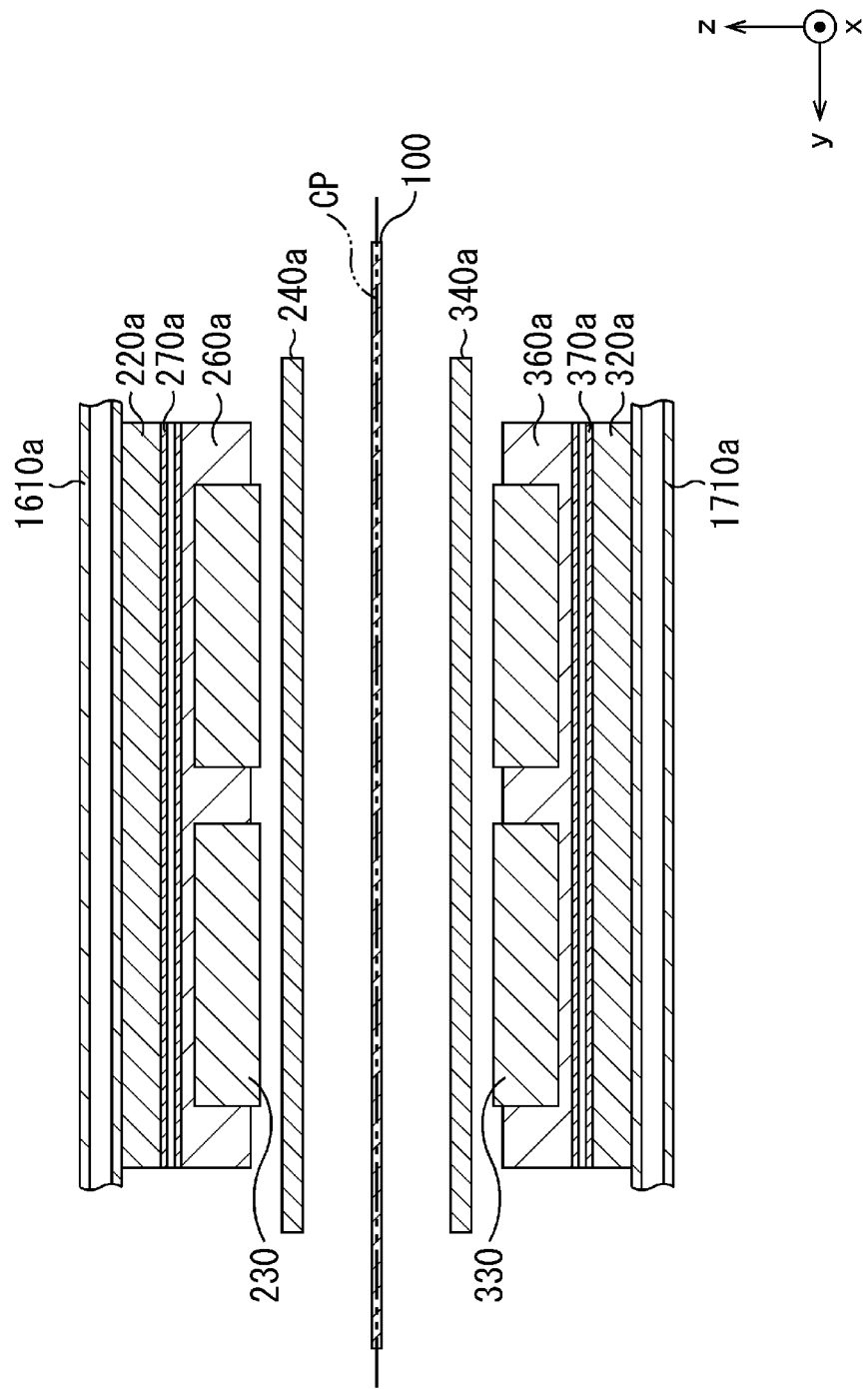
FIG. 17 is a view illustrating the third embodiment of the present invention, and illustrating one example of a second cross section of the induction heating device.

FIG. 16 is a view illustrating one example of a first cross section of the induction heating device, and is a view corresponding to FIG. 2. FIG. 17 is a view illustrating one example of a second cross section of the induction heating device, and is a view corresponding to FIG. 3. Also in the present embodiment, similarly to the first embodiment, a case is exemplified in which the induction heating device has a shape in a relation of mirror symmetry in which a y-z plane at a center in the x-axis direction of the induction heating device is set to a plane of symmetry.

In FIG. 16 and FIG. 17, a case is exemplified in which cooling pipes 1610*a*, 1610*b* are arranged on end surfaces on the back side (upper surfaces) of the bridge cores 220*a*, 220*b* of an upper inductor 1600. In like manner, FIG. 16 and FIG. 17 exemplify a case where cooling pipes 1710*a*, 1710*b* are arranged on end surfaces on the back side (lower surfaces) of the bridge cores 320*a*, 320*b* of a lower inductor 1700. Further, the present embodiment exemplifies a case where an external shape of the cooling pipes 1610*a*, 1610*b*, 1710*a*, 1710*b* is a zigzag shape.

The cooling pipes 1610*a*, 1610*b* are arranged in a zigzag shape on the end surfaces on the back side (upper surfaces) of the bridge cores 220*a*, 220*b*. Further, the cooling pipes 1610*a*, 1610*b* are in contact with the bridge cores 220*a*, 220*b*. The cooling pipes 1610*a*, 1610*b* are formed by non-magnetic conductors made of copper or the like, for example.

In like manner, the cooling pipes 1710*a*, 1710*b* are arranged in a zigzag shape on the end surfaces on the back side (lower surfaces) of the bridge cores 320*a*, 320*b*. Further, the cooling pipes 1710*a*, 1710*b* are in contact with the bridge cores 320*a*, 320*b*. The cooling pipes 1710*a*, 1710*b* are also formed by non-magnetic conductors made of copper or the like, for example.

In the configuration of the first embodiment, it is possible to suppress the increase in temperatures of the bridge cores 220*a*, 220*b* by the cooling small pipes 270*a* to 270*h* and the air cooling, for example. However, with such a configuration, when a temperature of a periphery of the induction heating device is high, for example, it may not be able to lower the temperatures of the bridge cores 220*a*, 220*b* to a desired temperature. On the contrary, in the present embodiment, the cooling pipes 1610*a*, 1610*b* are arranged on the end surfaces on the back side (upper surfaces) of the bridge cores 220*a*, 220*b*. Therefore, the temperatures of the bridge cores 220*a*, 220*b* can be lowered more, when compared to the configuration of the first embodiment. As described above, the present embodiment exhibits the effect of enabling the temperatures of the bridge cores 220*a*, 220*b* to be surely lowered, in addition to the effects explained in the first embodiment.

The above is similarly applied also to the lower inductor 1700.

Modified Example

The present embodiment exemplified the case where the cooling pipes 1610*a*, 1610*b* are used as an example of the cooling members for cooling the bridge cores 220*a*, 220*b*.

However, the cooling members for cooling the bridge cores 220a, 220b are not limited to such cooling members. For example, the cooling members for cooling the bridge cores 220a, 220b may also be plate-shaped non-magnetic conductors. When it is designed as above, the plate-shaped non-magnetic conductors may be cooled through heat conduction.

Further, the present embodiment exemplified the case where the cooling pipes 1610a, 1610b are added to the induction heating device of the first embodiment. However, it is also possible that the cooling pipes 1610a, 1610b are added to the induction heating device of the second embodiment.

The above modified example may also be applied to the lower inductor 1700.

Further, the various modified examples explained in the first embodiment and the second embodiment may be applied to the induction heating device of the present embodiment. Further, a modified example combining at least two of the respective modified examples described above including the modified examples explained in the first embodiment and the second embodiment, may be applied to the induction heating device of the present embodiment.

Fourth Embodiment

Next, a fourth embodiment will be explained. The first embodiment exemplified the case where the intervals (distances in the z-axis direction) between the tip surfaces of the center leg portions, the upstream-side leg portions, and the downstream-side leg portions, respectively, provided to the original cores 210, 310 (the main cores 211, 311, and the partial edge cores 212a to 212d, 213a to 213d, 312a to 312d, 313a to 313d) and the planned conveyance plane CP are the same. On the contrary, the present embodiment exemplifies a case where an interval between a tip surface of a center leg portion provided to an original core and the planned conveyance plane CP, is shorter than an interval between a region of the original core except for the center leg portion thereof and the planned conveyance plane CP. As described above, the present embodiment is different from the first to third embodiments mainly in the configuration of the original core.

Therefore, in the explanation of the present embodiment, parts same as those of the first embodiment are denoted by the same reference numerals as those given to FIG. 1 to FIG. 8, and a detailed explanation thereof will be omitted.

Figure 18:
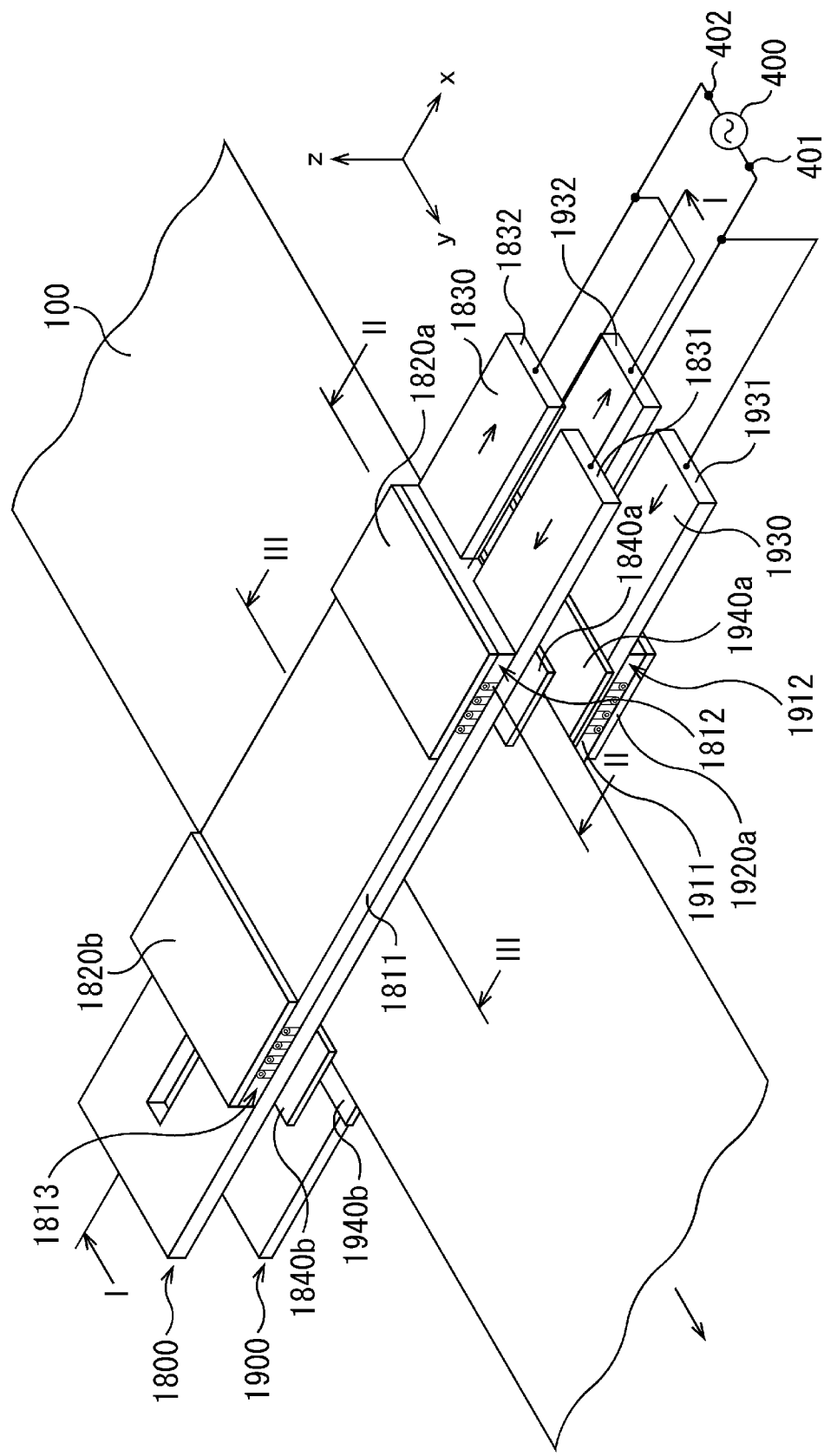
FIG. 18 is a view illustrating a fourth embodiment of the present invention, and illustrating one example of an external configuration of an induction heating device.

FIG. 18 is a view illustrating one example of an external configuration of an induction heating device. FIG. 18 is a view corresponding to FIG. 1.

The induction heating device illustrated in FIG. 18 includes an upper inductor 1800 and a lower inductor 1900. The upper inductor 1800 and the lower inductor 1900 are arranged at positions facing each other with the planned conveyance plane CP of the band-shaped steel sheet 100 interposed therebetween (refer to FIG. 19 to FIG. 21). The upper inductor 1800 and the lower inductor 1900 have the same configuration. Therefore, the upper inductor 1800 will be explained here in detail, and a detailed explanation regarding the lower inductor 1900 will be omitted at pleasure.

Note that an interval between the upper inductor 1800 and the planned conveyance plane CP and an interval between the lower inductor 1900 and the planned conveyance plane CP may be the same or different. Similarly to the first embodiment, the present embodiment also exemplifies a case where the induction heating device has a shape in a relation of mirror symmetry in which a y-z plane at a center in the x-axis direction of the induction heating device is set to a plane of symmetry. When the interval between the upper inductor 1800 and the planned conveyance plane CP and the interval between the lower inductor 1900 and the planned conveyance plane CP are the same, the induction heating device has a shape in a relation of mirror symmetry in which the planned conveyance plane CP is set to a plane of symmetry.

Figure 19:
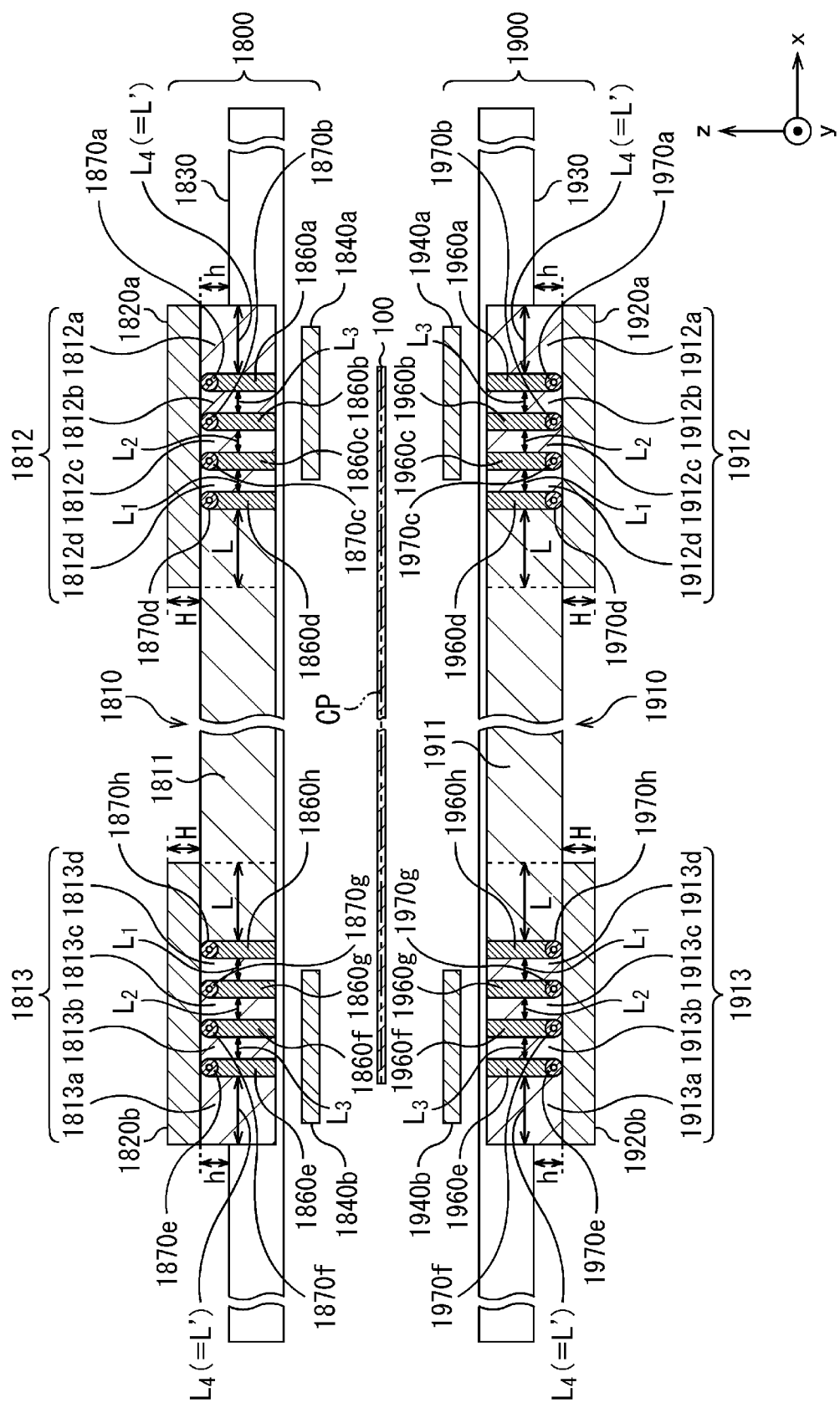
FIG. 19 is a view illustrating the fourth embodiment of the present invention, and illustrating one example of a first cross section of the induction heating device.

FIG. 19 is a view illustrating one example of a first cross section of the induction heating device. Concretely, FIG. 19 is a sectional view taken along I-I in FIG. 18, and is a view corresponding to FIG. 2. FIG. 20 is a view illustrating one example of a second cross section of the induction heating device. Concretely, FIG. 20 is a sectional view taken along II-II in FIG. 18, and is a view corresponding to FIG. 3. FIG. 21 is a view illustrating one example of a third cross section of the induction heating device. Concretely, FIG. 21 is a sectional view taken along III-III in FIG. 18, and is a view corresponding to FIG. 4.

In FIG. 18 and FIG. 19, the upper inductor 1800 includes an original core 1810, bridge cores 1820a to 1820b, a coil 1830, shield plates 1840a to 1840b, cooling fins 1860a to 1860h, and cooling small pipes 1870a to 1870h.

The original core 1810 has a main core 1811, and edge cores 1812, 1813. The main core 1811 and the edge cores 1812, 1813 are arranged in a state of having an interval therebetween in the x-axis direction.

The main core 1811 is a ferromagnet arranged at a position closest to the center position in the x-axis direction of the induction heating device, out of the main core 1811 and the edge cores 1812, 1813. The edge cores 1812, 1813 are ferromagnets arranged on end portion sides in the x-axis direction of the original core 1810, relative to the main core 1811. The edge cores 1812, 1813 have a plurality of partial edge cores 1812a to 1812d, 1813a to 1813d. The plurality of partial edge cores 1812a to 1812d, 1813a to 1813d are arranged in a state of having an interval therebetween in the x-axis direction. Further, the partial edge cores 1812d, 1813d at positions closest to the main core 1811, out of the plurality of partial edge cores 1812a to 1812d, 1813a to 1813d, and the main core 1811 are also arranged in a state of having an interval therebetween in the x-axis direction.

The present embodiment exemplifies a case where the main core 1811 is formed by a plurality of electromagnetic steel sheets laminated in the x-axis direction, each having the same thickness and the same planar shape. In like manner, the present embodiment exemplifies a case where the edge cores 1812, 1813 (the partial edge cores 1812a to 1812d, 1813a to 1813d) are formed by a plurality of electromagnetic steel sheets laminated in the x-axis direction, each having the same thickness and the same planar shape. Further, the present embodiment exemplifies a case where the thickness and the planar shape of the electromagnetic steel sheet forming the main core 1811, and the thickness and the planar shape of the electromagnetic steel sheet forming the edge cores 1812, 1813 are the same. Further, the present embodiment exemplifies a case where the number of laminating of the electromagnetic steel sheets forming the main core 1811, and the number of laminating of the electromagnetic steel sheets forming the edge cores 1812, 1813 (the partial edge cores 1812a to 1812d, 1813a to 1813d) are different.

The plurality of electromagnetic steel sheets forming the main core 1811 are fixed so as not to be separated from each other. Further, the plurality of electromagnetic steel sheets forming each of the partial edge cores 1812a to 1812d, 1813a to 1813d, are also fixed so as not to be separated from each other. A method of fixing the plurality of electromagnetic steel sheets is unlimited. For example, publicly-known various methods such as fixing with an adhesive, fixing by welding, fixing by caulking, and fixing using a fixing member, are employed as the method of fixing the plurality of electromagnetic steel sheets. Note that the thickness and the planar shape of the electromagnetic steel sheet forming the main core 1811, and the thickness and the planar shape of the electromagnetic steel sheet forming the edge cores 1812, 1813 are not necessarily the same. Further, for the convenience of notation, an illustration of boundary lines of individual electromagnetic steel sheets is omitted in FIG. 19. The present embodiment exemplifies a case where the main cores 1811, 1911, and the edge cores 1812 to 1813, 1912 to 1913 (the plurality of partial edge cores 1812a to 1812d, 1813a to 1813d, 1912a to 1912d, 1913a to 1913d) are used to form the partial cores.

As illustrated in FIG. 21, the main cores 1811, 1911 have body portions 18111, 19111, and center leg portions 18112, 19112. FIG. 21 exemplifies a case where the body portion 18111 and the center leg portion 18112 are integrated. In like manner, FIG. 21 exemplifies a case where the body portion 19111 and the center leg portion 19112 are also integrated. Note that a two-dot chain line indicating the body portions 18111, 19111, and the center leg portions 18112, 19112 is a virtual line, as described above.

The body portions 18111, 19111 are extended in a direction parallel to the conveyance direction (the y-axis direction) from regions on the upstream side (the y-axis positive direction side) of the coils 1830, 1930 to regions on the downstream side (the y-axis negative direction side) of the coils 1830, 1930, on the back side of the coils 1830, 1930, respectively.

The center leg portions 18112, 19112 are extended in a direction of the planned conveyance plane CP from the body portions 18111, 19111 so as to pass through hollow portions of the coils 1830, 1930, respectively. It is preferable that positions in the y-axis direction of the center leg portions 18112, 19112 include positions in the y-axis direction of axial centers of the coils 1830, 1930. Specifically, coordinates that overlap with y-coordinates of the axial centers of the coils 1830, 1930 preferably exist in y-coordinates of the center leg portions 18112, 19112. The present embodiment exemplifies a case where positions in an x-y plane (x-y coordinates) of gravity centers of the center leg portions 18112, 19112, and positions in an x-y plane (x-y coordinates) of the axial centers of the coils 1830, 1930 are coincident.

The center leg portions 18112, 19112 are core teeth. Tip surfaces of the center leg portions 18112, 19112 are respectively pole faces. The body portions 18111, 19111 are core yokes.

An outer shape of the entire y-z cross section of the edge cores 1812, 1813, 1912, 1913 is the same as an outer shape of the entire y-z cross section of the main cores 1811, 1911 illustrated in FIG. 21. In FIG. 21, (1812, 1813), (1912, 1913) given after 1811, 1911 mean this.

Therefore, the edge cores 1812, 1813, 1912, 1913 (the partial edge cores 1812a to 1812d, 1813a to 1813d, 1912a to 1912d, 1913a to 1913d) also have body portions, center leg portions, upstream-side leg portions, and downstream-side leg portions, similarly to the main cores 1811, 1911. A length of the body portion in the y-axis direction and the z-axis direction, a length of the center leg portion in the y-axis direction and the z-axis direction, a length of the upstream-side leg portion in the y-axis direction and the z-axis direction, and a length of the downstream-side leg portion in the y-axis direction and the z-axis direction are the same between the main cores 1811, 1911, and the partial edge cores 1812a to 1812d, 1813a to 1813d, 1912a to 1912d, 1913a to 1913d. On the other hand, a length of the body portion in the x-axis direction, a length of the center leg portion in the x-axis direction, a length of the upstream-side leg portion in the x-axis direction, and a length of the downstream-side leg portion in the x-axis direction of the main cores 1811, 1911 are longer than those of the partial edge cores 1812a to 1812d, 1813a to 1813d, 1912a to 1912d, 1913a to 1913d.

An outer shape of the entire y-z cross section of the bridge cores 1820b, 1920a to 1920b is the same as an outer shape of the entire y-z cross section of the bridge cores 1820a, 1920a (refer to FIG. 20).

As described above, each of the shape of the surface parallel to the y-z plane of the main core 1811 and the shape of the surface parallel to the y-z plane of the edge cores 1812, 1813 is a T-shape (refer to the outer shape of the main cores 1811, 1911 illustrated in FIG. 21). Specifically, the main core 1811 and the edge cores 1812, 1813 are so-called T-shaped cores. On the contrary, the main core 211 and the edge cores 212, 213 in the first embodiment are so-called E-shaped cores. Therefore, the main core 1811 and the edge cores 1812, 1813 do not have the upstream-side leg portions and the downstream-side leg portions provided to the main core 211 and the edge cores 212, 213. This is a point of difference between the main core 211 and the edge cores 212, 213 in the first embodiment, and the main core 1811 and the edge cores 1812, 1813 in the present embodiment.

The coil 1830 is a conductor having a circumferential portion. Note that FIG. 18 exemplifies a case where a portion with a thickness (a portion except for a straight line extended from an alternating-current power supply 400) corresponds to the circumferential portion of the coil 1830. The circumferential portion of the coil 1830 is arranged around the center leg portion of the original core 1810 in a racetrack form by passing through a slot of the original core 1810, in the x-y plane. The size of the surface parallel to the x-y plane of the coil 230 in the first embodiment is determined according to the size of the slot of the original core 210. On the contrary, the size of the surface parallel to the x-y plane of the coil 1830 in the present embodiment is determined according to the size of the slot of the original core 1810. This is a point of difference between the coil 230 in the first embodiment and the coil 1830 in the present embodiment. As illustrated in FIG. 18 and FIG. 19, a length in the x-axis direction of the circumferential portions of the coils 1830, 1930 is longer than the width of the band-shaped steel sheet 100 (planned conveyance plane CP). Further, both ends in the x-axis direction of the circumferential portions of the coils 1830, 1930 exist on the outer side of the both ends in the x-axis direction of the band-shaped steel sheet 100 (planned conveyance plane CP). Note that the coil 1830 may have an insulator arranged around the conductor.

As illustrated in FIG. 18, the alternating-current power supply 400 is electrically connected to the coils 1830, 1930. As illustrated in FIG. 18, in the present embodiment, one end portion 1831 of the circumferential portion of the coil 1830 is electrically connected to one terminal 401 out of two output terminals of the alternating-current power supply 400. Further, the other end portion 1832 of the circumferential portion of the coil 1830 is electrically connected to the other terminal 402 out of the two output terminals of the alternating-current power supply 400.

Further, out of two end portions of the circumferential portion of the coil 1930, one end portion 1931 at a position facing the one end portion 1831 of the circumferential portion of the coil 1830 in the z-axis direction is electrically connected to one terminal 401 out of the two output terminals of the alternating-current power supply 400. Further, out of the two end portions of the circumferential portion of the coil 1930, the other end portion 1932 at a position facing the other end portion 1832 of the coil 1830 in the z-axis direction is electrically connected to the other terminal 402 out of the two output terminals of the alternating-current power supply 400.

As described above, in the present embodiment, the coil 1830 and the coil 1930 are connected in parallel to the alternating-current power supply 400 so that the winding directions of the coil 1830 and the coil 1930 are mutually the same when seen from the alternating-current power supply 400.

Therefore, as illustrated in FIG. 18, when seen from the same viewpoint at the same time, directions of alternating currents flowing through the mutually facing regions of the coil 1830 and the coil 1930 are mutually the same (refer to arrow mark lines indicated in the coil 1830 and the coil 1930 in FIG. 18).

Note that FIG. 19 to FIG. 21 exemplify a case where the end portion on the planned conveyance plane CP side of the coil 1830 is positioned on the band-shaped steel sheet 100 side, relative to the tip surface (the surface at the position closest to the planned conveyance plane CP) of the original core 1810. However, the end portion on the planned conveyance plane CP side of the coil 1830 and the tip surface of the original core 1810 may be substantially flush with each other.

In FIG. 19, cooling fins 1860*a*, 1860*b*, 1860*c*, 1860*d* are arranged between the partial edge cores 1812*a* and 1812*b*, between the partial edge cores 1812*b* and 1812*c*, between the partial edge cores 1812*c* and 1812*d*, and between the partial edge core 1812*d* and the main core 1811, respectively. In like manner, cooling fins 1860*e*, 1860*f*, 1860*g*, 1860*h* are arranged between the partial edge cores 1813*a* and 1813*b*, between the partial edge cores 1813*b* and 1813*c*, between the partial edge cores 1813*c* and 1813*d*, and between the partial edge core 1813*d* and the main core 1811, respectively. Note that the present embodiment exemplifies a case where the intervals between these are fixed (not changed), similarly to the first embodiment. However, the intervals between these may be changeable.

Each of the cooling fins 1860*a* to 1860*h* is one example of a cooling member for cooling the main core 1811 and the partial edge cores 1812*a* to 1812*d*, 1813*a* to 1813*d*. The present embodiment also exemplifies a case where the cooling fins 1860*a* to 1860*h* are fin-shaped non-magnetic conductor plates, similarly to the first embodiment. The cooling fins 1860*a* to 1860*h* are formed by copper plates, for example.

Onto the cooling fins 1860*a* to 1860*h*, the cooling small pipes 1870*a* to 1870*h* are attached. Each of the cooling small pipes 1870*a* to 1870*h* is one example of a cooling member for cooling the main core 1811, the partial edge cores 1812*a* to 1812*d*, 1813*a* to 1813*d*, and the bridge cores 1820*a*, 1820*b*. The present embodiment also exemplifies a case where the cooling small pipes 1870*a* to 1870*h* are non-magnetic conductor pipes, similarly to the first embodiment.

The cooling fins 1860*a* to 1860*h* and the cooling small pipes 1870*a* to 1870*h* attached onto the cooling fins are in contact with each other. Further, in FIG. 20 and FIG. 21, a case is exemplified in which an outer shape of the entire y-z cross section of a region combining the cooling fins 1860*a* to 1860*h* and the cooling small pipes 1870*a* to 1870*h*, is the same as an outer shape of a y-z cross section of the original core 1810 (the main core 1811 and the partial edge cores 1812*a* to 1812*d*, 1813*a* to 1813*d*). Specifically, in FIG. 20 and FIG. 21, a case is exemplified in which a shape and a size of the entire region of the cooling fin 1860*a* and the cooling small pipe 1870*a* in FIG. 20 are the same as a shape and a size of the main core 1811 in FIG. 21. Into the cooling small pipes 1870*a* to 1870*h*, a cooling medium such as cooling water is supplied, similarly to the cooling small pipes 270*a* to 270*h*.

As illustrated in FIG. 3 and FIG. 4, an outer shape of the entire y-z cross section of the main core 211 of the first embodiment is an E-shape. Further, an outer shape of the entire y-z cross section of a region combining the cooling fins 260*a* to 260*h*, and the cooling small pipes 270*a* to 270*h* attached onto the cooling fins is also an E-shape. Further, an outer shape of the entire y-z cross section of the partial edge cores 212*a* to 212*d*, 213*a* to 213*d* of the first embodiment is also an E-shape. On the contrary, as illustrated in FIG. 20 and FIG. 21, an outer shape of the entire y-z cross section of the main core 1811 of the present embodiment is a T-shape. Further, an outer shape of the entire y-z cross section of a region combining the cooling fins 1860*a* to 1860*h*, and the cooling small pipes 1870*a* to 1870*h* attached onto the cooling fins is also a T-shape. Further, an outer shape of the entire y-z cross section of the partial edge cores 1812*a* to 1812*d*, 1813*a* to 1813*d* of the present embodiment is also a T-shape. This is a point of difference between the main core 211, the edge cores 212, 213, the cooling fins 260*a* to 260*h*, and the cooling small pipes 270*a* to 270*h* of the first embodiment, and the main core 1811, the edge cores 1812, 1813, the cooling fins 1860*a* to 1860*h*, and the cooling small pipes 1870*a* to 1870*h* of the present embodiment.

Also in the present embodiment, similarly to the first embodiment, the cooling members arranged between the main core 1811 and the partial edge cores 1812*d*, 1813*d*, between the main core 1911 and the partial edge cores 1912*d*, 1913*d*, between the partial edge cores 1812*a* and 1812*d*, 1813*a* and 1813*d*, 1912*a* and 1912*d*, 1913*a* and 1913*d*, are not necessarily the cooling fins 1860*a* to 1860*h*, 1960*a* to 1960*h*, and the cooling small pipes 1870*a* to 1870*h*, 1970*a* to 1970*h*, as long as non-magnetic conductors configured to be able to perform cooling are used. Further, the cooling members may not be arranged in the regions between the main core 1811 and the partial edge cores 1812*d*, 1813*d*, and between the main core 1911 and the partial edge cores 1912*d*, 1913*d*, and the regions between the partial edge cores 1812*a* and 1812*d*, 1813*a* and 1813*d*, 1912*a* and 1912*d*, 1913*a* and 1913*d*. The regions between the main core 1811 and the partial edge cores 1812*d*, 1813*d*, and between the main core 1911 and the partial edge cores 1912*d*, 1913*d*, and the regions between the partial edge cores 1812*a* and 1812*d*, 1813*a* and 1813*d*, 1912*a* and 1912*d*, 1913*a* and 1913*d* may also be voids. Further, a length in the x-axis direction of the region of the voids may be increased to be longer than the length illustrated in FIG. 19, to thereby enhance a cooling effect through air cooling.

Each of the shield plates 1840*a*, 1840*b* is one example of a shield member for preventing overheating of an edge portion of the band-shaped steel sheet 100 by adjusting (reducing) the degree of electromagnetic coupling between the coil 1830 and the band-shaped steel sheet 100. The size of the surface parallel to the x-y plane of the shield plates 240*a*, 240*b* of the first embodiment is determined in accordance with the size of the surface parallel to the x-y plane of the original core 210. On the contrary, the size of the surface parallel to the x-y plane of the shield plates 1840*a*, 1840*b* of the present embodiment is determined in accordance with the size of the surface parallel to the x-y plane of the original core 1810. This is a point of difference between the shield plates 240*a*, 240*b* of the first embodiment and the shield plates 1840*a*, 1840*b* of the present embodiment. Therefore, the shield plates 1840*a*, 1840*b* may also move along the x-axis direction within their movable ranges, similarly to the shield plates 240*a*, 240*b* of the first embodiment. Further, when the meandering amount of the band-shaped steel sheet 100 exceeds an order of cm, it is preferable to move the entire induction heating device (the upper inductor 1800 and the lower inductor 1900) in the x-axis direction (the direction in which the band-shaped steel sheet 100 meanders) by an amount same as the meandering amount of the band-shaped steel sheet 100, which is also similar to the first embodiment.

The bridge cores 1820*a*, 1820*b* are ferromagnets capable of being magnetically coupled to at least one core out of the main core 1811 and the partial edge cores 1812*a* to 1812*d*, 1813*a* to 1813*d*. The present embodiment also exemplifies a case where the bridge cores 1820*a*, 1820*b* contain soft magnetic ferrite (a ferromagnet having isotropy on magnetization direction), similarly to the first embodiment. Further, the present embodiment also exemplifies a case where the bridge core 1820*a* can be magnetically coupled to the main core 1811 and the partial edge cores 1812*a* to 1812*d*, and the bridge core 1820*b* can be magnetically coupled to the main core 1811 and the partial edge cores 1813*a* to 1813*d*, similarly to the first embodiment.

As illustrated in FIG. 19, the bridge cores 1820*a*, 1820*b* are arranged on both sides in the x-axis direction in a state of having an interval therebetween. Further, FIG. 19 exemplifies a case where, when seen from the z-axis direction, the bridge cores 1820*a*, 1820*b* are arranged so as to be overlapped with a part of the main core 1811. Further, FIG. 19 exemplifies a case where, when seen from the z-axis direction, the bridge cores 1820*a*, 1820*b* are respectively arranged so as to be overlapped with at least a part of the partial edge cores 1812*a* to 1812*d*, 1813*a* to 1813*d*, respectively.

Here, one example of the arrangement of the bridge cores 1820*a*, 1820*b* in the present embodiment will be explained more concretely while referring to FIG. 19. An end surface on the planned conveyance plane CP side (lower surface) of the bridge core 1820*a* is in contact with a part of an end surface on the back side (upper surface) of the main core 1811, all of end surfaces on the back side (upper surfaces) of the partial edge cores 1812*a* to 1812*d*, and all of end surfaces on the back side (upper surfaces) of the cooling small pipes 1870*a* to 1870*d*. Further, an end surface on the planned conveyance plane CP side (lower surface) of the bridge core 1820*b* is in contact with a part of an end surface on the back side (upper surface) of the main core 1811, all of end surfaces on the back side (upper surfaces) of the partial edge cores 1813*a* to 1813*d*, and all of end surfaces on the back side (upper surfaces) of the cooling small pipes 1870*e* to 1870*h*.

However, if the bridge cores 1820*a*, 1820*b*, and the main core 1811 and the edge cores 1812, 1813 can be magnetically coupled, there is no need to make the bridge cores 1820*a*, 1820*b*, and the main core 1811 and the edge cores 1812, 1813 to be in contact with each other. For example, the bridge cores 1820*a*, 1820*b* may be arranged in a state of having an interval with respect to the main core 1811 and the edge cores 1812, 1813. Further, the bridge cores 1820*a*, 1820*b* may be in contact with or face while having an interval with respect to only either of the main core 1811 and the edge cores 1812, 1813.

As described above, the present embodiment exemplifies a case where each of the main core 1811 and the edge cores 1812, 1813 can be magnetically coupled to at least either the bridge core 1820*a* or 1820*b*.

The size of the surface parallel to the x-y plane of the bridge cores 220*a*, 220*b* of the first embodiment is determined in accordance with the size of the surface parallel to the x-y plane of the original core 210 and the cooling small pipes 270*a* to 270*h*. On the contrary, the size of the surface parallel to the x-y plane of the bridge cores 1820*a*, 1820*b* of the present embodiment is determined in accordance with the size of the surface parallel to the x-y plane of the original core 1810 and the cooling small pipes 1870*a* to 1870*h*. This is a point of difference between the bridge cores 220*a*, 220*b* of the first embodiment and the bridge cores 1820*a*, 1820*b* of the present embodiment.

Therefore, by rereading the explanation of the first embodiment while replacing the reference numerals given to the original core, the bridge core, the main core, the partial edge core, the cooling fin, the cooling small pipe, the coil, and the shield plate in the first embodiment with the reference numerals given in the present embodiment, the following ranges are determined.

Range of sheet center-side lapped length L of bridge cores 1820*a*, 1820*b* (L≥β)

Range of sheet end-side lapped length L' of bridge cores 1820*a*, 1820*b* (L'>0 or the like)

Range of height H of bridge cores 1820*a*, 1820*b* (H=0.5× h, H=0.5×α, or the like)

Range of ratio of length BL in y-axis direction of bridge cores 1820*a*, 1820*b* to length CL in y-axis direction of main core 1811 and partial edge cores 1812*a* to 1812*d*, 1813*a* to 1813*d* (BL/CL>0.2 or the like).

Similarly to the upper inductor 1800, the lower inductor 1900 also includes an original core 1910 including a main core 1911 and edge cores 1912, 1913 (partial edge cores 1912*a* to 1912*d*, 1913*a* to 1913*d*), bridge cores 1920*a*, 1920*b*, a coil 1930, shield plates 1940*a*, 1940*b*, cooling fins 1960*a* to 1960*h*, and cooling small pipes 1970*a* to 1970*h*, and has a configuration same as that of the upper inductor 1800.

As described above, in the present embodiment, the original cores 1810, 1910 are formed as so-called T-shaped cores. When the original cores 210, 310 are formed as E-shaped cores, a magnetic flux line connecting tip surfaces (pole faces) of two leg portions out of the three leg portions (the center leg portion, the upstream-side leg portion, and the downstream-side leg portion) provided to each of the original cores 210, 310 may be generated. Therefore, when the original cores 1810, 1910 are formed as so-called T-shaped cores, the amount of magnetic fluxes intersecting the band-shaped steel sheet 100 in the z-axis direction can be increased more than a case where the original cores 210, 310 are formed as so-called E-shaped cores. Accordingly, when the original cores 1810, 1910 are formed as so-called T-shaped cores, the heating efficiency of the band-shaped steel sheet 100 can be increased more than a case where the original cores 210, 310 are formed as so-called E-shaped cores.

On the other hand, when the original cores 1810, 1910 are formed as so-called T-shaped cores, eddy currents generated in the shield plates 1840*a*, 1840*b* are increased as the amount of magnetic fluxes intersecting the band-shaped steel sheet 100 in the z-axis direction increases. Accordingly, the magnetic fluxes generated in the upper inductor 1800 and the lower inductor 1900 are likely to be reflected by the eddy currents generated in the shield plates 1840a, 1840b, and are easily diffused to the periphery as a noise.

From the above, when the heating efficiency of the band-shaped steel sheet 100 is prioritized over the reduction in noise, for example, the induction heating device of the present embodiment may be adopted. On the other hand, when the reduction in noise is prioritized over the heating efficiency of the band-shaped steel sheet 100, for example, the induction heating device of the first embodiment may be adopted.

Modified Example

The present embodiment exemplified the case where the original cores 1810, 1910 are formed as so-called T-shaped cores. However, the original cores may not be so-called T-shaped cores as long as the interval between the tip surface of the center leg portion of each of the original cores and the planned conveyance plane CP is shorter than the interval between a region of each of the original cores except for the center leg portion thereof, and the planned conveyance plane CP. For example, each of the main cores and the partial edge cores may have, in addition to the center leg portion, the upstream-side leg portion and the downstream-side leg portion explained in the first embodiment. In such a case, an interval between a tip surface of the center leg portion and the planned conveyance plane CP is preferably shorter than an interval between a tip surface of the upstream-side leg portion and the planned conveyance plane CP and an interval between a tip surface of the downstream-side leg portion and the planned conveyance plane CP. In such a case, a shape of a surface parallel to a y-z plane of the original core (the main core and the edge cores) is an E-shape in which a length of middle horizontal line is longer than two upper and lower horizontal lines. Further, a shape of the original core is not limited to the shape illustrated in the first embodiment and the present embodiment.

Further, not only the modified examples explained in the present embodiment but also the various modified examples explained in the first embodiment may be applied to the induction heating device of the present embodiment. Further, as in the second embodiment, the original core 1810 (the main core 1811 and the edge cores 1812, 1813) and the bridge cores 1820a, 1820b may be formed as one core, and the original core 1910 (the main core 1911 and the edge cores 1912, 1913) and the bridge cores 1920a, 1920b may be formed as one core. Further, as in the third embodiment, non-magnetic conductors (cooling pipes, for example) configured to be able to perform cooling may be arranged on end surfaces on the back side (upper surfaces) of the bridge cores 1820a, 1820b, and end surfaces on the back side (lower surfaces) of the bridge cores 1920a, 1920b. Further, both the second embodiment and the third embodiment may be applied to the induction heating device of the present embodiment. Besides, also in a case where any of the above is applied to the induction heating device of the present embodiment, the various modified examples explained in the respective embodiments may be adopted. Further, a modified example combining at least two of the respective modified examples described above including the modified examples explained in the first embodiment, the second embodiment, and the third embodiment may be applied to the induction heating device of the present embodiment.

Note that as described above, the only difference between the present embodiment and the first embodiment is the difference in shape between the original cores 213, 310, and the original cores 1810, 1910, so that a person skilled in the art can understand an embodiment in which at least either of the second embodiment and the third embodiment is applied to the present embodiment. Therefore, a detailed explanation regarding a case where at least either of the second embodiment and the third embodiment is applied to the present embodiment will be omitted.

Further, as in the first, third, and fourth embodiments, when the original cores 210, 310, 1810, 1910, and the bridge cores 220a, 220b, 320a, 320b, 1820a, 1820b, 1920a, 1920b are separate cores, the bridge cores 220a, 220b, 320a, 320b, 1820a, 1820b, 1920a, 1920b may be moved along the x-axis direction in accordance with the movement in the x-axis direction of the shield plates 240a, 240b, 340a, 340b, 1840a, 1840b, 1940a, 1940b, respectively. The shield plates 240a, 240b, 340a, 340b, 1840a, 1840b, 1940a, 1940b are moved along the x-axis direction as explained in the first embodiment. For example, when, in a case where the band-shaped steel sheet 100 meanders, the shield plates 240a, 240b, 340a, 340b, 1840a, 1840b, 1940a, 1940b are moved along the x-axis direction (a direction in which the band-shaped steel sheet 100 meanders), the bridge cores 220a, 220b, 320a, 320b, 1820a, 1820b, 1920a, 1920b, and the shield plates 240a, 240b, 340a, 340b, 1840a, 1840b, 1940a, 1940b may be moved along the x-axis direction (a direction in which the band-shaped steel sheet 100 meanders), by an amount same as a meandering amount of the band-shaped steel sheet 100.

It should be noted that the above explained embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention can be utilized for inductively heating a conductor sheet, for example.

The invention claimed is:

1. A transverse flux induction heating device, comprising:
a pair of coils having at least one coil arranged on a front side and at least one coil arranged on a rear side of a planned conveyance plane of a conductor sheet to make alternating magnetic fields generated through energization of alternating currents in mutually the same direction intersect the planned conveyance plane of the conductor sheet; and
cores arranged by a set for each coil forming the pair of coils,
the set of cores arranged for each coil having a plurality of partial cores arranged in a state of having an interval therebetween in a width direction,
the width direction being a direction perpendicular to a conveyance direction of the conductor sheet and a facing direction of the coils,
each of the partial cores having a body portion and a center leg portion,
the body portion being extended in the conveyance direction from a region on an upstream side in the conveyance direction of the coil to a region on a downstream side in the conveyance direction of the coil, on a back side of the coil,
the back side being an opposite side to a side where the planned conveyance plane exists, and the center leg portion being extended in a direction of the planned conveyance plane from the body portion to pass through a hollow portion of the coil, wherein:

the set of cores has at least one bridge core capable of being magnetically coupled to at least two partial cores out of the partial cores; and the bridge core is arranged on the back side of the partial cores.

2. The transverse flux induction heating device according to claim 1, wherein each of the partial cores can be magnetically coupled to the at least one bridge core.

3. The transverse flux induction heating device according to claim 1, wherein all of the partial cores included in the set of cores can be magnetically coupled via the bridge core.

4. The transverse flux induction heating device according to claim 1, wherein:

each of the set of cores has a plurality of the bridge cores; and the bridge cores are arranged in a state of having an interval therebetween in the width direction.

5. The transverse flux induction heating device according to claim 4, wherein:

each of the set of cores has two of the bridge cores;

the two bridge cores are arranged on both sides in the width direction in a state of having an interval therebetween; and when seen from the facing direction of the coils, at least a part of each of the partial cores overlaps with one of the bridge cores with each other.

6. The transverse flux induction heating device according to claim 1, wherein the number of the bridge core provided to each of the set of cores is one.

7. The transverse flux induction heating device according to claim 1, wherein in the set of cores, the partial cores and the bridge core are separate cores.

8. The transverse flux induction heating device according to claim 1, wherein in the set of cores, at least one of the plurality of partial cores and at least one of the bridge cores are an integrated core.

* * * * *